(12) United States Patent
Pedretti et al.

(10) Patent No.: US 12,017,687 B2
(45) Date of Patent: Jun. 25, 2024

(54) ENERGY STORAGE AND DELIVERY SYSTEM AND METHOD

(71) Applicant: Energy Vault, Inc., Westlake Village, CA (US)

(72) Inventors: Andrea Pedretti, Thousand Oaks, CA (US); William Tod Gross, Pasadena, CA (US)

(73) Assignee: Energy Vault, Inc., Westlake Village, CA (US)

( * ) Notice: Subject to any disclaimer, the term of this patent is extended or adjusted under 35 U.S.C. 154(b) by 0 days.

(21) Appl. No.: 18/409,610

(22) Filed: Jan. 10, 2024

(65) Prior Publication Data

US 2024/0140494 A1 May 2, 2024

Related U.S. Application Data

(60) Provisional application No. 63/518,045, filed on Aug. 7, 2023, provisional application No. 63/508,182, filed on Jun. 14, 2023, provisional application No. 63/495,231, filed on Apr. 10, 2023.

(51) Int. Cl.
*B61B 7/06* (2006.01)
*F03G 7/08* (2006.01)

(52) U.S. Cl.
CPC . *B61B 7/06* (2013.01); *F03G 7/08* (2013.01)

(58) Field of Classification Search
CPC .................................. B61B 7/06; F03G 7/08
See application file for complete search history.

(56) References Cited

U.S. PATENT DOCUMENTS

| | | |
|---|---|---|
| 1,720,732 A | 7/1929 | Jongedyk |
| 1,822,432 A | 9/1931 | Bradley |
| 2,627,176 A | 2/1953 | Levy |

(Continued)

FOREIGN PATENT DOCUMENTS

| | | |
|---|---|---|
| CN | 1671929 A | 9/2005 |
| CN | 101980946 A | 2/2011 |

(Continued)

OTHER PUBLICATIONS

"A Weighting game," International Water Power & Dam Construction, Apr. 13, 2010, 8 pages.

(Continued)

*Primary Examiner* — Robert L Deberadinis
(74) *Attorney, Agent, or Firm* — Knobbe Martens Olson & Bear LLP

(57) ABSTRACT

An energy storage and delivery system includes one or more cableways and a cage that travels along each of the one or more cableways. The cage is coupled (e.g., fixedly coupled) to one or more cables that extend between a lower elevation and a higher elevation, the cables or steel ribbons being translated along the associated cableway by a traction motor wheel to translate the cage along the associated cableway. The system is operable to pick-up, transport and deliver with the cage a plurality of blocks from the lower elevation to the higher elevation to store energy (e.g., via the potential energy of the block). The system is also operable to pick-up, transport and deliver with the cage a plurality of blocks from the higher elevation to the lower elevation at least partially under force of gravity to generate electricity via an electric generator coupled to the traction motor wheel.

18 Claims, 43 Drawing Sheets

(56) References Cited

U.S. PATENT DOCUMENTS

| | | | |
|---|---|---|---|
| 2,924,484 A | 2/1960 | Tolsma |
| 3,405,278 A | 10/1968 | Ley |
| 4,018,021 A | 4/1977 | Dow |
| 4,284,899 A | 8/1981 | Bendiks |
| 4,381,839 A | 5/1983 | Engler et al. |
| 4,918,282 A | 4/1990 | Cheek |
| 5,340,218 A | 8/1994 | Cuthbertson |
| 5,888,043 A | 3/1999 | Jatcko |
| 6,282,859 B1 | 9/2001 | Van Der Heijden |
| 6,557,316 B2 | 5/2003 | Van Der Heijden |
| 6,866,815 B2 | 3/2005 | Gohres et al. |
| 6,955,015 B2 | 10/2005 | Manthei |
| 7,191,710 B2 | 3/2007 | Powell |
| 7,561,936 B2 | 7/2009 | Matsufuji |
| 7,712,326 B2 | 5/2010 | Jagusztyn et al. |
| 7,743,609 B1 | 6/2010 | Brostmeyer |
| 7,775,571 B2 | 8/2010 | Waisanen |
| 7,836,646 B2 | 11/2010 | Matsufuji |
| 7,886,537 B2 | 2/2011 | Jagusztyn et al. |
| 7,973,420 B2 | 7/2011 | Scott |
| 8,176,702 B2 | 5/2012 | Adam |
| 8,465,071 B2 | 6/2013 | Risi et al. |
| 8,628,289 B1 | 1/2014 | Benedict |
| 8,667,750 B2 | 3/2014 | Speer |
| 8,674,527 B2 | 3/2014 | Fyke et al. |
| 9,059,605 B2 | 6/2015 | Murray et al. |
| 9,422,108 B2 | 8/2016 | Hognaland |
| 9,523,201 B2 | 12/2016 | Romanenko |
| 9,688,520 B1 | 6/2017 | Khalil |
| 10,069,333 B2 | 9/2018 | Peitzke |
| 10,683,851 B2 | 6/2020 | Pedretti et al. |
| 10,788,020 B2 | 9/2020 | Pedretti et al. |
| 10,830,216 B2 | 11/2020 | Pedretti et al. |
| 10,837,429 B2 | 11/2020 | Pedretti et al. |
| 10,935,005 B2 | 3/2021 | Bhargava |
| 10,961,051 B1 | 3/2021 | Lindbo et al. |
| 11,011,967 B2 | 5/2021 | Zhang |
| 11,525,437 B2 | 12/2022 | Pedretti et al. |
| 11,555,484 B2 | 1/2023 | Pedretti et al. |
| 11,585,328 B2 | 2/2023 | Pedretti et al. |
| 11,719,229 B2 | 8/2023 | Pedretti et al. |
| 11,746,758 B2 | 9/2023 | Pedretti et al. |
| 11,761,431 B2 | 9/2023 | Pedretti et al. |
| 11,761,432 B2 | 9/2023 | Pedretti |
| 11,820,629 B2 | 11/2023 | Pedretti et al. |
| 2002/0197135 A1 | 12/2002 | Amtzen et al. |
| 2003/0009970 A1 | 1/2003 | MacDonald et al. |
| 2003/0019828 A1 | 1/2003 | Choi |
| 2003/0215318 A1 | 11/2003 | Buzzoni |
| 2004/0020145 A1 | 2/2004 | Matsufuji |
| 2005/0252144 A1 | 11/2005 | MacDonald et al. |
| 2007/0000246 A1 | 1/2007 | Prastitis |
| 2007/0186502 A1 | 8/2007 | Marsh et al. |
| 2007/0193183 A1 | 8/2007 | Price et al. |
| 2008/0098687 A1 | 5/2008 | Marsh et al. |
| 2009/0077920 A1 | 3/2009 | Korman et al. |
| 2009/0173027 A1 | 7/2009 | Bennett |
| 2009/0193808 A1 | 8/2009 | Fiske |
| 2009/0200814 A1 | 8/2009 | Hellgren |
| 2009/0231123 A1 | 9/2009 | Rowell et al. |
| 2009/0284021 A1 | 11/2009 | Scott |
| 2010/0283263 A1 | 11/2010 | Schilling |
| 2010/0301616 A1 | 12/2010 | Al-Khamis |
| 2011/0027107 A1 | 2/2011 | Bekken |
| 2011/0050158 A1 | 3/2011 | MacDonal et al. |
| 2011/0112731 A1 | 5/2011 | Harada |
| 2011/0123257 A1 | 5/2011 | Mills et al. |
| 2011/0241356 A1 | 10/2011 | Khoshnevis |
| 2012/0272500 A1 | 11/2012 | Reuteler |
| 2012/0306223 A1 | 12/2012 | Karlsson |
| 2013/0125540 A1 | 5/2013 | Vainonen et al. |
| 2014/0271240 A1 | 9/2014 | Daily |
| 2015/0048622 A1 | 2/2015 | Schegerin |
| 2015/0130191 A1 | 5/2015 | Houvener et al. |
| 2015/0285037 A1 | 10/2015 | Sadiq |
| 2016/0032586 A1 | 2/2016 | Radford |
| 2016/0138572 A1 | 5/2016 | Boone |
| 2017/0030069 A1 | 2/2017 | Radford |
| 2017/0288457 A1 | 10/2017 | Peitzke et al. |
| 2018/0010582 A1 | 1/2018 | Aranovich et al. |
| 2020/0024108 A1 | 1/2020 | Pedretti et al. |
| 2020/0025181 A1 | 1/2020 | Pedretti et al. |
| 2020/0025182 A1 | 1/2020 | Pedretti et al. |
| 2020/0028379 A1 | 1/2020 | Pedretti et al. |
| 2020/0109703 A1 | 4/2020 | Bhargava |
| 2020/0290804 A1 | 9/2020 | Fjeldheim |
| 2021/0054830 A1 | 2/2021 | Pedretti et al. |
| 2021/0188549 A1 | 6/2021 | Fjeldheim et al. |
| 2021/0198039 A1 | 7/2021 | Salichs et al. |
| 2021/0214100 A1 | 7/2021 | Thayer |
| 2021/0214199 A1 | 7/2021 | Austrheim |
| 2021/0221618 A1 | 7/2021 | Austrheim |
| 2021/0397769 A1 | 12/2021 | Austrheim et al. |
| 2021/0404445 A1 | 12/2021 | Pedretti et al. |
| 2021/0404446 A1 | 12/2021 | Pedretti et al. |
| 2021/0404447 A1 | 12/2021 | Pedretti et al. |
| 2021/0404448 A1 | 12/2021 | Pedretti et al. |
| 2022/0002076 A1 | 1/2022 | Austrheim |
| 2022/0002077 A1 | 1/2022 | Austrheim et al. |
| 2022/0041372 A1 | 2/2022 | Austrheim |
| 2022/0073279 A1 | 3/2022 | Austrheim et al. |
| 2022/0097967 A1 | 3/2022 | Austrheim |
| 2022/0161662 A1 | 5/2022 | Fjeldheim |
| 2022/0209537 A1 | 6/2022 | Pedretti et al. |
| 2022/0243701 A1 | 8/2022 | Pedretti et al. |
| 2022/0333577 A1 | 10/2022 | Pedretti et al. |
| 2023/0009666 A1 | 1/2023 | Pedretti |
| 2023/0151799 A1 | 5/2023 | Pedretti et al. |
| 2023/0184229 A1 | 6/2023 | Pedretti |
| 2024/0018948 A1 | 1/2024 | Pedretti |

FOREIGN PATENT DOCUMENTS

| | | |
|---|---|---|
| CN | 103334887 A | 10/2013 |
| CN | 103867408 A | 6/2014 |
| CN | 204096953 U | 1/2015 |
| CN | 107628554 A | 1/2018 |
| CN | 111 692 055 A | 9/2020 |
| CN | 113 460 841 A | 10/2021 |
| CN | 115122469 A | 9/2022 |
| CN | 217498459 U | 9/2022 |
| CN | 218145230 U | 12/2022 |
| CN | 115772944 A | 3/2023 |
| CN | 114940456 B | 6/2023 |
| CN | 115256599 B | 7/2023 |
| CN | 115013266 B | 9/2023 |
| DE | 21 52 879 A1 | 4/1973 |
| DE | 12 79 906 | 10/1986 |
| DE | 100 37 678 A1 | 2/2002 |
| DE | 10 2010 014342 A1 | 10/2011 |
| DE | 10 2011 119116 A1 | 5/2013 |
| DE | 20 2012 102937 | 11/2013 |
| EA | 27072 B1 | 6/2017 |
| FR | 1 135 656 | 5/1957 |
| FR | 2 146 481 A1 | 3/1973 |
| FR | 2 812 865 A1 | 2/2002 |
| FR | 3099212 A1 | 1/2021 |
| GB | 946 930 A | 1/1964 |
| GB | 2351066 A | 12/2000 |
| GB | 2578805 A | 5/2020 |
| GB | 2585124 A | 12/2020 |
| JP | S648197 A | 1/1989 |
| JP | H05-239923 | 9/1993 |
| JP | 06-193553 | 7/1994 |
| JP | 2001-163574 A | 6/2001 |
| JP | 201163574 A | 6/2001 |
| JP | 2006 022529 A | 1/2006 |
| JP | 2009-242088 | 10/2009 |
| JP | 2021-532710 | 11/2021 |
| KR | 10-0570880 B1 | 4/2006 |
| KR | 10-2009-0110891 A | 10/2009 |
| SU | 481528 A1 | 8/1975 |
| WO | WO 1992/018415 A1 | 10/1992 |
| WO | WO 2013/005056 A1 | 10/2013 |

(56) References Cited

FOREIGN PATENT DOCUMENTS

| WO | WO 2018/184868 A2 | 10/2018 |
| --- | --- | --- |
| WO | WO 2020/018329 | 1/2020 |
| WO | WO 2020/040717 A1 | 2/2020 |
| WO | WO 2021/255763 A1 | 12/2021 |
| WO | WO 2021/260450 A1 | 12/2021 |
| WO | WO 2022/006584 A1 | 1/2022 |
| WO | WO 2022/140764 | 6/2022 |
| WO | WO 2022/169651 | 8/2022 |
| WO | WO 2023/283258 | 1/2023 |
| WO | WO 2023/114001 | 6/2023 |
| WO | WO 2023/224780 | 11/2023 |

OTHER PUBLICATIONS

International Search Report and Written Opinion mailed Feb. 9, 2012, received in International Patent Application No. PCT/US2011/037252, in 9 pages.

Internation Search Report and Written Opinion dated Feb. 6, 2020, received in International Patent Application No. PCT/US2019/041249.

International Search Report and Written Opinion regarding International Patent Application No. PCT/US2021/014122, dated May 11, 2021, in 12 pages.

International Search Report and Written Opinion dated Nov. 12, 2021, received in International Patent Application No. PCT/US2021/070783, in 20 pages.

International Search Report and Written Opinion dated Apr. 20, 2022, received in International Patent Application No. PCT/US2021/073039, in 11 pages.

International Search Report and Written Opinion received in International Patent Application No. PCT/US2022/013915, dated May 23, 2022, in 16 pages.

International Search Report and Written Opinion dated Nov. 9, 2022, received in International Patent Application No. PCT/US2022/036244, in 37 pages.

International Search Report and Written Opinion dated May 30, 2023 received in International Patent Application No. PCT/US2022/051282, 14 pages.

Invitation to Pay Additional Fees received in International Patent Application No. PCT/US2019/041249, dated Oct. 16, 2019.

IPRP & Written Opinion; International Appl. No. PCT/US2022/013915; dated Aug. 3, 2023 in 8 pages.

Wood, Bruce; "Hanging Tomato Plants"; Mar. 4, 2009; retrieved May 9, 2013 using Internet Archive to view rubberingot.com.

ENERGY STORAGE AND DELIVERY SYSTEM AND METHOD

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure is directed to an energy storage and delivery system, and more particularly to an energy storage and delivery system that stores and releases energy via the movement of blocks along a cableway.

Description of the Related Art

Power generation from renewable energy sources (e.g., solar power, wind power, hydroelectric power, biomass, etc.) continues to grow. However, many of these renewable energy sources (e.g., solar power, wind power) are intermittent an unpredictable, limiting the amount of electricity that can be delivered to the grid from intermittent renewable energy sources.

SUMMARY

Accordingly, there is a need for improved system to capture electricity generated by renewable energy sources for predictable delivery to the electrical grid. As used herein, the electrical grid or electric grid is an interconnected network for delivery of electricity from producers to consumers and spans a large geographical region (e.g., cities, states, regions and/or countries).

In accordance with one aspect of the disclosure, an energy storage and delivery system is provided. An example energy storage and delivery system includes one or more cableways and a cage that travels along each of the one or more cableways. The cage can be coupled (e.g., fixedly coupled) to one or more cables or steel ribbons that extend between a lower elevation and a higher elevation, the cables or steel ribbons being translated along the associated cableway by a winch to thereby translate the cage along the associated cableway. The system is operable to pick-up, transport and deliver with the cage a plurality of blocks one at a time from the lower elevation to the higher elevation to store energy (e.g., via the potential energy of the block at the higher elevation). The system is also operable to pick-up, transport and deliver with the cage a plurality of blocks one at a time from the higher elevation to the lower elevation to generate electricity via an electric generator operatively coupled to the winch (e.g., via the kinetic energy of the block when moved to the lower elevation).

In accordance with another aspect of the disclosure, the energy storage and delivery system can in one example store power generated from renewable energy sources (e.g., solar power, wind power) to produce off-hours electricity. For example, the energy storage and delivery system can move a plurality of blocks from a lower elevation to a higher elevation to store solar energy as potential energy in the blocks during daylight hours when solar electricity is abundant. The energy storage system can then operate to move the blocks from the higher elevation to a lower elevation during nighttime to drive a generator to produce electricity for delivery to the power grid. In another example, the energy storage and delivery system can move a plurality of blocks from a lower elevation to a higher elevation to store wind energy as potential energy in the blocks when wind electricity is abundant. The energy storage system can then operate to move the blocks from the higher elevation to a lower elevation when wind energy is scarce or unavailable to drive a generator to produce electricity for delivery to the power grid.

In accordance with one aspect of the disclosure, an energy storage and delivery system is provided. The system includes one or more cableways extending between a lower end and an upper end, the upper end being at a higher elevation than the lower end. Each cableway includes an upper block storage at the upper end including a row defined by a pair of rails configured to support a plurality of blocks thereon. An upper support frame is aligned with a distal end of the row of the upper block storage. A first trolley is movably coupled to said pair of rails of the row of the upper block storage, the first trolley configured to travel below the plurality of blocks disposed on the pair of rails of the row. The first trolley is operable to lift one block of the plurality of blocks above the pair of rails of the row and to move said block horizontally along the row to or from an upper landing zone at the distal end of the row of the upper block storage. The cableway also includes a lower block storage at the lower end including a row defined by a pair of rails configured to support a plurality of blocks thereon. A lower support frame is aligned with a distal end of the row of the lower block storage. A second trolley is movably coupled to said pair of rails of the row of the lower block storage, the second trolley configured to travel below the plurality of blocks disposed on the pair of rails of the row of the lower block storage. The second trolley is operable to lift one block of the plurality of blocks above the pair of rails of the row of the lower block storage, and to move said block horizontally along the row to or from a lower landing zone at the distal end of the row of the lower block storage. The cableway also includes one or more cables extending between and coupled to the upper support frame and the lower support frame, and a cage configured to travel along the one or more cables between and over at least a portion of the upper support frame and the lower support frame. The cage is fixedly coupled to one or more traction cables that loop around a first traction motor wheel operatively coupled to the upper support frame and around a second traction motor wheel operatively coupled to the lower support frame. The system also includes a motor-generator operatively coupled to one or both of the first traction motor wheel and the second traction motor wheel. The motor-generator is operable to power one or both of the first traction motor wheel and the second traction motor wheel to move the cage from the lower end to the upper end. The motor-generator is configured to generate electricity from a rotation of one or both of the first traction motor wheel and the second traction motor wheel when the cage moves from the upper end to the lower end at least partially under a force of gravity. The cage is operable to move the plurality of blocks one by one from the lower end to the upper end to store and amount of electrical energy corresponding to a potential energy amount of said blocks, and the cage is operable to move the plurality of blocks from the upper end to the lower end at least partially under the force of gravity to generate an amount of electricity, the cage moving each of the plurality of blocks between the upper end and the lower end along a same vertical distance.

In accordance with one aspect of the disclosure, a method for storing and generating electricity is provided. The method includes operating a first trolley along a row of an upper block storage at an upper end to move a block along the row to and from an upper landing zone at a distal end of the row of the upper block storage. The method also includes operating a second trolley along a row of a lower block storage at a lower end to move a block along the row to and from a lower landing zone at a distal end of the row of the upper block storage. The method also includes operating a cage along a cableway between the upper end and the lower end to move a plurality of blocks one at a time between the lower end and the upper end. Operating the cage includes moving with the cage a block from the lower end to the upper end to store and amount of electrical energy corresponding to a potential energy amount of said blocks, and moving with the cage a block from the upper end to the lower end at least partially under a force of gravity to generate an amount of electricity via an electric motor-generator operatively coupled to the cage. The cage moves the plurality of blocks between the lower end and the upper end along a same vertical distance.

In accordance with one aspect of the disclosure, an energy storage and delivery system is provided. The system includes a cableway extending between a lower end and an upper end, the upper end being at a higher elevation than the lower end. The cableway includes a block storage including a plurality of rows, each row defined by a pair of rails configured to support a plurality of blocks thereon. A support frame is aligned with one of the plurality of rows of the block storage. A plurality of trolleys are movably coupled to one of the plurality of rows of the block storage. Each trolley is configured to travel below the plurality of blocks disposed on the pair of rails of its associated row. The trolley is operable to lift one block of the plurality of blocks above the pair of rails and to move said block to or from a landing zone at a distal end of the associated row of the block storage. A rotator platform is pivotally coupled to a distal end of at least one of the pair or rails of each of the plurality of rows. The rotator platform is configured to pivot between adjacent rows of the block storage to move a block between the adjacent rows. The rotator platform defines one or more cutouts or gaps and is configured to allow the trolley to be positioned under the rotator platform while the trolley supports the block spaced above the associated row. A cage is configured to travel along one or more cables between the lower end and the upper end and to travel over at least a portion of the support frame. A motor-generator is operatively coupled to the cage and operable to move the cage from the lower end to the upper end. The motor-generator is configured to generate electricity when the cage moves from the upper end to the lower end at least partially under a force of gravity. The cage is operable to move the plurality of blocks one-by-one from the lower end to the upper end to store an amount of electrical energy corresponding to a potential energy amount of said blocks, and wherein the cage is operable to move the plurality of blocks from the upper end to the lower end at least partially under the force of gravity to generate an amount of electricity.

In accordance with one aspect of the disclosure, an energy storage and delivery system is provided. The system includes a block storage including a plurality of rows. Each row is defined by a pair of rails configured to support a plurality of blocks thereon. A trolley is movably coupled to each of the plurality of rows of the block storage. Each trolley is configured to travel below the plurality of blocks disposed on the pair of rails of its associated row. The trolley is operable to lift one block of the plurality of blocks above the pair of rails and to move said block to or from an end of the associated row of the block storage. A rotator platform is pivotally coupled to the end of at least one of the pair or rails of each of the plurality of rows. The rotator platform is configured to pivot between adjacent rows of the block storage to move a block between the adjacent rows. The rotator platform defines one or more cutouts or gaps configured to allow the trolley to be positioned under the rotator platform while the trolley supports the block spaced above the associated row.

In accordance with another aspect of the disclosure, a system including a rotator platform is provided. The rotator platform is pivotally coupled to a distal end of at least one of a pair or rails of one of a plurality of rows. The rotator platform is configured to pivot between adjacent rows to move a block between the adjacent rows.

In accordance with one aspect of the disclosure, an energy storage and delivery system is provided. The system includes a cableway extending between a lower end and an upper end, the upper end being at a higher elevation than the lower end. The cableway further includes a block storage including a plurality of rows, each row defined by a pair of rails configured to support a plurality of blocks thereon. A support frame is aligned with one of the plurality of rows of the block storage. A plurality of trolleys are movably coupled to one of the plurality of rows of the block storage. Each trolley is configured to travel below the plurality of blocks disposed on the pair of rails of its associated row. The trolley is operable to lift one block of the plurality of blocks above the pair of rails and to move said block to or from a landing zone at a distal end of the associated row of the block storage. An auxiliary trolley is configured to removably receive one of the plurality of trolleys therein. the auxiliary trolley configured to travel along a pair of rails transverse to and adjacent ends of the plurality of rows of the block storage. The auxiliary trolley is configured to move between adjacent rows of the block storage while carrying said one of the plurality of trolleys to move blocks between adjacent rows of the block storage. A cage is configured to travel along one or more cables between the lower end and the upper end and to travel over at least a portion of the support frame. A motor-generator operatively coupled to the cage. The motor-generator is operable to move the cage from the lower end to the upper end. The motor-generator is configured to generate electricity when the cage moves from the upper end to the lower end at least partially under a force of gravity. The cage is operable to move the plurality of blocks one-by-one from the lower end to the upper end to store an amount of electrical energy corresponding to a potential energy amount of said blocks, and wherein the cage is operable to move the plurality of blocks from the upper end to the lower end at least partially under the force of gravity to generate an amount of electricity.

In accordance with another aspect of the disclosure, an energy storage and delivery system is provided. The system includes a block storage including a plurality of rows. Each row is defined by a pair of rails configured to support a plurality of blocks thereon. A trolley is movably coupled to each of the plurality of rows of the block storage. Each trolley is configured to travel below the plurality of blocks disposed on the pair of rails of its associated row. The trolley is operable to lift one block of the plurality of blocks above the pair of rails and to move said block to or from an end of the associated row of the block storage. An auxiliary trolley is configured to removably receive the trolley therein. The auxiliary trolley is configured to travel along a pair of rails transverse to and adjacent ends of the plurality of rows of the block storage. The auxiliary trolley is configured to move between adjacent rows of the block storage while carrying the trolley to move blocks between adjacent rows of the block storage.

In accordance with one aspect of the disclosure, a system is provided. The system includes an auxiliary trolley configured to removably receive a trolley that travels along a pair of rails of a row of a plurality of rows therein. The auxiliary trolley is configured to travel along a pair of rails transverse to and adjacent ends of the plurality of rows. The auxiliary trolley is configured to move between adjacent rows while carrying the trolley to move blocks between adjacent rows of a block storage.

In accordance with one aspect of the disclosure, an energy storage and delivery system is provided. The system includes a cableway extending between a lower end and an upper end, the upper end being at a higher elevation than the lower end. The cableway includes a block storage including a plurality of rows, each row defined by a pair of rails configured to support a plurality of blocks thereon. A support frame is aligned with one of the plurality of rows of the block storage. A plurality of trolleys movably coupled to one of the plurality of rows of the block storage. Each trolley is configured to travel below the plurality of blocks disposed on the pair of rails of its associated row. The trolley is operable to lift one block of the plurality of blocks above the pair of rails and to move said block to or from a landing zone at a distal end of the associated row of the block storage. A cage is configured to travel along one or more cables between the lower end and the upper end and to travel over at least a portion of the support frame, an auxiliary cage movably coupled to a beam of the support frame. The auxiliary cage is movable between adjacent rows of the block storage and configured to carry a block between adjacent rows of the block storage. A motor-generator is operatively coupled to the cage. The motor-generator is operable to move the cage from the lower end to the upper end. The motor-generator is configured to generate electricity when the cage moves from the upper end to the lower end at least partially under a force of gravity. The cage is operable to move the plurality of blocks one-by-one from the lower end to the upper end to store an amount of electrical energy corresponding to a potential energy amount of said blocks. The cage is operable to move the plurality of blocks from the upper end to the lower end at least partially under the force of gravity to generate an amount of electricity.

In accordance with one aspect of the disclosure, an energy storage and delivery system is provided. The system includes a block storage including a plurality of rows, each row defined by a pair of rails configured to support a plurality of blocks thereon. A trolley is movably coupled to each of the plurality of rows of the block storage. Each trolley is configured to travel below the plurality of blocks disposed on the pair of rails of its associated row, the trolley operable to lift one block of the plurality of blocks above the pair of rails and to move said block to or from an end of the associated row of the block storage. An auxiliary cage is movably coupled to a beam of a support frame aligned with one of the plurality of rows. The auxiliary cage is movable between adjacent rows of the block storage and configured to carry a block between adjacent rows of the block storage.

In accordance with one aspect of the disclosure, a system is provided. The system includes an auxiliary cage movably coupled to a beam of a support frame. The auxiliary cage is movable between adjacent rows defined by a pair of rails and configured to carry a block between adjacent rows.

In accordance with one aspect of the disclosure, a system is provided. The system includes a cage for carrying a block along a cableway. The system includes a pair of spaced apart arms and a pair of spaced apart flanges attached to ends of the pair of arms. The pair of flanges extend transversely relative to the pair of arms and a gap is defined between the pair of flanges. The cage is confined to extend around the block while the block is supported by a first trolley or a second trolley spaced above a row.

In accordance with one aspect of the disclosure, a system is provided. The system includes a plurality of adjacent rows. Each row is defined by a pair of rails configured to support a plurality of blocks on an upper surface of the rails. Each pair of rails of a row is spaced from each other to allow a trolley to travel along the row and below the blocks supported on the rails of the row.

DETAILED DESCRIPTION

Disclosed below is an energy storage and delivery system operable to convert electricity into potential energy, and to generate electricity from the potential energy (e.g., when there're is a demand for electricity). The energy storage and delivery system can be operatively coupled to the electrical grid, for example, for stabilizing the electrical grid and delivering electricity for residential, commercial, and/or industrial consumers.

FIGS. 1-18 show features of an example energy storage and delivery system 100 (hereafter "the system 100"). The system 100 can advantageously be installed in an existing slope or valley V and can extend from an upper end U (e.g., on a mountain top or plain) to a lower end L (e.g., valley floor), the upper end U being at a higher elevation than the lower end L, thereby reducing the amount of terrain preparation needed for the installation of the system 100 and making the system 100 suitable for implementation in mountainous regions of the world.

The system 100 includes one or more cableways 110 that extend between a block storage 102U (e.g., upper block storage) at the upper end U and a block storage 102L (e.g., lower block storage) at the lower end L. In the implementation shown in FIGS. 1-5, the system 100 includes three cableways 110 (e.g., cableway 110A, cableway 110B, cableway 110C) arranged proximate (e.g., adjacent, parallel) each other. The multiple cableways 110A, 110B, 110C are spaced from each other by a sufficient amount to inhibit (e.g., prevent) cables of one cableway from interfering with cables in another cableway (e.g. due to movement of the cages as they travel along the cableways, due to wind load on the cableways, etc.). However, though the system 100 shows three cableways 110 in FIGS. 1-5, the system 100 can have any number of cableways 110 (e.g., even or odd number, such as one, three, four, five, six, nine, ten, twenty, thirty, etc.). For brevity, the structure of a single cableway 110 will now be described, but one of skill in the art will recognize that the following description (unless noted otherwise) applies to all cableways 110 (e.g., cableway 110A, 110B, 110C, etc.) that the system 100 may have.

Figure 2:
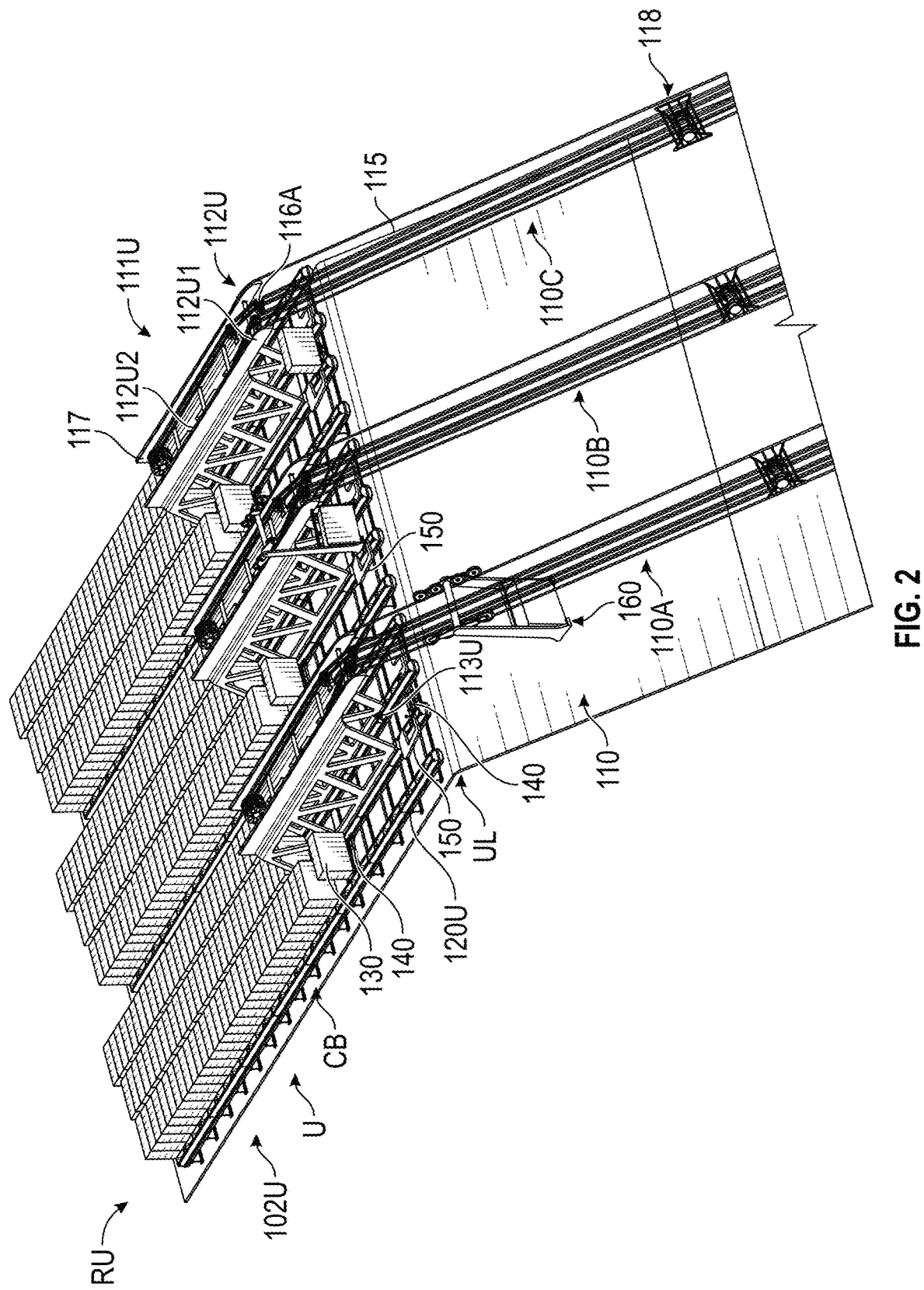
FIG. 2 is a schematic perspective view of an upper portion of the energy storage and delivery system in FIG. 1.
Figure 3:
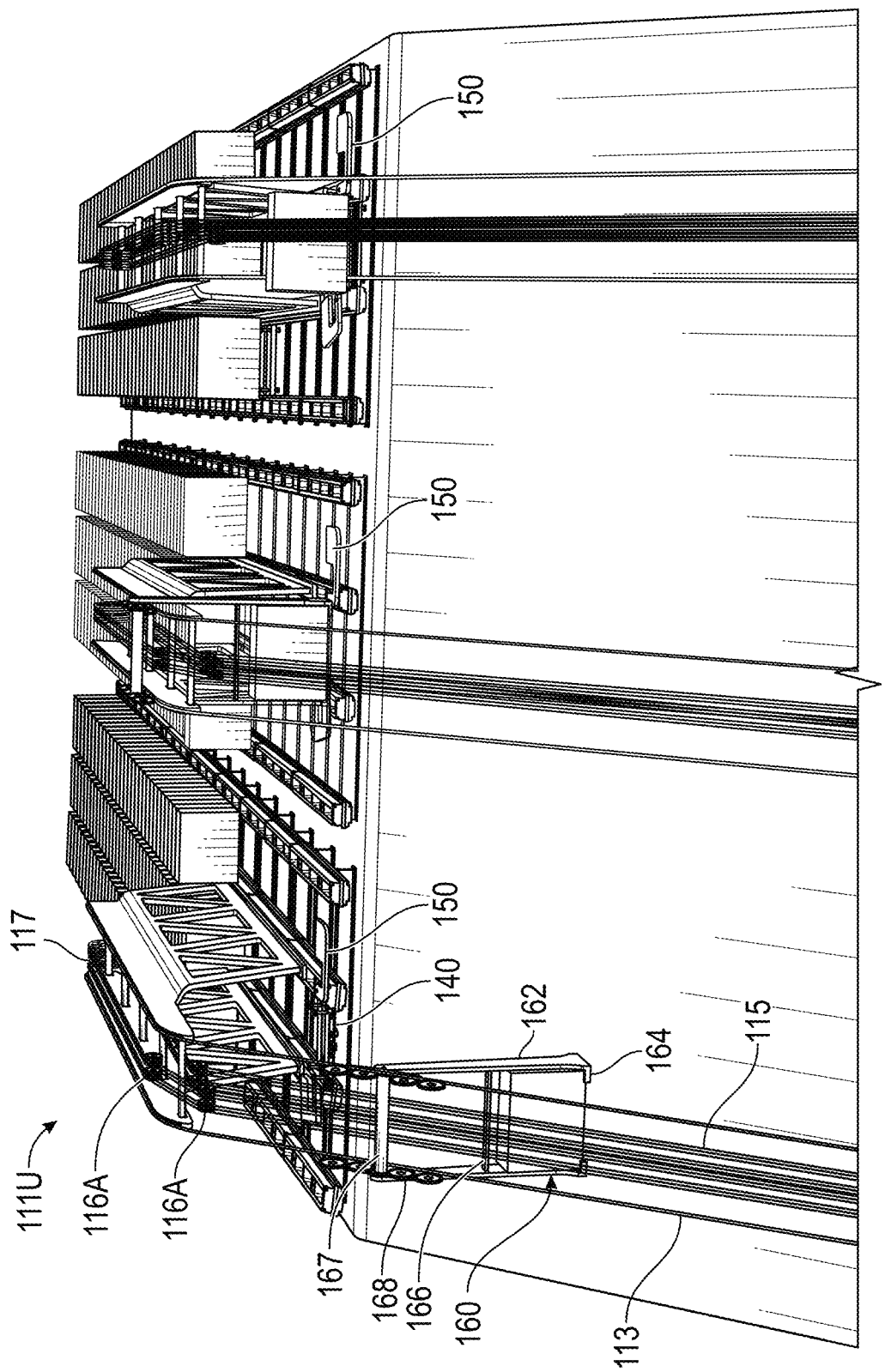
FIG. 3 is a schematic front view of the upper portion of the energy storage and delivery system in FIG. 1.

As shown in FIGS. 2-3, the system 100 includes a plurality of rails or beams 120U, optionally supported on cross beams CB, at the upper end U that define one or more rows or trackways RU of the block storage 102U (e.g., along a same horizontal plane). The rails 120U can be made of metal (e.g., steel). For example, in the implementation shown in FIGS. 2-3, the system 100 has four rails 120U that define three rows RU associated with each cableway 110. However, the system 100 can have fewer (e.g., two, one) or more (e.g., four, five, six, etc.) rows RU associated with each cableway 110. The rails 120U can have an I-beam form or shape that defines channels 121U on opposite sides of the rail 120U, as further discussed below. In another example, the rails 120U can have an L-beam form or shape, where the top part of the L-beam can support blocks 130 thereon and the bottom part of the L can provide a track on which a trolley (e.g., trolley 140) travels (e.g., via wheels 142 of the trolley 140). Each row RU (e.g., defined by two rails 120U) can support a plurality of blocks 130 (e.g., discrete masses) thereon (e.g., along a same horizontal plane). Having multiple rows RU associated with a cableway 110 can advantageously allow for a shorter block storage location 102U, as the same number of blocks 130 can be stored in multiple shorter rows RU instead of fewer longer rows RU. In one implementation, the block(s) 130 in each row RU can generate a predetermined amount of power when moved via the cableway 110 from the upper end U to the lower end L (e.g., one hour of power, two hours of power, etc.). In other implementations, the system 100 can have a single row RU defined by two beams or rails 120U (e.g., where there is enough space at the upper end U to accommodate a long row). The system 100 is operable to move each block 130 along the same distance between the upper end U and the lower end L, so that each block 130 generates the same amount of electricity or power when moved from the upper end U to the lower end L, and each block 130 stores the same amount of energy (as potential energy) when moved from the lower end L to the upper end U.

In one implementation the blocks 130 can be made from local soil and/or remunerated waste material (e.g., coal combustion residuals such as bottom ash, fiberglass from decommissioned wind turbine blades, waste tailings from mining processes). The blocks 130 have the same shape. The block(s) 130 can in one implementation have a rectangular (e.g., square) face with a width W and height H, and a depth D smaller than the width W and height H (see FIGS. 4-5, 18). The width W of the block 130 is larger than a spacing between rails 120U, allowing the block 130 to be supported on a pair of rails 120U (see FIG. 18). In some implementations, each block 130 can optionally weigh between approximately 20 tons and 50 tons, such as approximately 30 tons (e.g., 30 metric tons). The system 100 can advantageously generate between 0.5 MW up to 5 MW of power (e.g., based on the speed the blocks 130 are moved at and the slope or steepness of the cableway 110).

With continued reference to FIGS. 2-3, the system 100 has an upper support frame 111U (which can be made of steel) for each cableway 110. Each upper support frame 111U is coupled over a pair of rails or beams 120U that define a row RU proximate (e.g., adjacent) the distal edge of the block storage 102U near a landing zone UL (e.g., landing and/or take-off zone, upper landing zone) of the upper end U. The upper support frame 111U defines an opening or passageway 113U via which block(s) 130 of the row RU can pass (see FIGS. 2-3). As discussed above, each cableway 110 can have multiple rows RU associated with it. In the illustrated embodiment, where each cableway 110 has three rows RU associated with it, two rows RU are on either side of the row RU to which the upper support frame 111U is coupled. The upper support frame 111U has a pair of rails 112U (e.g., rigid rails 112U) that couple to and support a pair of cables 113. Each of the pair of rails 112U of the upper support frame 111U includes a curved distal portion 112U1 that transitions to a linear portion 112U2. The pair of cables 113 extend along the curved distal portion 112U1 and along the linear portion 112U2 of the pair of rails 112U of the upper support frame 111U and couple (e.g., fixedly couple) to the upper support frame 111U (or to a counterweight) so that the pair of cables 113 are preloaded and in tension. The pair of cables 113 extend to and couple to a corresponding lower support frame 111L at the lower end L, as further described below. In another implementation, a single cable 113 (instead of a pair of cables 113) can extend between the upper end U and the lower end L and the upper support frame 111U can have a single rail 112U along which the single cable 113 extends and couples to.

Figure 17:
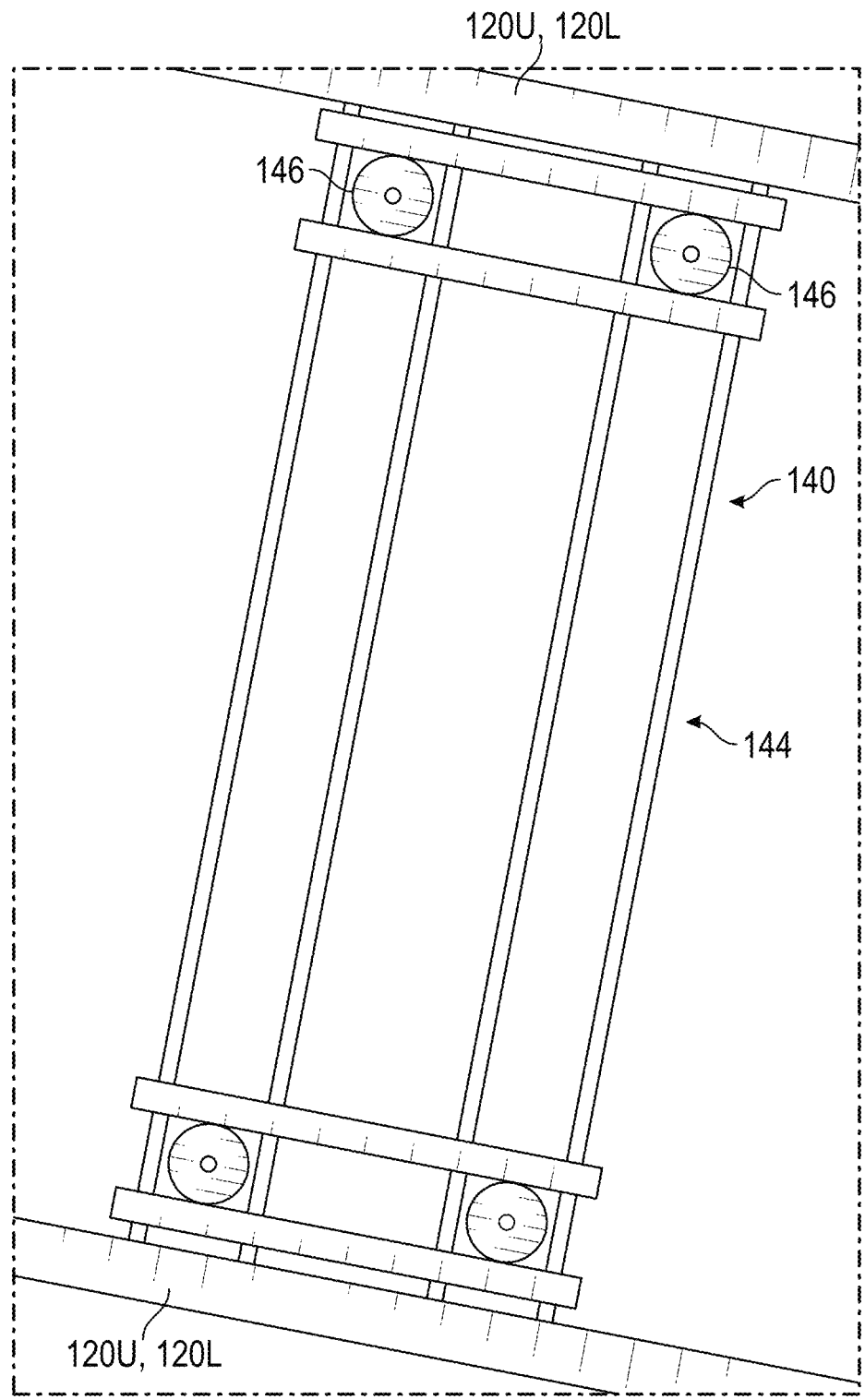
FIG. 17 is a schematic top view of a trolley used in the energy storage and delivery system of FIG. 1.
Figure 18:
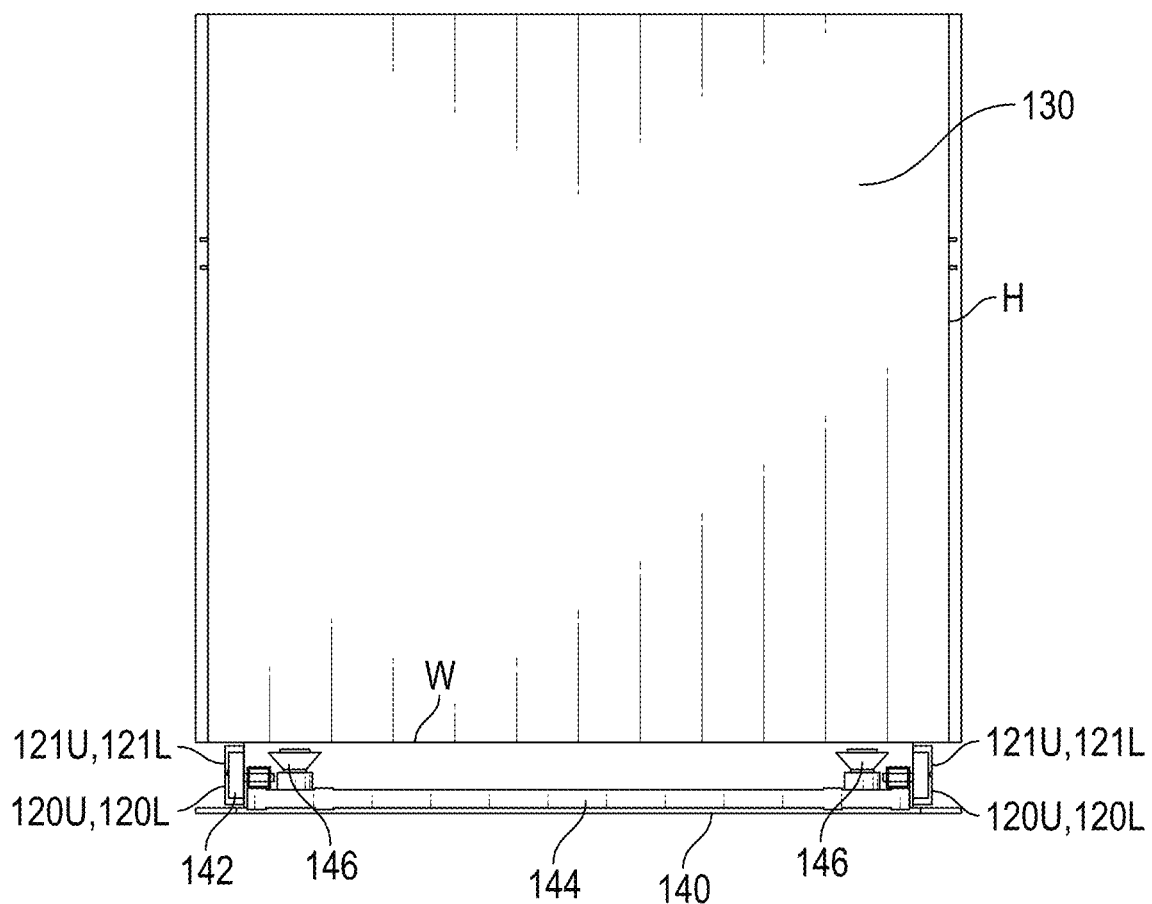
FIG. 18 is a front view of a trolley used in the energy storage and delivery system of FIG. 1 disposed under a block.

A trolley 140 can travel in each of the rows RU (e.g., travel between two rails 120U that define the row RU). The trolley 140 can be movably coupled to the rails 120U and can be selectively positioned under the block 130 (see FIG. 18) that is supported on the rails 120U of the row RU. As shown in FIGS. 17-18, the trolley 140 can include wheels 142 on opposite sides of a frame 144, where the wheels 142 move (e.g., rotate) within the channel 121U of the (pair of) rails 20U on which the blocks 130 are supported (e.g., the wheels 142 roll on the bottom flange of the beams or rails 120U. In another example, where the rails 120U have an L-shape, the wheels 142 of the trolley 140 can move (e.g., rotate) along a track provided by the bottom portion of the L-shape of the rails 120U. The trolley 140 also includes one or more support pistons 146, for example on opposite sides of the frame 144, that face a bottom side of the block 130 when the trolley 140 is positioned underneath the block 130. The support pistons 146 are actuatable (e.g., hydraulically, pneumatically, electrically via an electric motor) between a retracted state where the support pistons 146 do not contact the block 130 and an extended position where the support pistons 146 are vertically displaced away from the frame 144 (e.g., upward) to contact and lift the block 130 (e.g., approximately 2 cm or 1 inch) above the beams or rails 120U (e.g., so that the weight of the block 130 is supported solely by the support pistons 146, allowing the trolley 140 to move the block 130 horizontally (e.g., along the X direction) of the row RU. In one implementation, the trolley 140 can have two pairs of support pistons 146 and two pairs of wheel assemblies 142, each support piston 146 aligned with one of the wheel assemblies 142. Once the trolley 140 has lifted the block 130 above the beams or rails 120U (e.g., so that the block 130 is not in contact with the beams or rails 120U), the trolley 140 can translate the block 130 along the row RU (e.g., horizontally in the X direction), for example toward the distal end of the row RU proximate the landing zone UL (e.g., landing and/or take-off zone) at the upper end U.

With reference to FIGS. 2-3, a rotator platform 150 is pivotally coupled to at least one of two rails or beams 120U of a row RU proximate the distal end of the beams 120U (e.g., at or proximate the landing zone UL). In implementations where the block storage 102U has a single row RU, the rotator platform 150 can be excluded. In the illustrated implementation, the rotator platform 150 is rotatably coupled to a top of a rail or beam 120U and rotatable between a first (or deployed) position (see FIG. 3 on left) where the rotator platform 150 extends transverse (e.g., perpendicular) to a length of a row RU, and a second (or retracted) position (see FIG. 2, on left) where the rotator platform 150 extends generally along the length of a row RU. In the first (or deployed) position, the rotator platform 150 can receive a block 130 carried by the trolley 140. The rotator platform 150 can have one or more cutouts 152 (see FIG. 6) that allows the trolley 140 to move under at least a portion of the rotator platform 150 with one or more of the support pistons 146 moving into the cutout 152. With continued reference to FIG. 6, the rotator platform 150 in the first (or deployed) position can extend a long a distance smaller than a distance between beams or rails 120U of the row RU, so that there is a gap 154 between an end of the rotator platform 150 and a rail 120U of the row RU that is opposite the rotator platform 150. The gap 154 can receive one or more of the support pistons 146 therethrough when the trolley 140 moves to a position under the rotator platform 150. The trolley 140 can move into position relative to the rotator platform 150 so that the frame 144 of the trolley 140 is under the rotator platform 150 and so that the block 130 is spaced above the rotator platform 150 (e.g., because the support pistons 146 in the extended position support the block 130 off the beams or rails 120U and above the rotator platform 150). The trolley 140 positions itself relative to the rotator platform 150 so that the rotator platform 150 is positioned between the block 130 and the frame 144 of the trolley 140.

Once the block 130 is over the rotator platform 150, the support pistons 146 are actuated to lower the block 130 onto the support platform 150 to that the block 130 is solely supported by the support platform 150. The trolley 140 is then actuated to move away from the support platform 150 proximally along the row RU (e.g., to position itself under another block 130 in the row RU). The rotator platform 150 is actuatable to pivot between adjacent rows RU to move the block 130 from one row RU to another row RU. In this manner, a block 130 can be moved between two or more rows RU, by having a rotator platform 150 in each row RU move the block 130 to an adjacent row RU and/or to move a block 130 to a row RU coupled to the upper support frame 111U of a cableway 110 for movement of the block 130 from the upper end U to the lower end L, as further described below.

Figure 12:
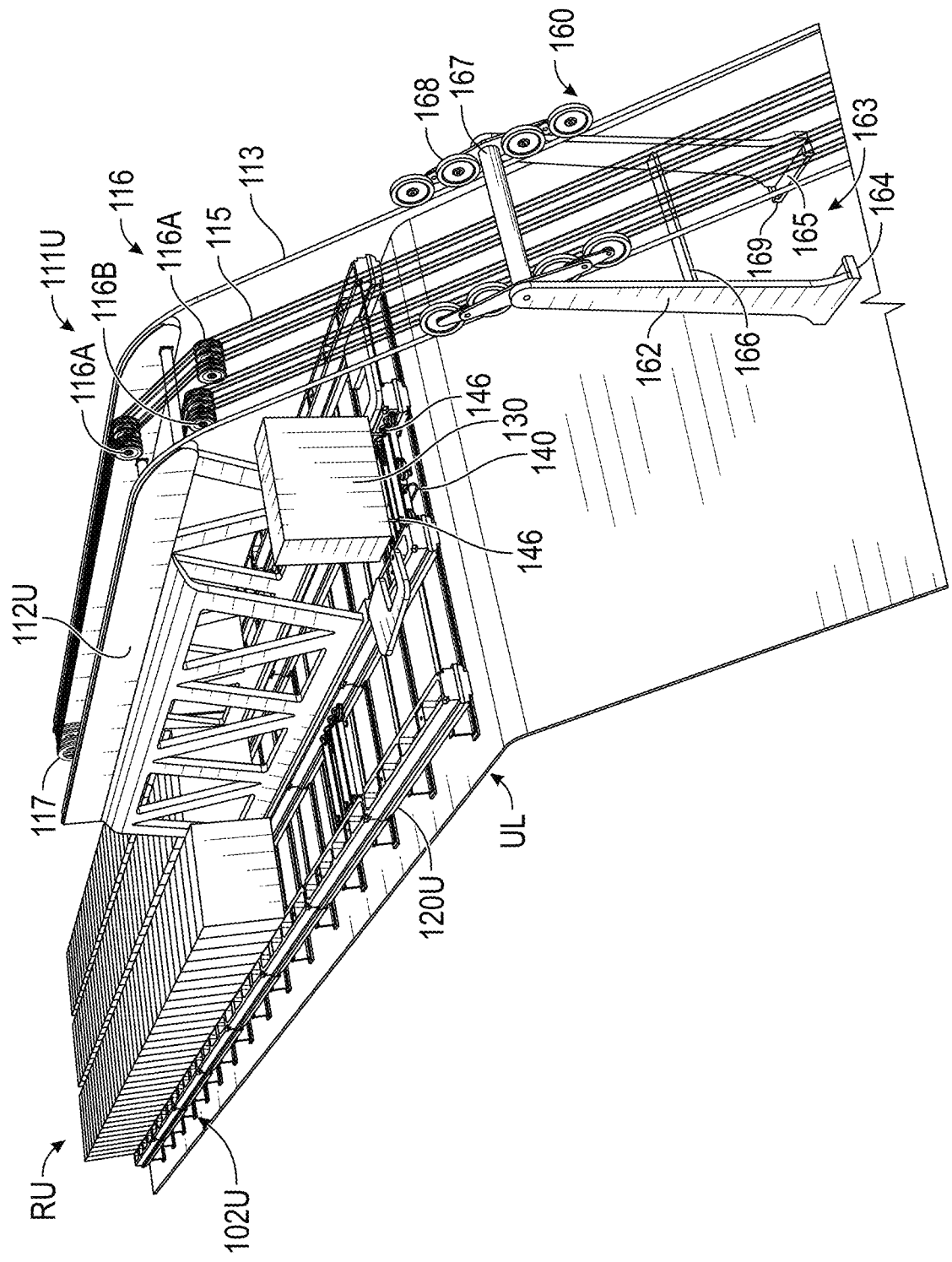

With reference to FIGS. 2-3 and 12, a cage 160 travels along the cableway 110 (e.g., a separate cage 160 travels along each cableway 110A, 110B, 110C in the system 100). The cage 160 can be made of steel and be lightweight. The cage 160 has a pair of spaced apart arms 162 that extend from a support bar 167 to a pair of flanges 164 at free ends of the pair of arms 162. The pair of arms 162 are spaced apart from each other by a width greater than (e.g., approximately equal to but greater than) a width W of the block 130. The pair of flanges 164 are spaced apart from each other (e.g., separated by opening or gap 163, as shown in FIG. 12) and extend transverse (e.g., perpendicular) to the arms 162. A cross bar 166 extends between and connects the pair of arms 162 at a location between the pair or flanges 164 and the support bar 167. The cross bar 166 is spaced from the pair of flanges 164 by a distance greater than a height H of a block 130, allowing the block 130 to be received in the space between the pair of arms 162 and between the cross bar 66 and the pair of flanges 164. A pair of wheel assemblies 168 are coupled to the support bar 167 (e.g., to opposite ends of the support bar 167) and movably contact (e.g., couple to or engage) the pair of cables 113 as the cage 160 travels along the cableway 110. In another implementation, where the cableway 110 has a single cable 113 instead of a pair of cables 113, the pair of arms 162 of the cage 160 can join together and couple to a single wheel assembly 168 and the support bar 167 is excluded, where the single wheel assembly 168 movably contacts (e.g., couples to or engages) the single cable 113 as the cage 160 travels along the cableway 110.

Figure 4:
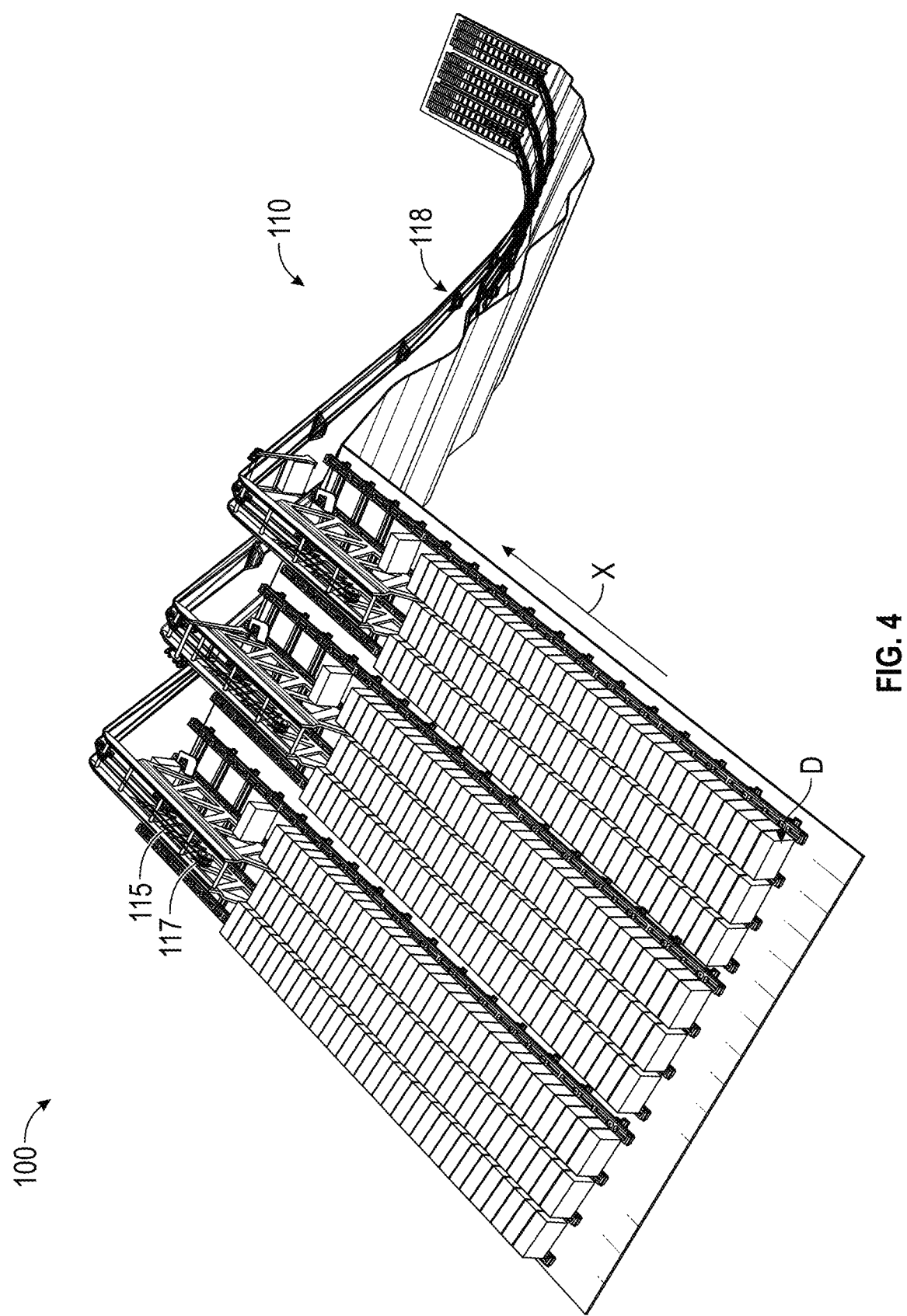
FIG. 4 is a schematic top perspective view of the energy storage and delivery system in FIG. 1.
Figure 16:
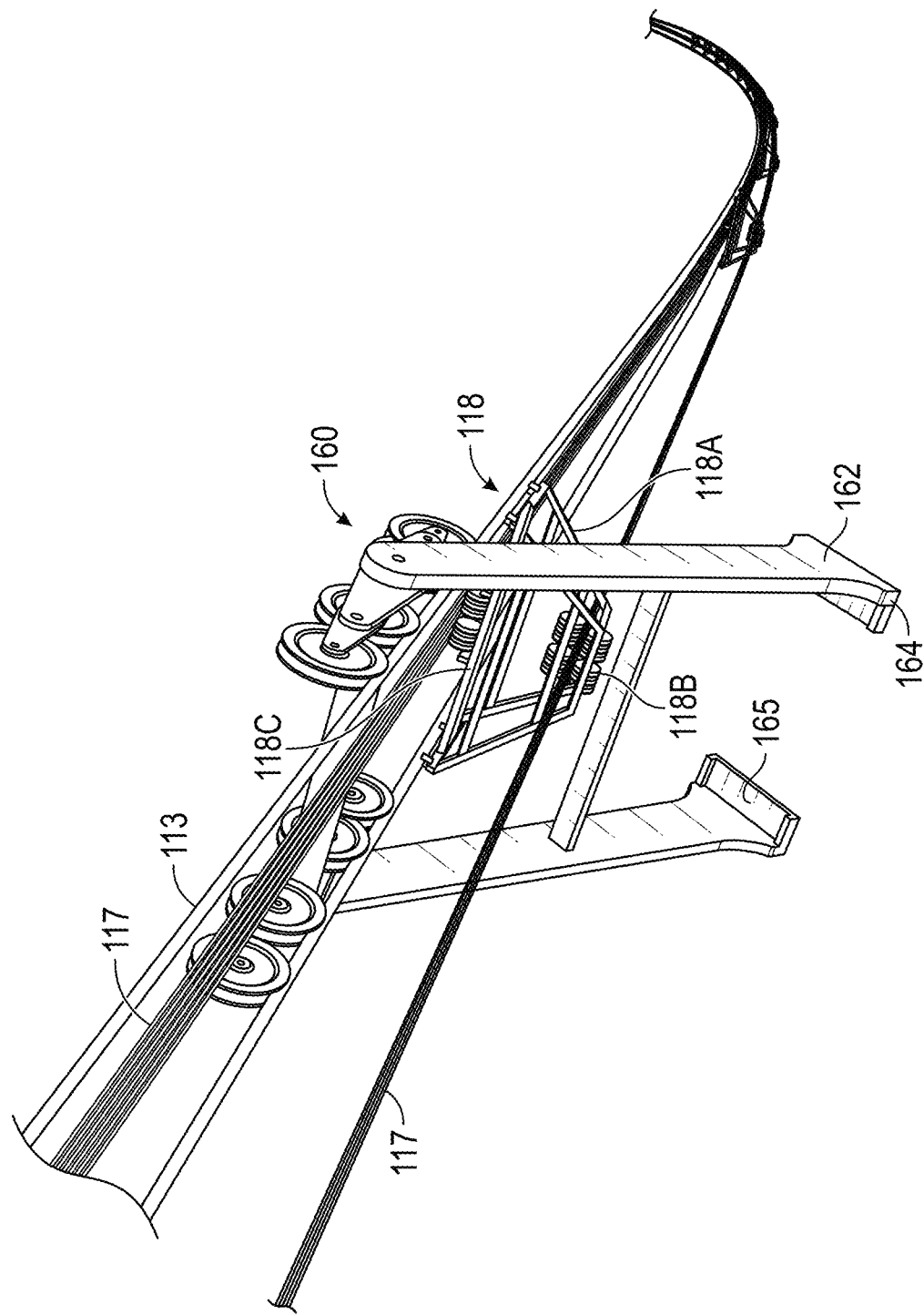
FIG. 16 shows a schematic partial perspective view of a portion of the energy storage and delivery system in FIG. 1, showing a cage of the system.

The cage 160 is moved along the cableway 110 by one or more (e.g., multiple) traction cables 115 that are coupled (e.g., fixedly coupled) to the cage 160 (e.g., fixedly coupled to the support bar 167). In one example, the one or more traction cables 115 is a single traction cable. In another example, the one or more traction cables 115 are more than one traction cable 115 (e.g., two, three, four, five, six, seven or eight traction cables 115). The traction cable(s) 115 extend over one of more pulleys 116 to and around a traction motor wheel 117 that frictionally engages (e.g., "grabs" onto) the traction cable(s) 115. The traction motor wheel 117 is rotatably coupled to the upper support frame 111U. The traction cable(s) 115 are closed (continuous) loop cables that extend over the traction motor wheel 117 at the upper end U and a corresponding traction motor wheel 117 at the lower end L of the cableway 110. The traction cable(s) 115 can be steel cables or steel ribbons that are small or think (as compared with the cables 113), advantageously allowing the traction cable(s) 115 to have high flexibility, allowing the size of the traction motor wheel 117 to be reduced. In one example, where the one or more traction cables 115 is a single cable, the traction cable 115 can have a diameter of 35 mm. In another example, where the one or more traction cables 115 are multiple traction cables 115 (e.g., two, three, four, five, six, seven or eight traction cables 115), the traction cables 115 can have a diameter between 35 mm and 10 mm. The traction motor wheel 117 can in one example have a diameter of 40 times the diameter of the traction cable(s) 115 (e.g., between 400 mm and 1.4 m). As best shown in FIG. 12, traction cable(s) 115 coupled to the support bar 167 extend over pulleys 116A, over and around the traction motor wheel 117, and then extend from the underside of the traction motor wheel 117, over another pulley 116B and then pass through the cage 160 below the support bar 167 (e.g., between the support bar 167 and the cross bar 166) toward the traction motor wheel 117 at the lower end L of the cableway 110. As best shown in FIGS. 2, 4 and 16, one or more (e.g., multiple) spacers 118 are arranged along the cableway 110 (e.g., coupled to the cables 113) to maintain a spacing between the traction cables 115. The spacer(s) 118 have a frame 118A, a first set of rollers 118B between which the traction cable(s) 115 that pass through the cage 160 pass, and a second set of rollers 118C between which the traction cable(s) 115 that couple to the support bar 167 pass. The frame 118A is sized to pass between the support bar 167 and the cross bar 166 of the cage 160 when the cage 160 travels past the spacer 118 along the cableway 110.

In one example, when the traction motor wheel 117 is operated in one direction (e.g., counterclockwise in FIG. 12) it pulls on the traction cable(s) 115 to decrease the length of the traction cable(s) 115 between the cage 160 and the traction motor wheel 117, thereby moving the cage 160 up the cableway 110 (e.g. toward the upper support frame 111U and landing zone UL). In another example, when the traction motor wheel 117 is operated in an opposite direction (e.g., clockwise in FIG. 12) it pushes on the traction cable(s) 115 to increase the length of the traction cable(s) 115 between the cage 160 and the traction motor wheel 117, thereby moving the cage 160 down the cableway 110 (e.g. away the upper support frame 111U and landing zone UL). Accordingly, the traction motor wheel 117 can be operated to raise or lower the cage 160 along the cableway 110. Advantageously, operating the traction motor wheel 117 in this manner, as opposed to operating a traditional winch on which the cable is wound, excludes the need for a large spool on which to wind the traction cable(s) 115.

Figure 13:
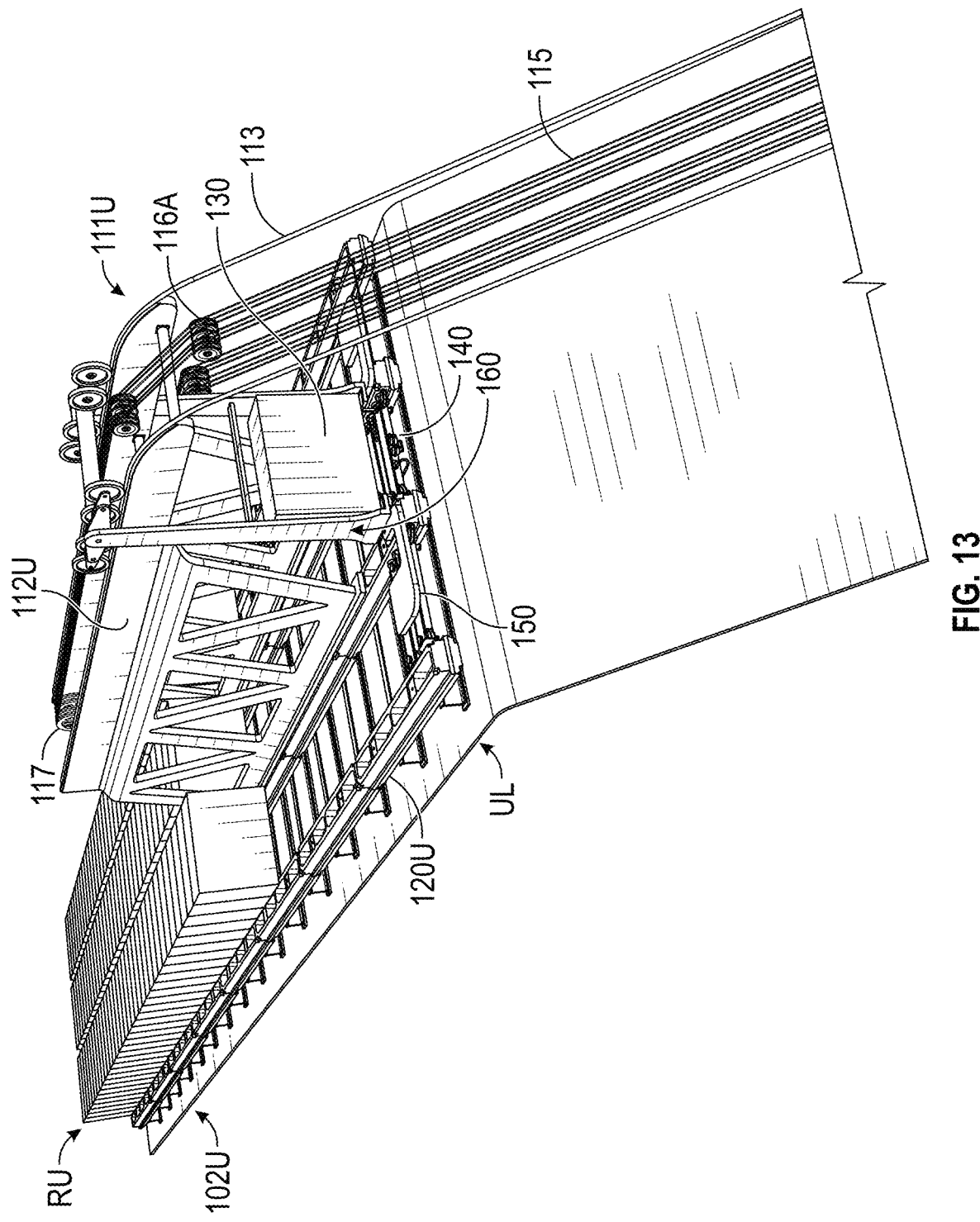

With reference to FIGS. 3, 12 and 13, to move the block 130 with the cage 160 from the upper end U to the lower end L, the trolley 140 supports the block 130 with the support pistons 146 in the extended position so that the block 130 is spaced above (e.g., spaced apart from and above) the beams or rails 120U of the row RU at or proximate the landing zone UL. The traction motor wheel 117 is operated to move the cage 160 (e.g., via the traction cables 115) toward the upper support frame 111U. Once the cage 160 reaches the upper support frame 111U, the pair of wheel assemblies 168 travel over (and are supported by) the pair of rails 112U (e.g., rigid rails 112U) of the upper support frame 111U. The cage 160 is sized so (e.g., the length of the pair of arms 162 is such) that the pair of flanges 164 pass between the block 130 and the beams or rails 120U. Advantageously, the gap 163 between the pair of flanges 164 is sized to allow the support pistons 146 to pass into the gap 163 so that the cage 160 is able to clear the support pistons 146 and be positioned so that the arms 162 extend alongside the sides of the block 130 (see FIG. 13). The trolley 140 can then be operated to actuate the support pistons 146 to move to the retracted position so that the block 130 is lowered onto platforms 165 (see FIG. 12) of the pair of flanges 164, while the cage 160 is supported by the pair of rails 112U (e.g., so that the block 130 is supported only by the flanges 164 of the cage 160). Optionally, the trolley 140 can be operated to move away from the cage 160 (e.g., move proximally along the row RU). The platforms 165 are bordered by raised edges 169 providing a channel into which the block 130 is lowered. The cage 160 (e.g., the platforms 165 and/or raised edges 169 of the flanges 164) advantageously facilitate the centering (e.g., self-centering) of the block 130 in the cage so that it supported on the platforms 165. That is, because the cage 160 hangs from the cables 113 and is lightweight, it can self-center itself relative to the block 130 when the block 130 is lowered onto the flanges 164 of the cage 160. Once the block 130 has been lowered into the cage 160 (e.g., lowered onto the flanges 164, such as onto the platforms 165 of the flanges 164), the traction motor wheel 117 is operated to move the cage 160 (via the traction cables 115) away from the upper support frame 11U and toward the lower end L.

The process for unloading a block 130 that is carried by the cage 160 from the lower end L to the upper end U is the same as described above but conducted in reverse. The trolley 140 would be positioned at the landing zone UL of the row RU to which the upper support frame 111U is coupled and have the support pistons 146 in the retracted position. The cage 160 carrying the block 130 would be moved to a position above the trolley 140 (e.g., by operating the traction motor wheel 117 to move the cage 160 toward the upper support frame 111U via the traction cables 115). Once the cage 160 is over the trolley 140, the support pistons 146 are actuated to move to the extended position to (extend into the gap 163 and) lift the block 130 off the flanges 164 (e.g., so that the block 130 is only supported by the support pistons 146 of the trolley 140). The cage 160 would then be operated to move away from the block 130 and the upper support frame 111U (e.g., back toward the lower end L). The trolley 140 can be operated to move the block 130 (which is spaced above the beams or rails 120U of the row RU) along the row RU to a storage location of the block storage 102U. Once at the storage location, the trolley 140 can then be operated to actuate the support pistons 146 to move to the retracted position so that the block 130 is lowered onto the pair of beams or rails 120U of the row RU (e.g., so that the block 130 is only supported by the beams or rails 120U). Optionally, the trolley 140 can be operated to move away from the block 130 (e.g., back to the landing zone UL to await another block 130 being moved from the lower end L to the upper end U).

Figure 5:
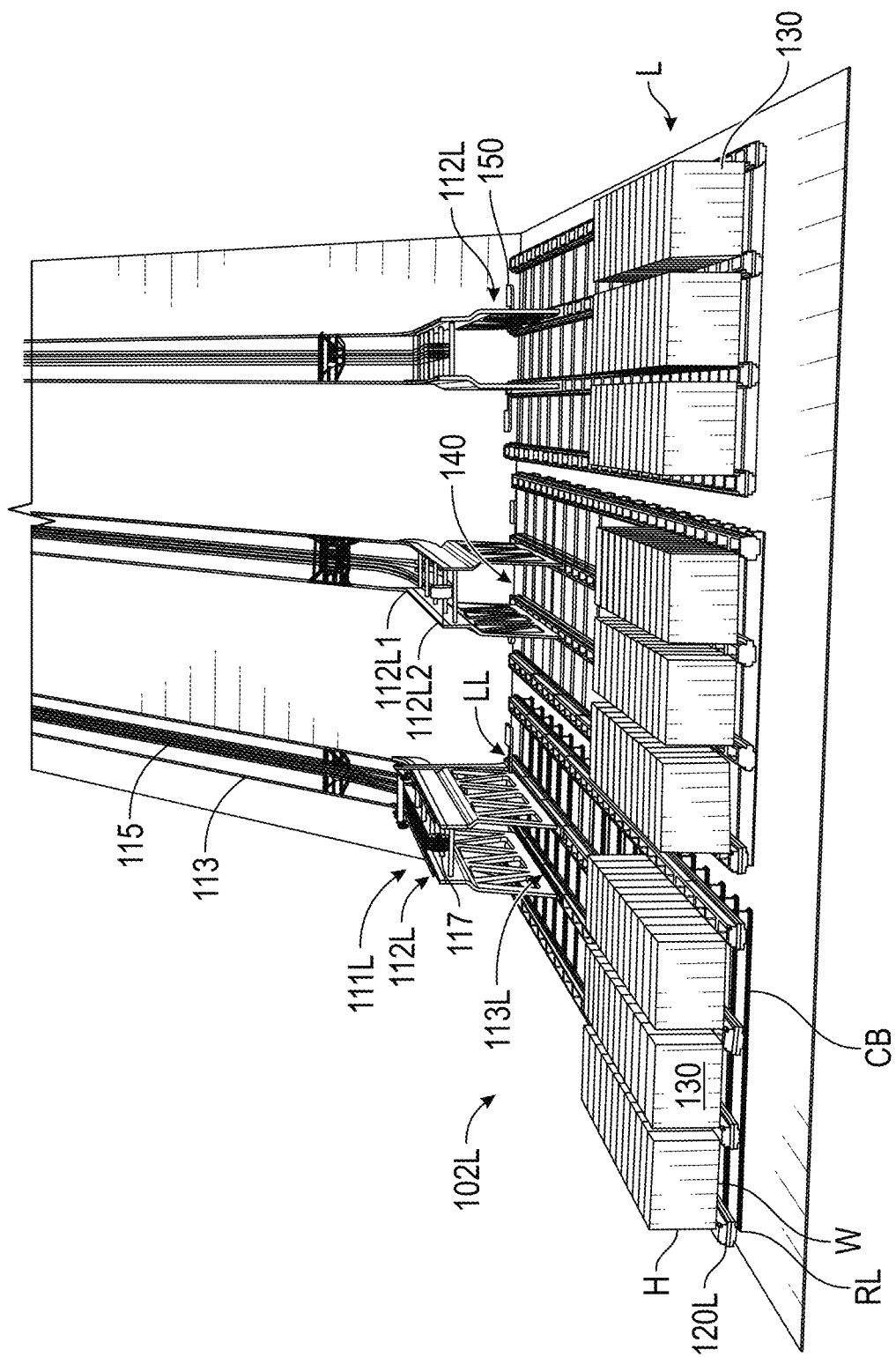
FIG. 5 is a schematic front view of a lower portion of the energy storage and delivery system in FIG. 1.

FIG. 5 shows the structure of the system 100 at the lower end L (e.g., valley floor). In one implementation, the block storage 102L has the same number of rows RL as the number of rows RU of the block storage 102U at the upper end U (see e.g., FIGS. 2 and 5). In another implementation, the block storage 102L can have a different number or rows RL than the number of rows RU of the block storage 102U at the upper end U. For example, the block storage 102U at the upper end U can have multiple rows RU (see e.g., FIGS. 2-3), and the block storage 102L at the lower end L can have a single row RL (e.g., where there is sufficient land at the lower end L to accommodate a single long row RL). As discussed previously, the system 100 can have one or more cableways 110, and for brevity the operation of a single cableway 110 is described.

The rows RL of the block storage 102L, similar to the rows RU of the block storage 102U, are defined by beams or rails 120L (e.g., made of steel) that are optionally supported on cross beams CB. A lower support frame 111L (which is identical to the upper support frame 111U, except as described herein) is coupled to a row RL and has an opening 113L that allows the block(s) 130 pass through the lower support frame 111L along the row RL toward the landing zone LL (e.g., lower landing zone) at the lower end L. Rotator platform(s) 150 are pivotally coupled to the beams or rails 120L at or proximate the landing zone LL. The rotator platform(s) 150 and trolley(s) 140 operate in the same manner described above in connection with the upper end U of the system 100. In implementations where the block storage 102L has a single row RL, the rotator platform 150 can be excluded.

The lower support frame 111L differs from the upper support frame 111U in that the curved distal portion 112L1 of the pair of rails 112L of the lower support frame 111L is curved in a different direction (e.g., is concave adjacent the cables 113) than the curved distal portion 112U1 of the pair of rails 112U of the upper support frame 111U (which is convex adjacent the cables 113). Similar to the description above, the cables 113 are coupled (e.g., fixedly coupled) to the lower support frame 111L (e.g., to the rails 112L, such as the linear portion 112L2 of the pair of rails 112L) or to a counterweight. A traction motor wheel 117 is rotatably coupled to the lower support frame 111L and couples to the traction cables 115. As discussed above, the cage 160 is moved by the traction motor wheel(s) 117 (on both the upper support frame 111U and the lower support frame 111L, which work together and rotate in the same direction, such as simultaneously), and the traction cables 115 define a (continuous, closed) loop that extends around the traction motor wheel 117 of the upper support frame 111U and the traction motor wheel 117 of the lower support frame 111L. The structure and process for lifting a block 130 from the landing zone LL with the cage 160 to move it to the upper end U is identical to that described above for lifting a block 130 from the landing zone UL with the cage 160 to move it to the lower end L. Similarly, the structure and process for delivering a block 130 with the cage 160 to the landing zone LL for storage in the block storage 102L is identical to that described above for delivering a block 130 with the cage 160 to the landing zone UL for storage in the block storage 102U.

Figure 6:
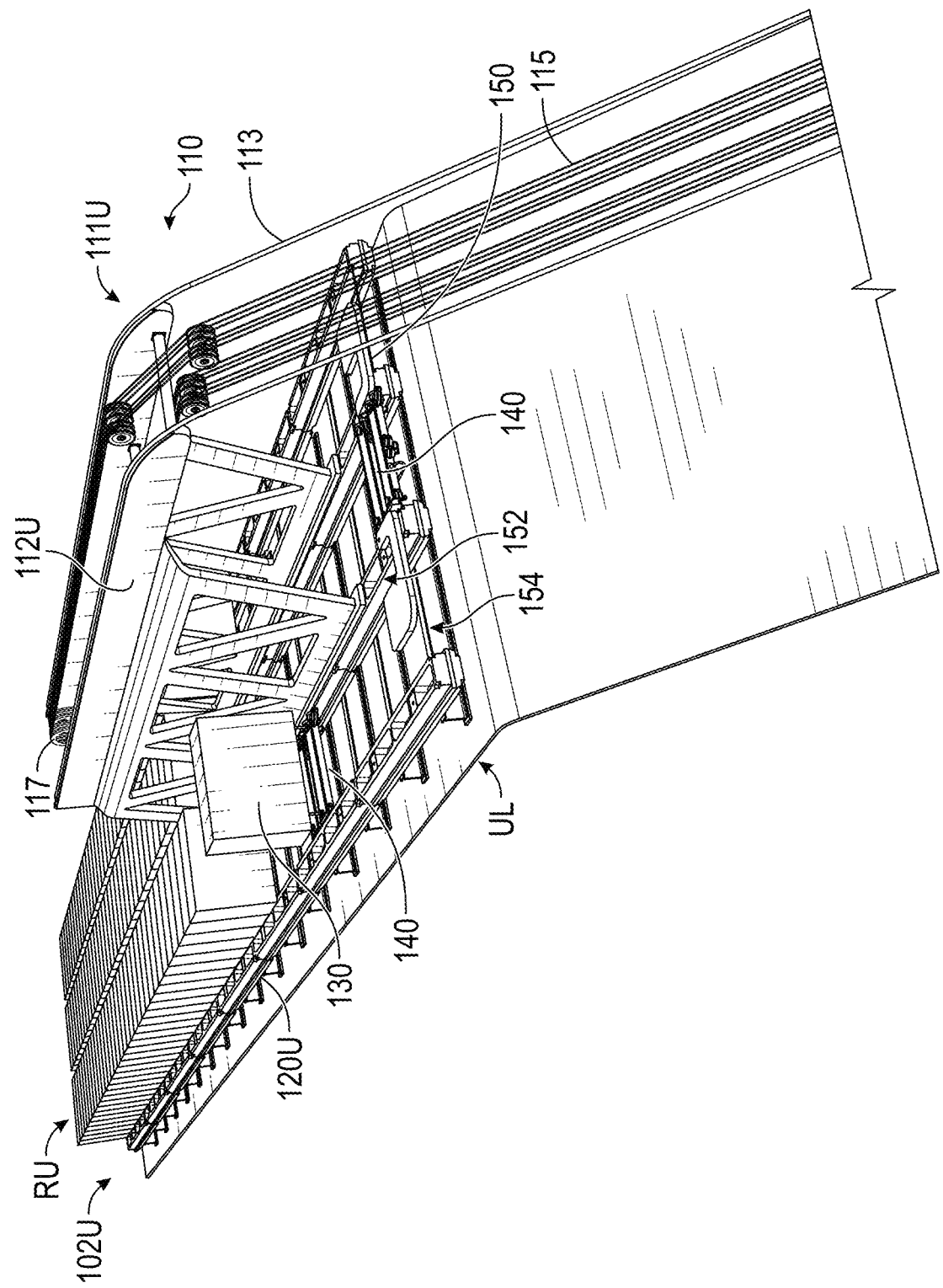
FIGS. 6-15 show a schematic perspective view of the upper portion of an energy storage and delivery system during operation, showing a sequence for moving a block along a cable way of the system.
Figure 7:
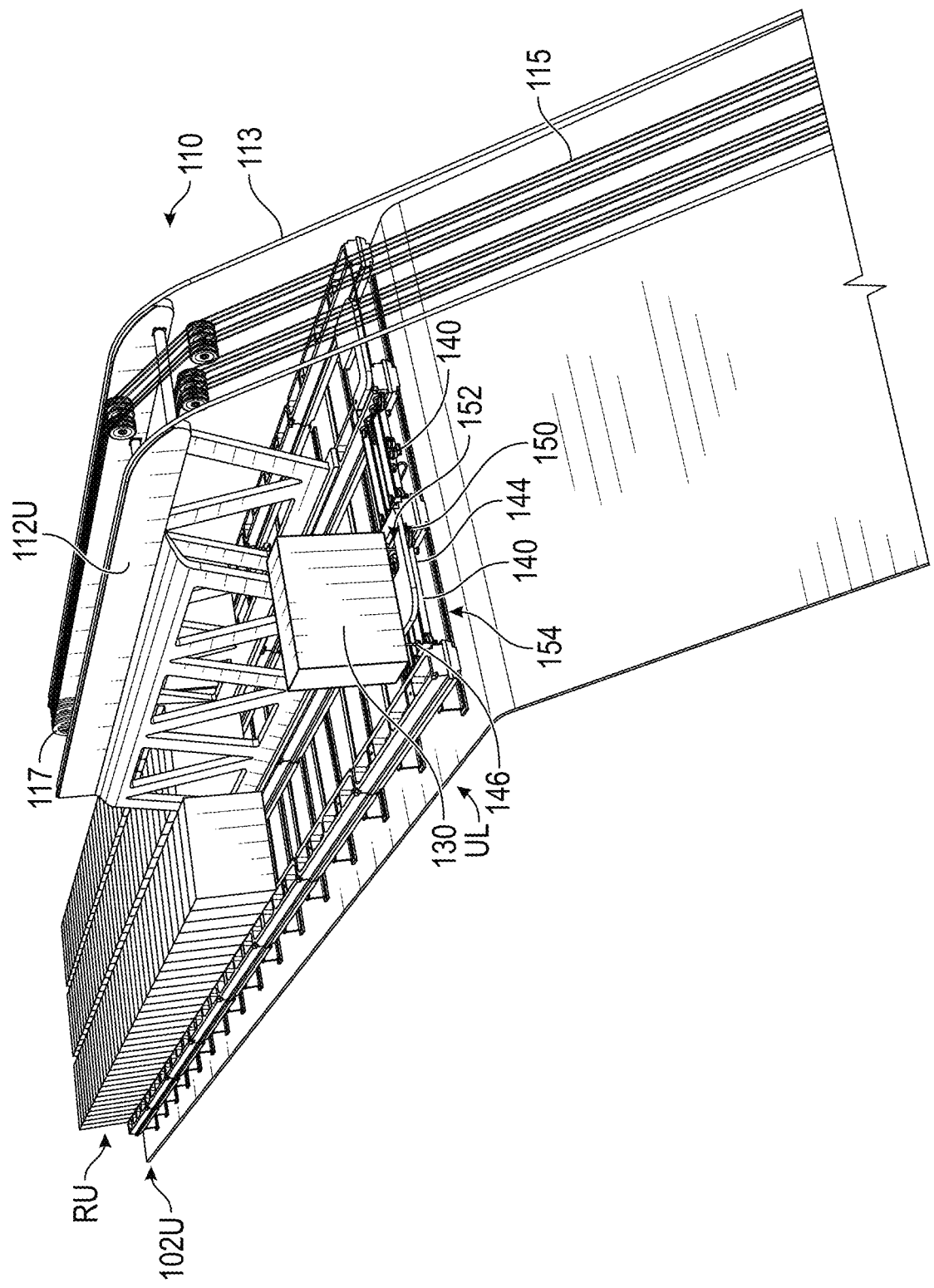
Figure 8:
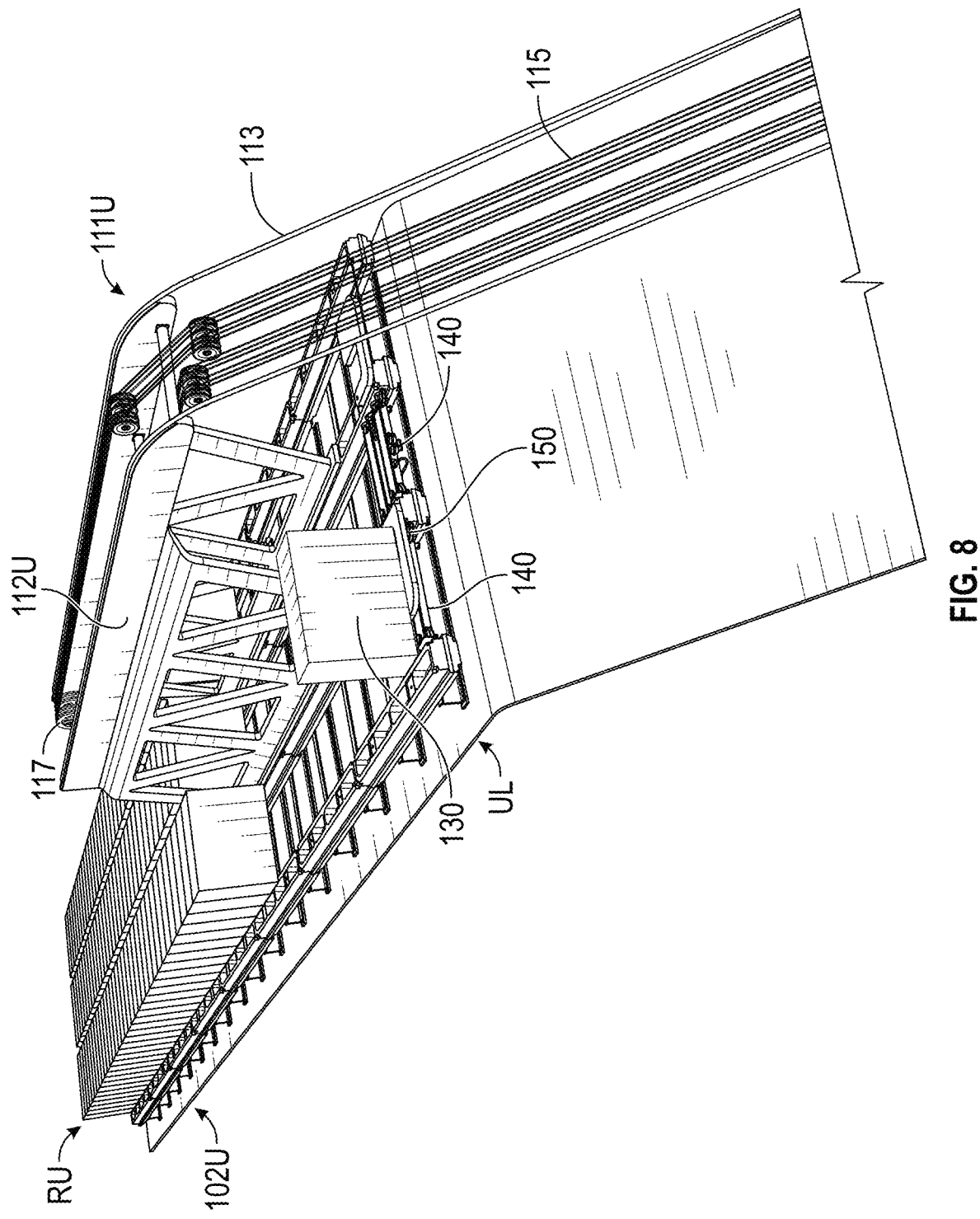
Figure 9:
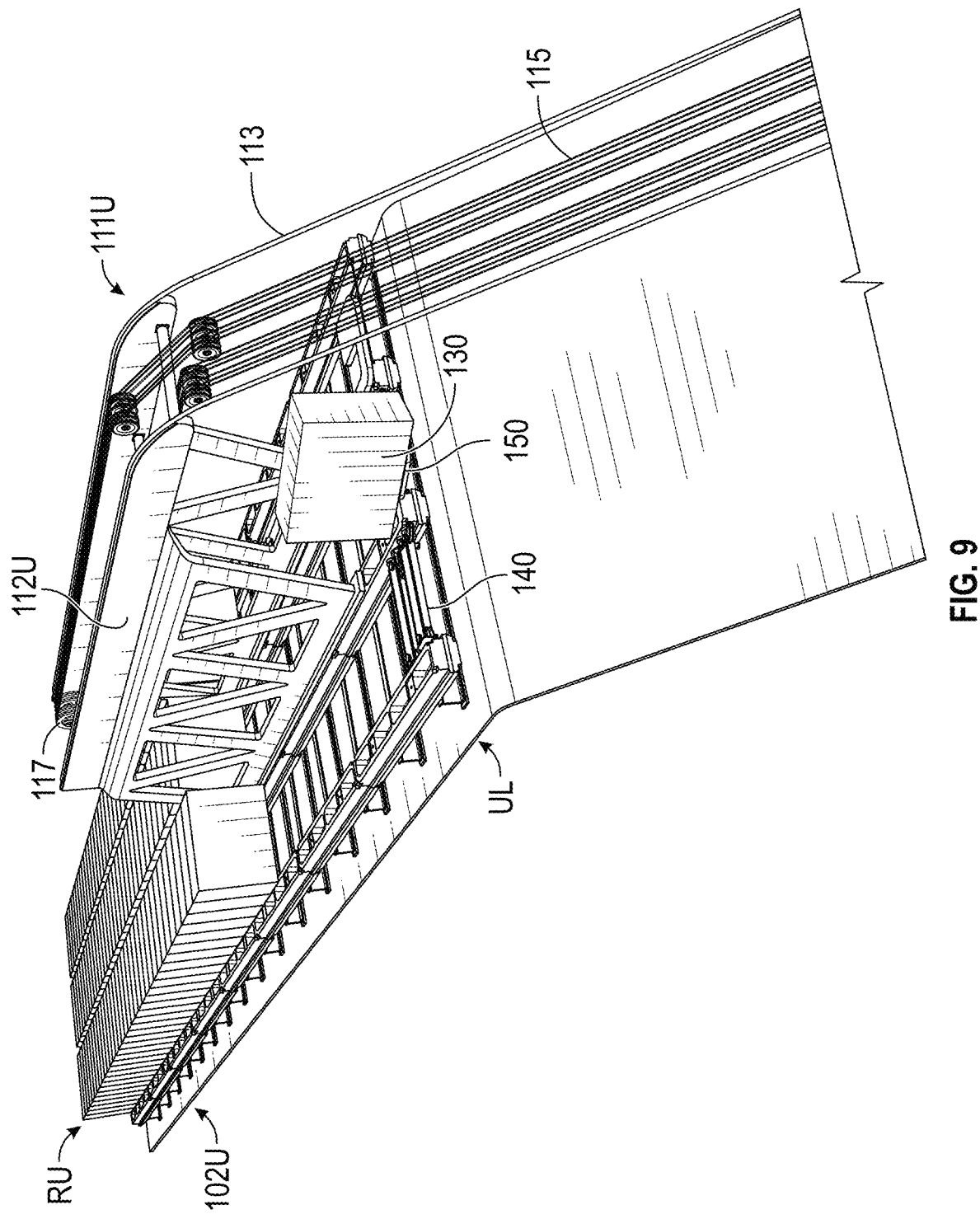
Figure 10:
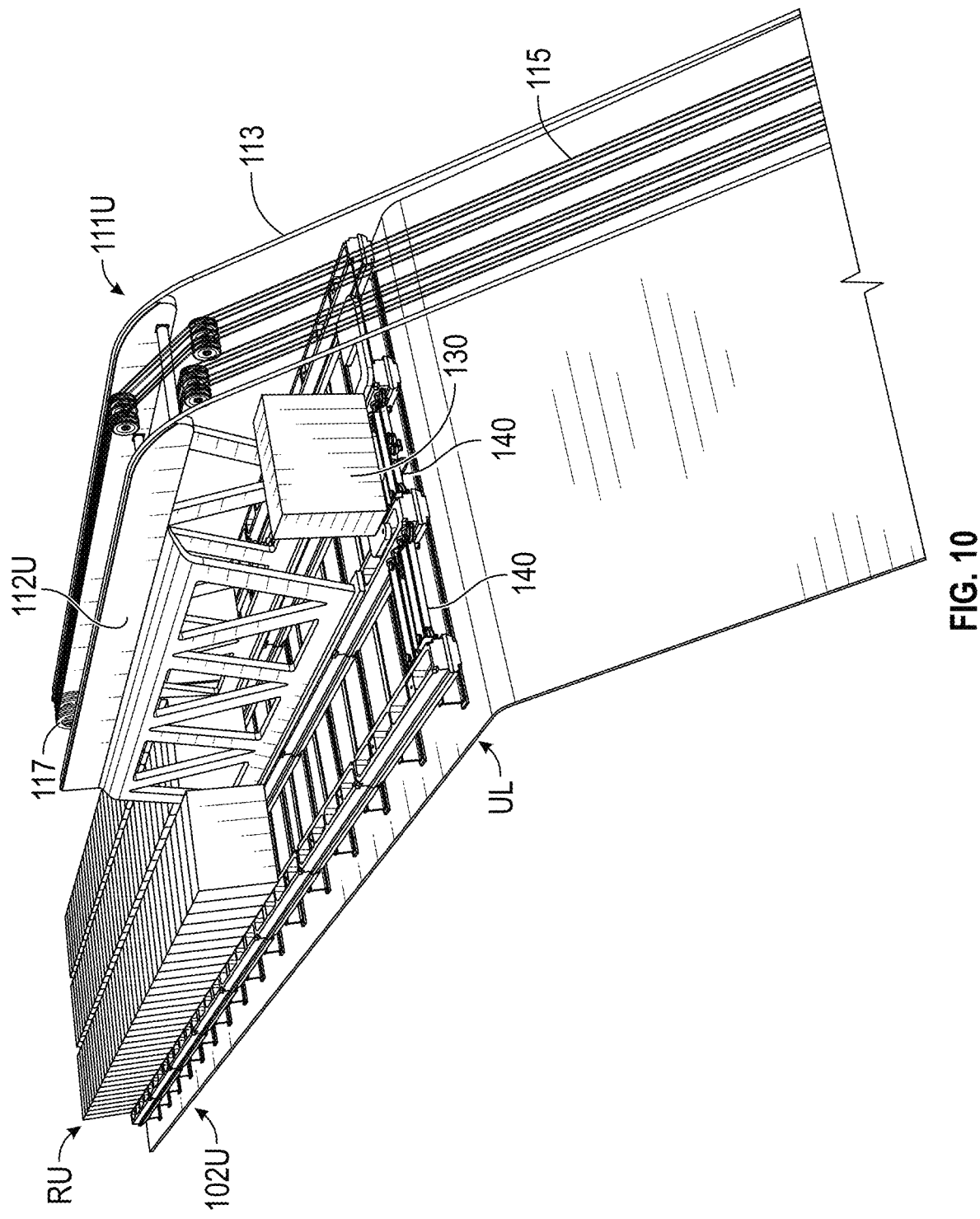
Figure 11:
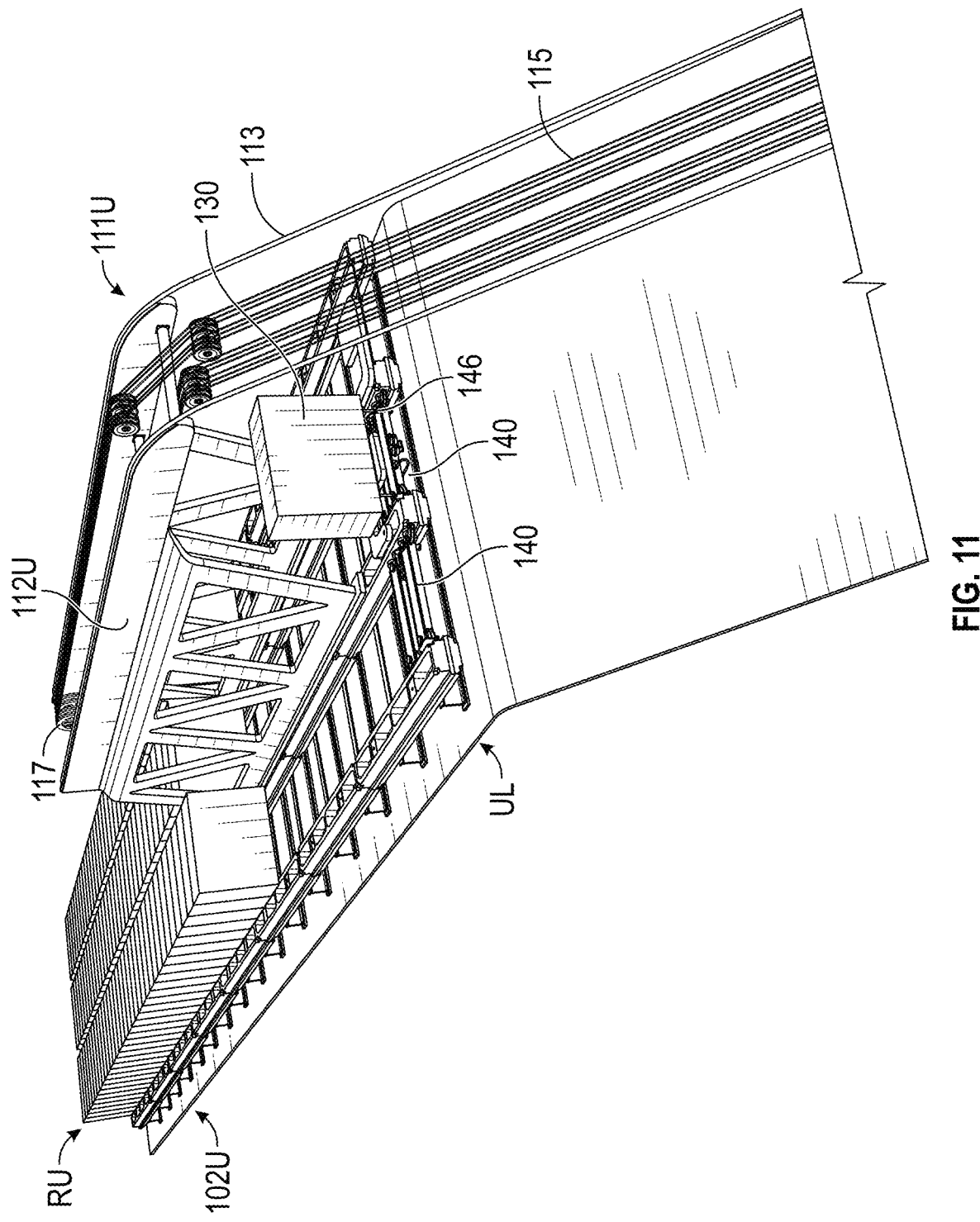
Figure 14:
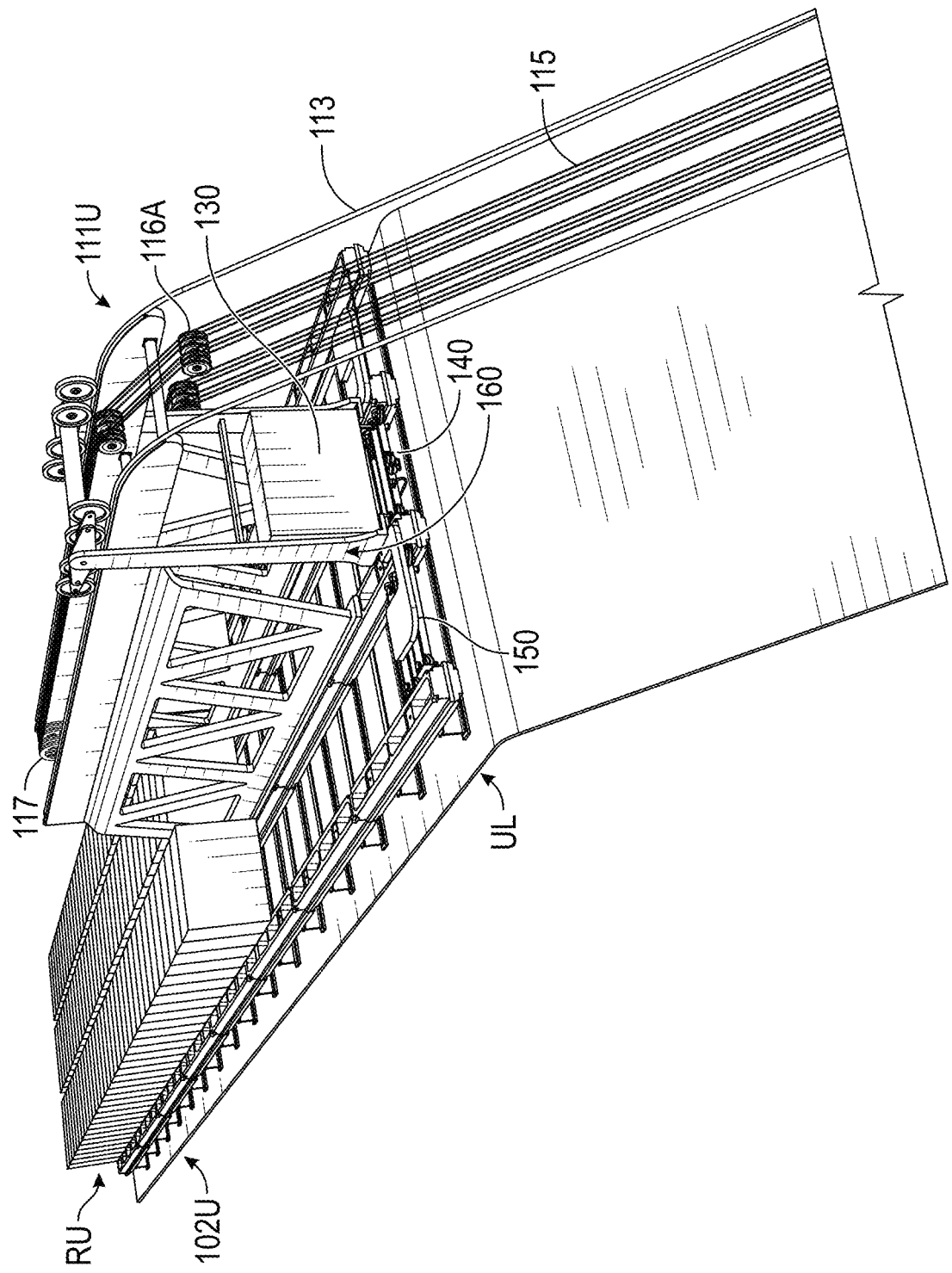
Figure 15:
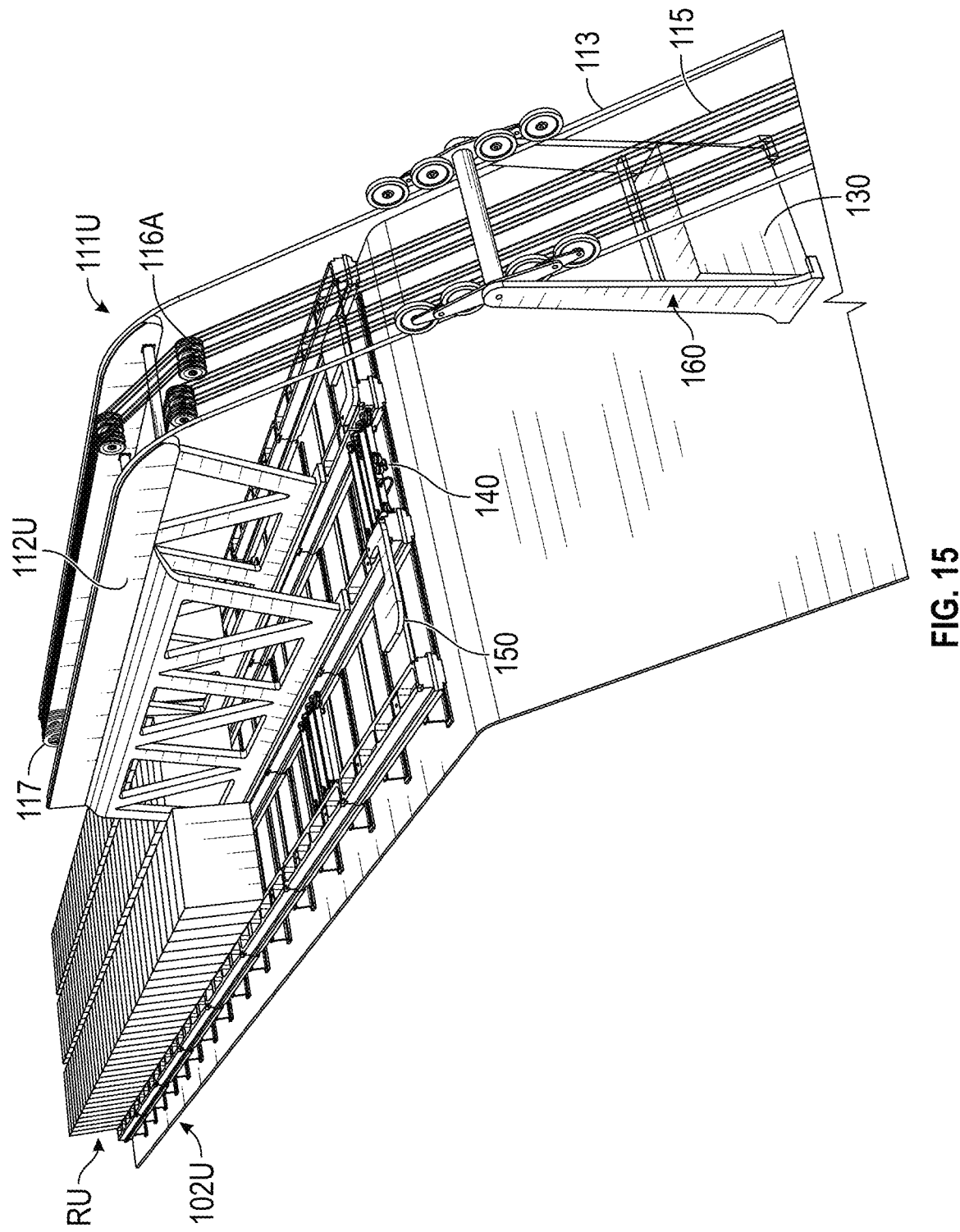

FIGS. 6-15 show a sequence of operation of the system 100 to move a block 130 from a row RU of the block storage 102U to the landing zone UL for pick-up by the cage 160 for moving the block 130 from the upper end U to the lower end L. FIG. 6 shows a block 130 supported by a trolley 140 (e.g., with the support pistons 146 in the extended position to have the block 130 spaced above the rails or beams 120U) moving along the row RU toward the landing zone UL. FIG. 6 also shows a rotator platform 150 in the first (or deployed) position where the rotator platform 150 extends transverse (e.g., perpendicular) to a length of a row RU. FIG. 7 shows the trolley 140 positioned under the rotator platform 150 (in the first or deployed position) and the support pistons 146 extending into the gap 154 and cutout 152 of the rotator platform 150. The support pistons 146 are in the extended position, so the block 130 is spaced above the rotator platform 150, which is spaced above the frame 44 of the trolley 140. FIG. 8 shows the block 130 on top of the rotator platform 150 (e.g., after the support pistons 146 have been actuated to move to the retracted position to lower the block 130 onto the rotator platform 150). FIG. 9 shows the rotator platform 150 pivoting toward a row RU aligned with the upper support frame 111U. FIG. 10 shows the rotator platform 150 once it has pivoted to the row RU aligned with the upper support frame 111U (e.g., so it extends transverse or perpendicular to a length of the row RU aligned with the upper support frame 11U). A trolley 140 is positioned under the rotator platform 150 (e.g., after or before the rotator platform 50 has pivoted to the row RU aligned with the upper support frame 11U) with its support pistons 146 in the retracted position. FIG. 11 shows the block 130 lifted off the rotator platform 150 by the support pistons 146 of the trolley 140 that are actuated to move to the extended position. FIG. 12 shows the rotator platform 150 rotated out of the row RU that is aligned with the upper support frame 111U, and the cage 160 approaching the upper support frame 111U and the landing zone UL. FIG. 13 shows the cage 160 once it has traveled to the landing zone UL and is disposed about the block 130, with the block 130 still supported by the support pistons 146 of the trolley 140, the support pistons 146 being in the extended position that allows the flanges 164 of the cage 160 to pass between the beams or rails 120U and the (edges of the) block 130. FIG. 14 shows the cage 160 at the landing zone UL after the support pistons 146 of the trolley 140 are actuated to lower the block 130 onto the flanges 164 of the cage 160 so that the block 130 is supported only by the cage 160 (e.g., by the flanges 164 of the cage 160). FIG. 15 shows the cage 160 carrying the block 130 moving away from the upper support frame 111U and the upper end U and directed toward the lower end L of the system 100.

The inverse of the sequence in FIGS. 6-15 (e.g., starting with FIG. 15, then moving to FIG. 14, then to FIG. 13, etc. until reach FIG. 6) provides a sequence of operation of the system 100 to deliver a block 130 (from the lower end L) to a row RU of the block storage 102U using the cage 160. Additionally, the sequence shown in FIGS. 6-15, and the inverse sequence, would also be the same to deliver a block to the lower end L with the cage 160 (from the upper end U), or to pick-up a block 130 from the lower end L to move it to the upper end U.

With continued reference to FIGS. 1-18, the system 100 can include a motor-generator. The motor-generator can be located at the upper end U and/or at the lower end L. The motor-generator can be operatively coupled to the traction motor wheel 117 (e.g., of the upper support frame 111U and/or of the lower support frame 111L). In operation, when the traction motor wheel 117 is operated to move the cage 160 from the lower end L to the upper end U, the motor-generator (e.g., operates as an electric motor and) provides power to the traction motor wheel 117 to raise the cage 160 (whether carrying a block 130 or empty). When the block 130 is lowered from the upper end U to the lower end L, the cage 160 is moved by the traction motor wheel 117 (via power provided by the motor-generator) away from the upper support frame 111U, but once it clears the upper support frame 111U, the cage 160 carrying the block 130 travels at least partially under the force of gravity (e.g., the traction motor wheel 117 is not operated to input motion to the traction cables 115 to move the cage 160 toward the lower end L, but the block 130 does not move toward the lower end L in free fall). As the cage 160 carrying the block 130 travels toward the lower end L, the traction cables 115 rotate the traction motor wheel 117, which generates electricity via the motor-generator that is operatively coupled to the traction motor wheel 117.

As discussed above, the system 100 can have one or more (e.g., multiple) cableways 10, each operable to move blocks 130 one at a time between the lower end L and the upper end U or vice versa. In some implementations, shown in FIGS. 1-5, the system 100 has three cableways 110 (e.g., cableways 110A, 110B, 110C). In other implementations, the system 100 can have more than three cableways 110 (e.g., any multiple of two or three cableways, such as four, six, eight, ten, fifteen, twenty, thirty, etc.). Advantageously, the cableway(s) 110 of the system 100 are operated (e.g., controlled via an algorithm implemented by one or more computer processors) to provide continuous power generation. In one example, for every cableway 110 operated to raise an empty cage 160 to the upper end U to pick-up a block 130, there are two cableways 110 operated to move blocks 130 toward the lower end L to generate electricity. For example, once the cage 160 of a first cableway 110A is halfway down the valley V toward the lower end L, the cage 160 of a second cableway 110B can be departing the upper support frame 111U carrying a block 130 and moving toward the lower end L. At the same time (e.g., when the cage 160 of a first cableway 110A is halfway down the valley V toward the lower end L), a cage 160 of a third cableway 110C can be departing from the lower end L empty and headed to the upper end U to pick-up a block 130. The empty cage 160 can travel faster (e.g., at twice the speed) than the cage 160 carrying a block 130 toward the lower end L. Other operating sequences can be implemented when the system 100 has a plurality of cableways 110 to provide continuous power generation. For example, in another implementation, for every cage 160 moving a block 130 from the upper end U to the lower end L, there is an empty cage 160 moving from the lower end L to the upper end U.

Figure 19A:
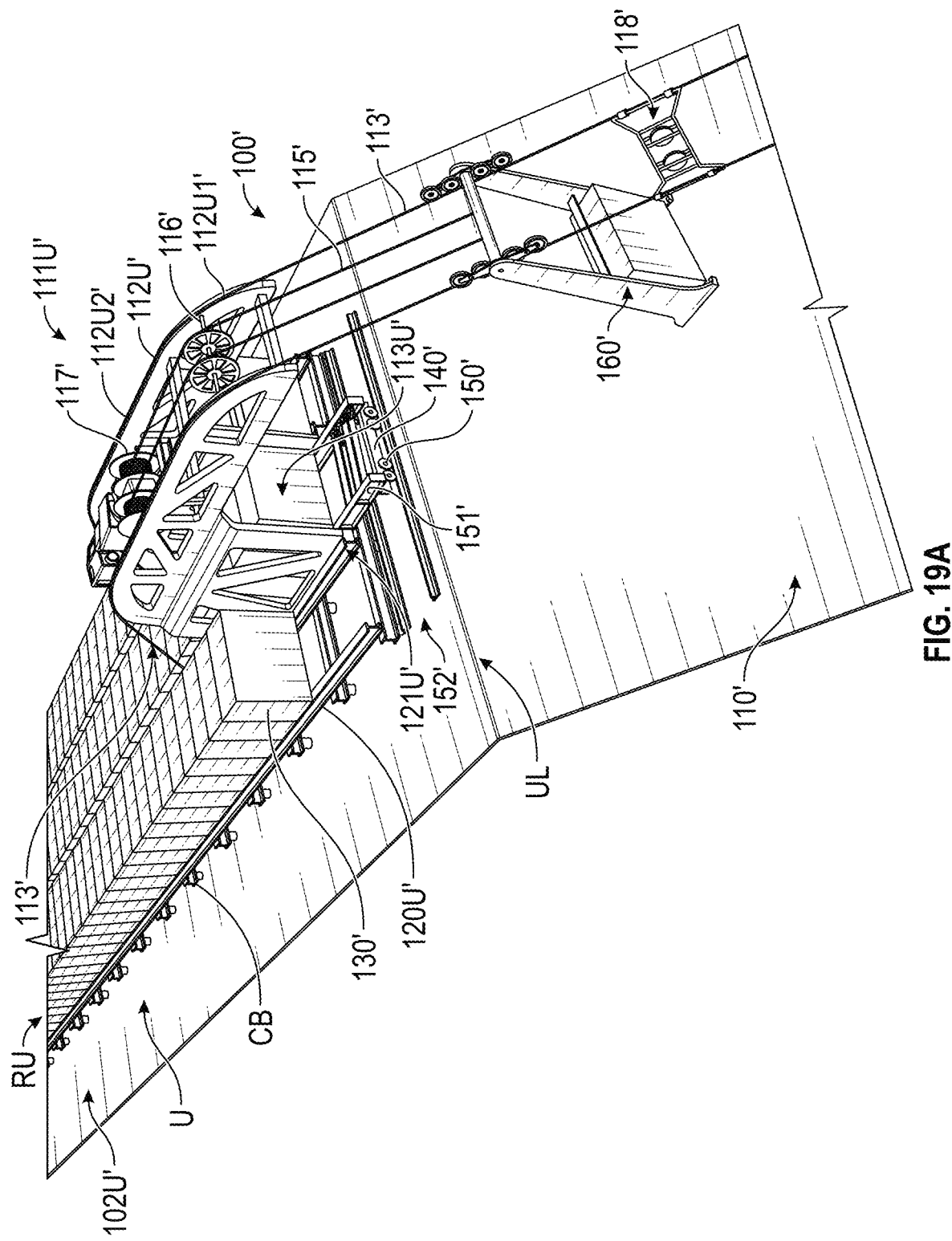
FIGS. 19A-19K show a schematic perspective view of an upper portion of an energy storage and delivery system during operation, showing a sequence for moving a block along a cable way of the system.
Figure 19B:
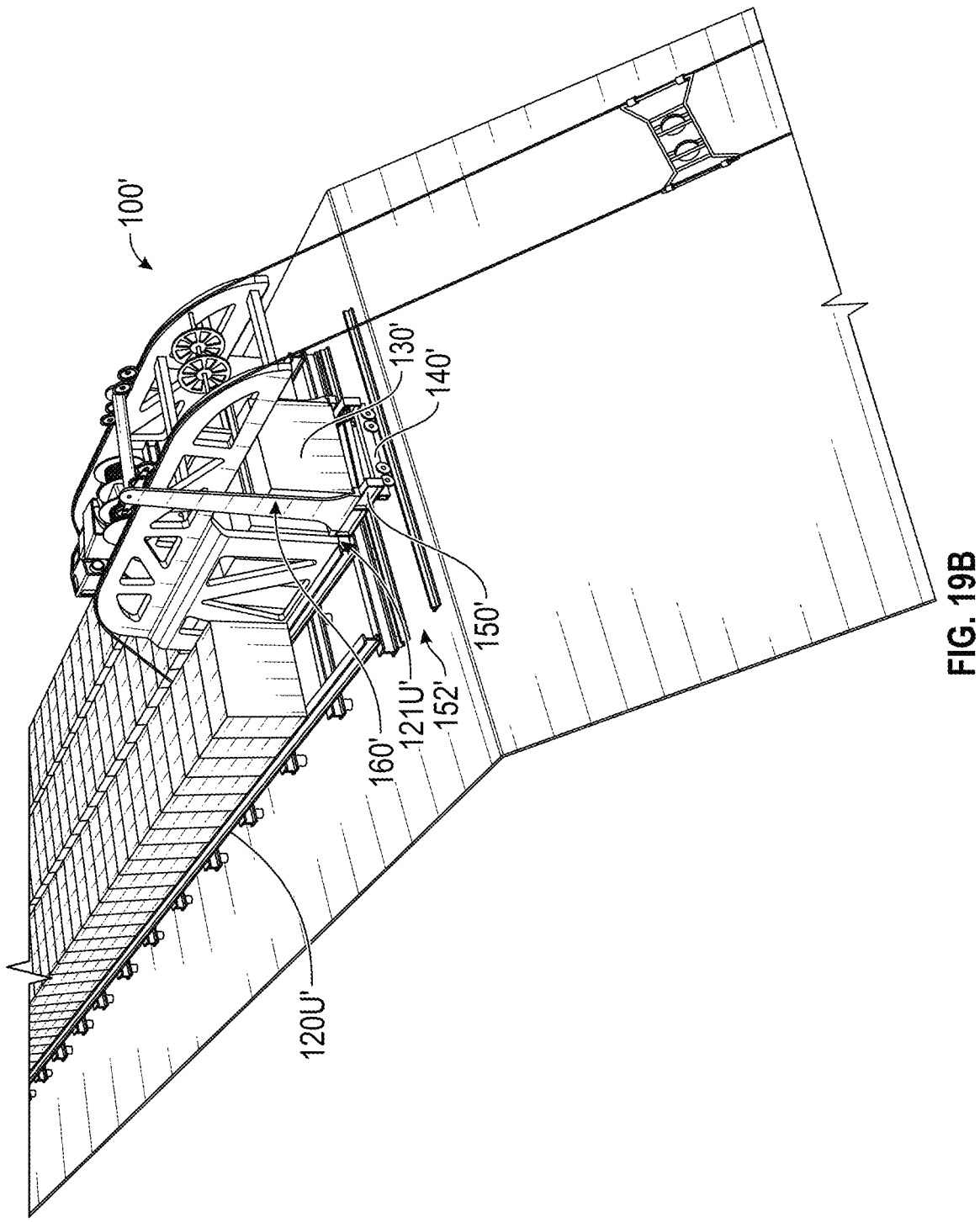
Figure 19C:
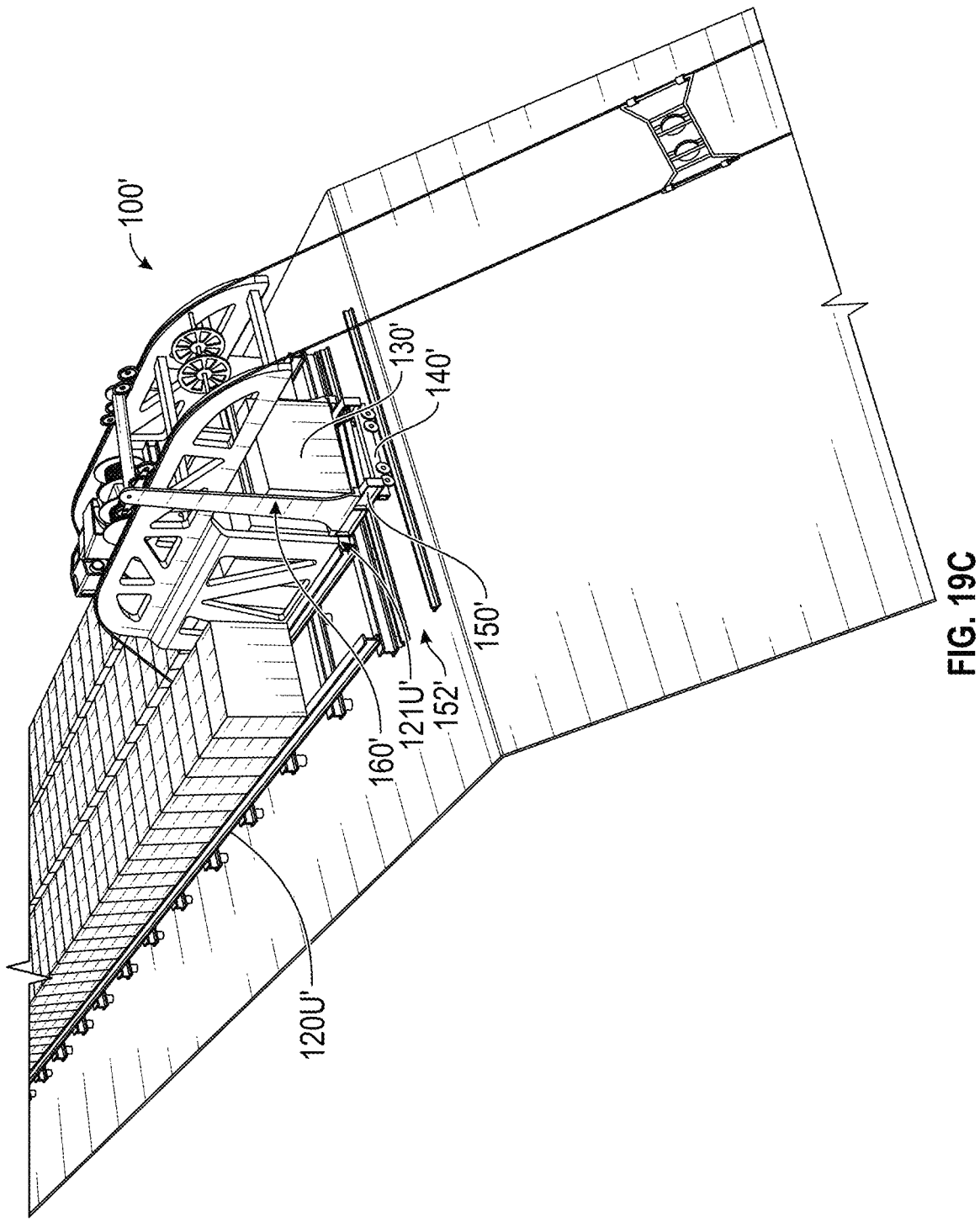
Figure 19D:
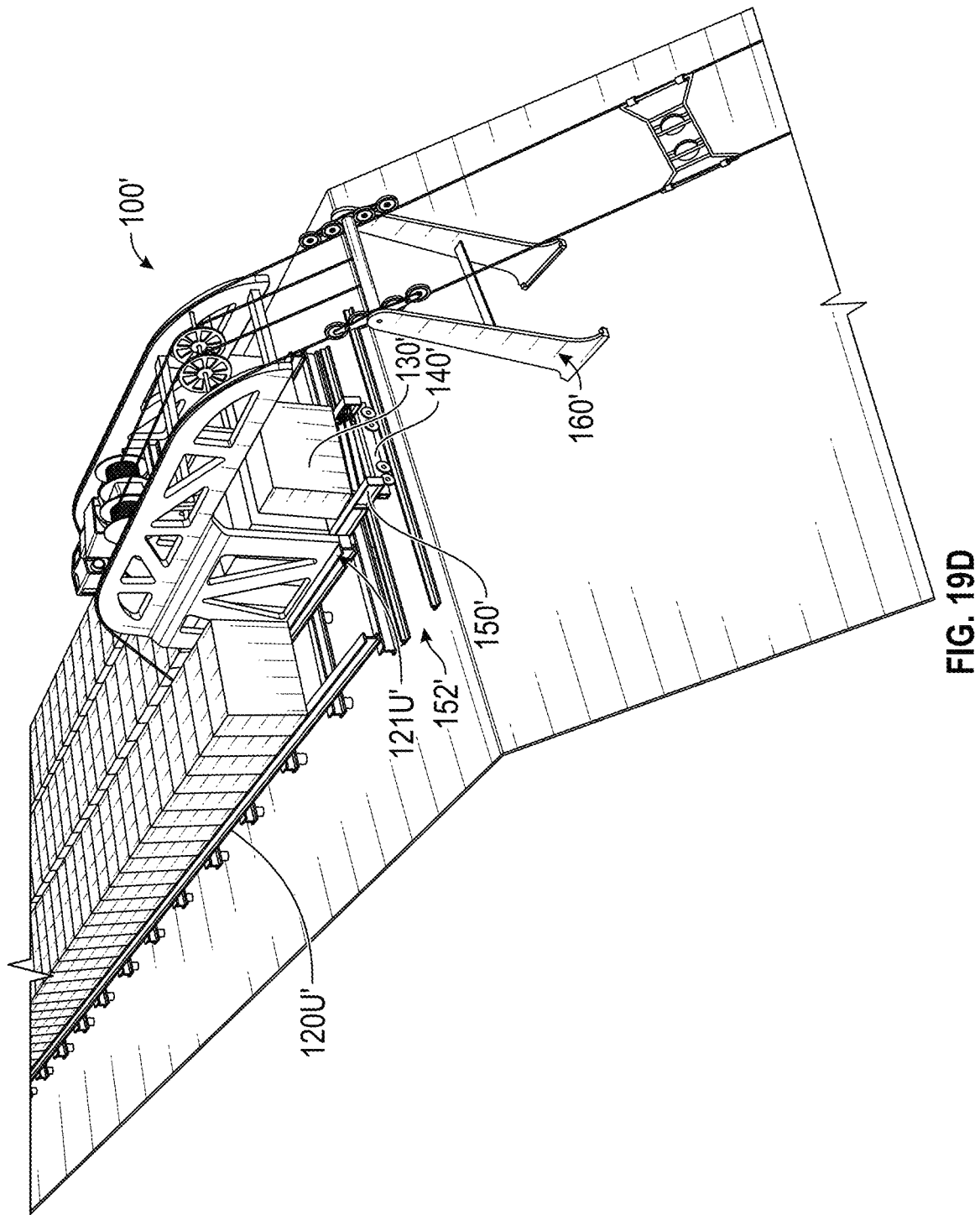
Figure 19E:
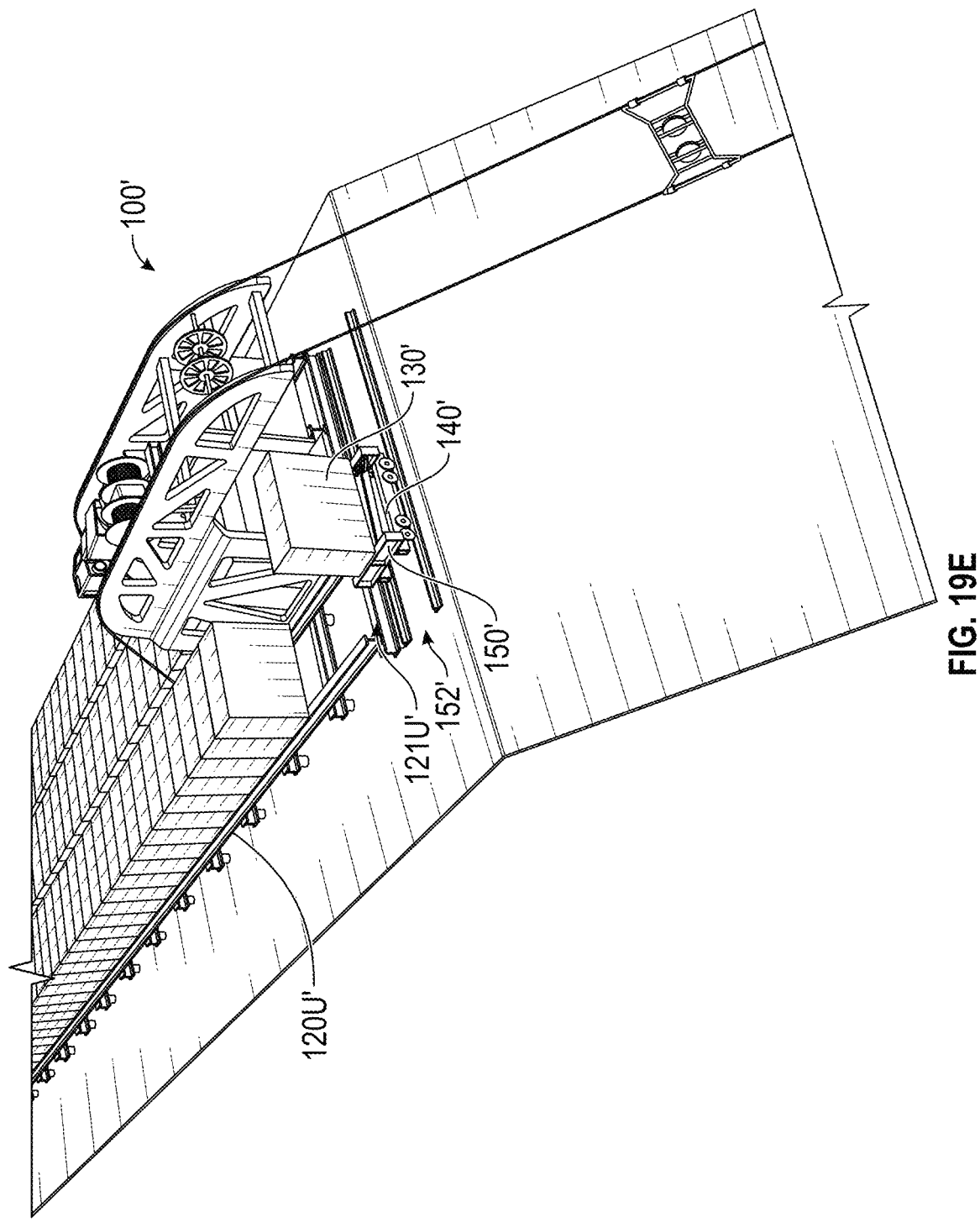
Figure 19F:
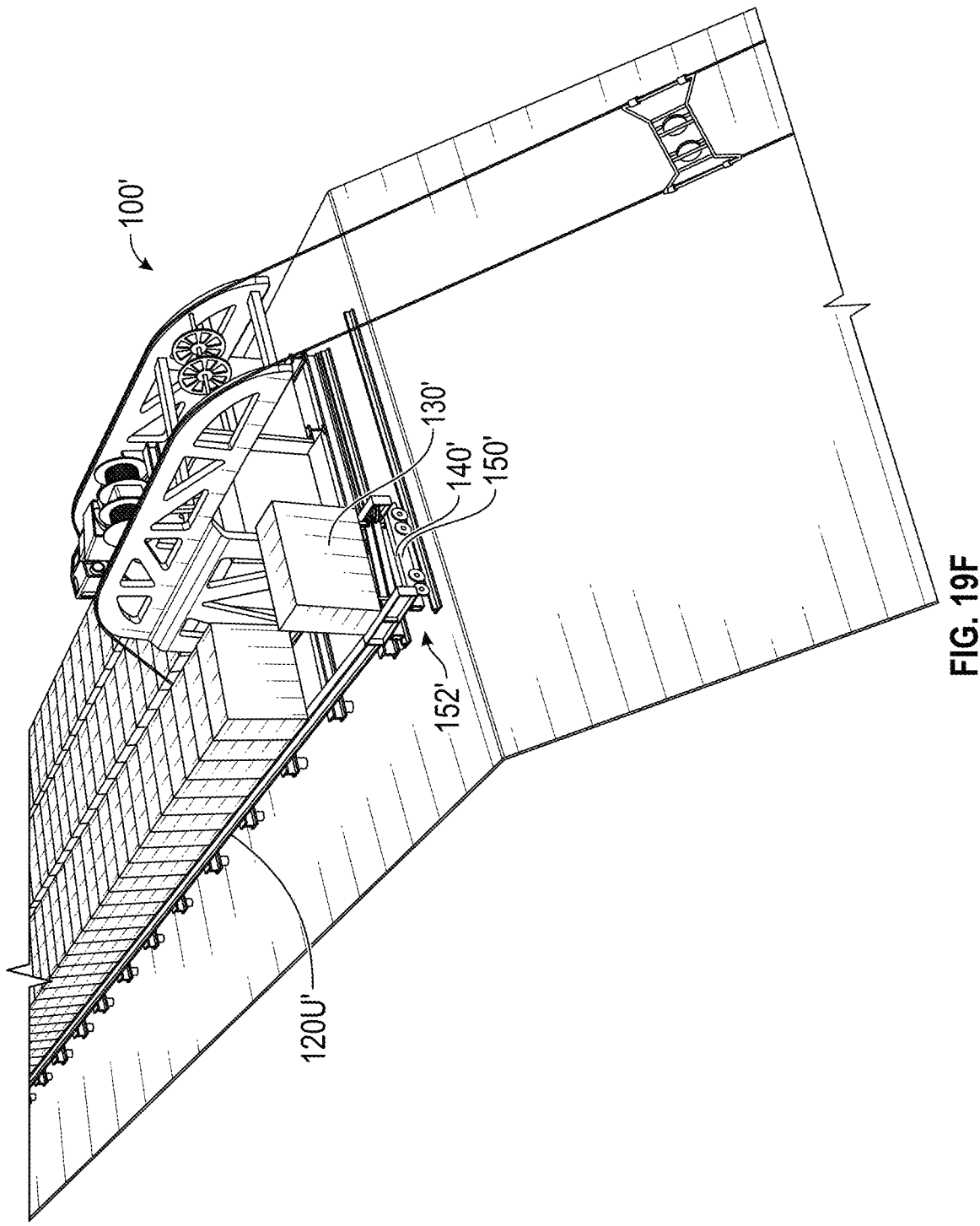
Figure 19G:
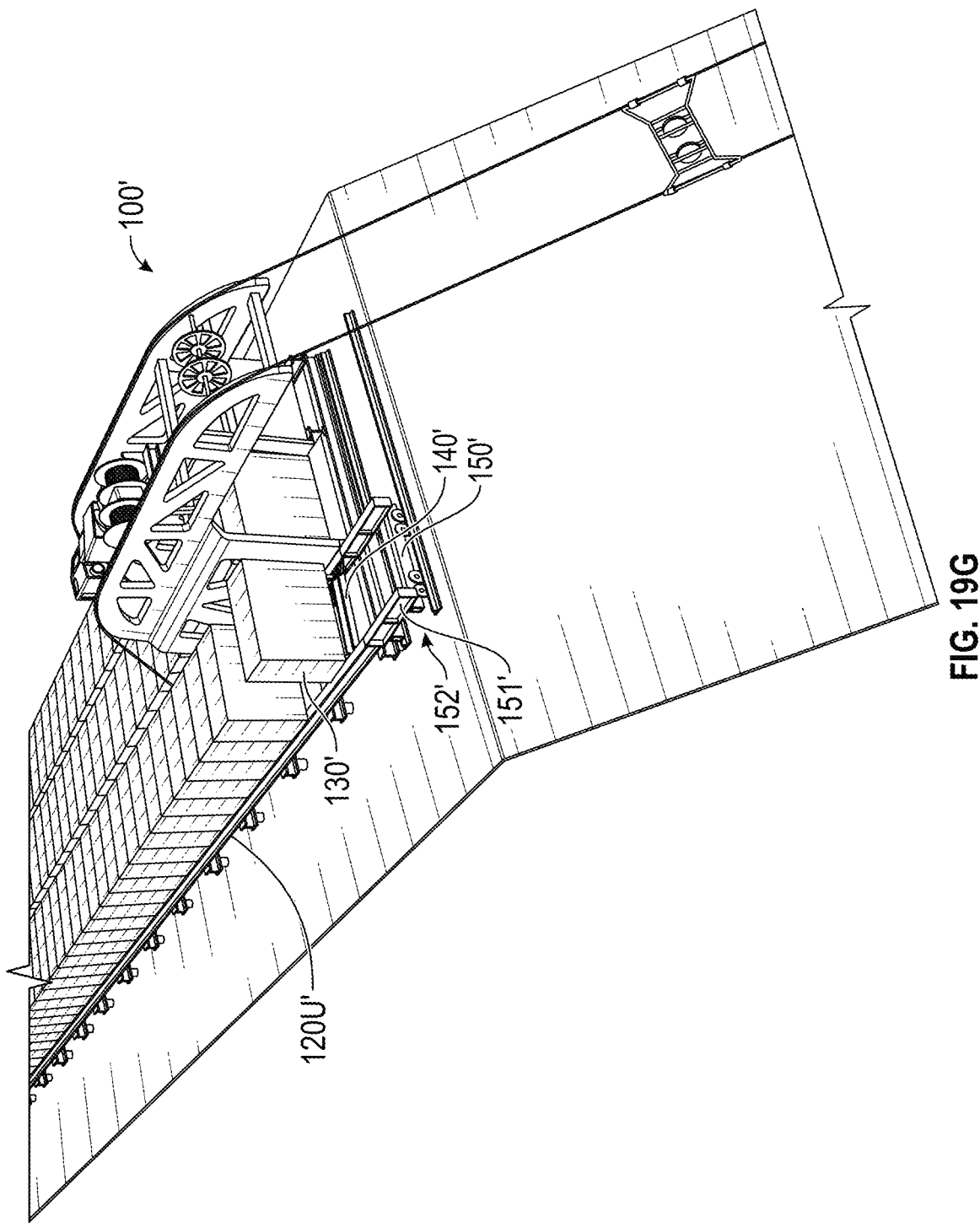
Figure 19H:
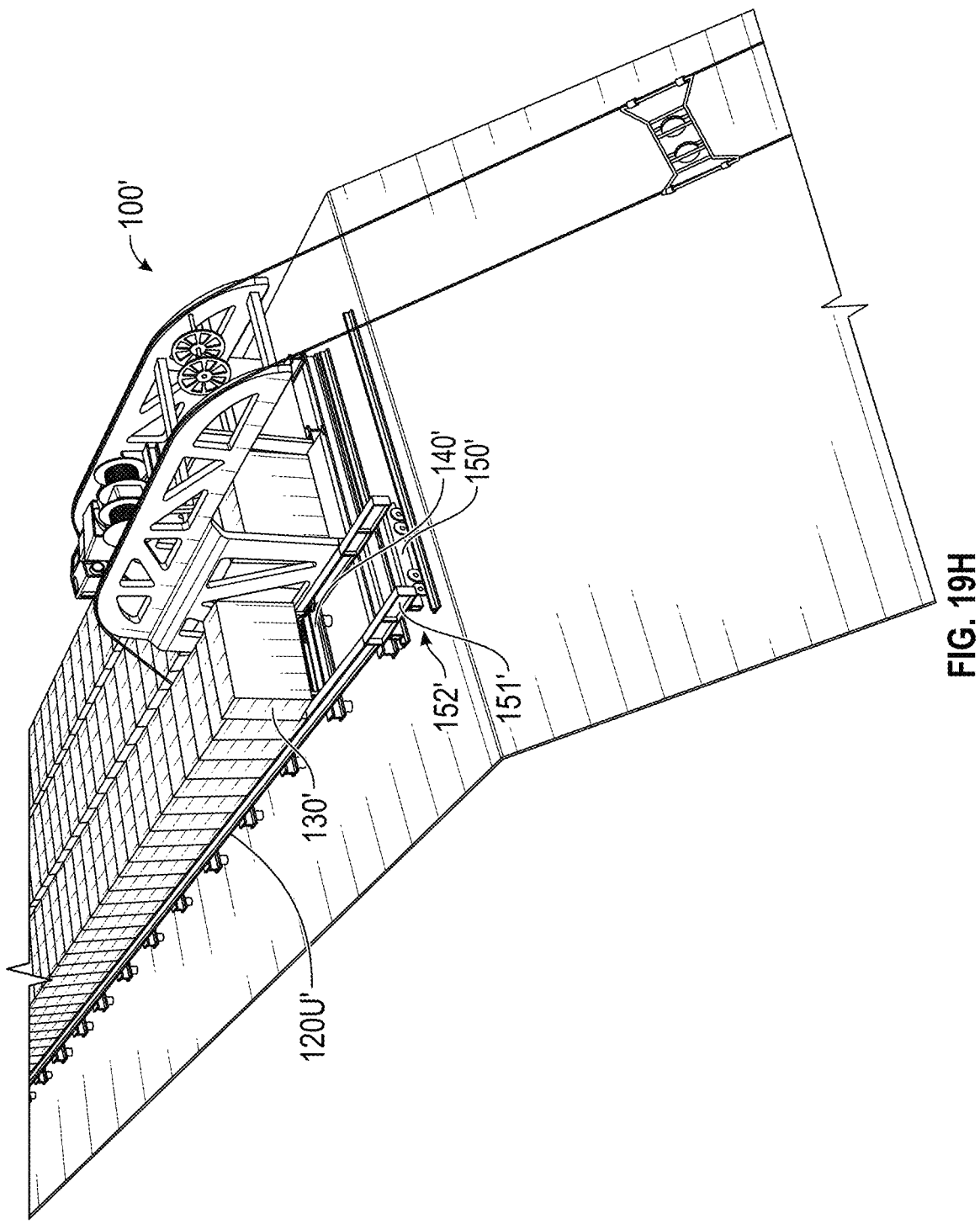
Figure 19I:
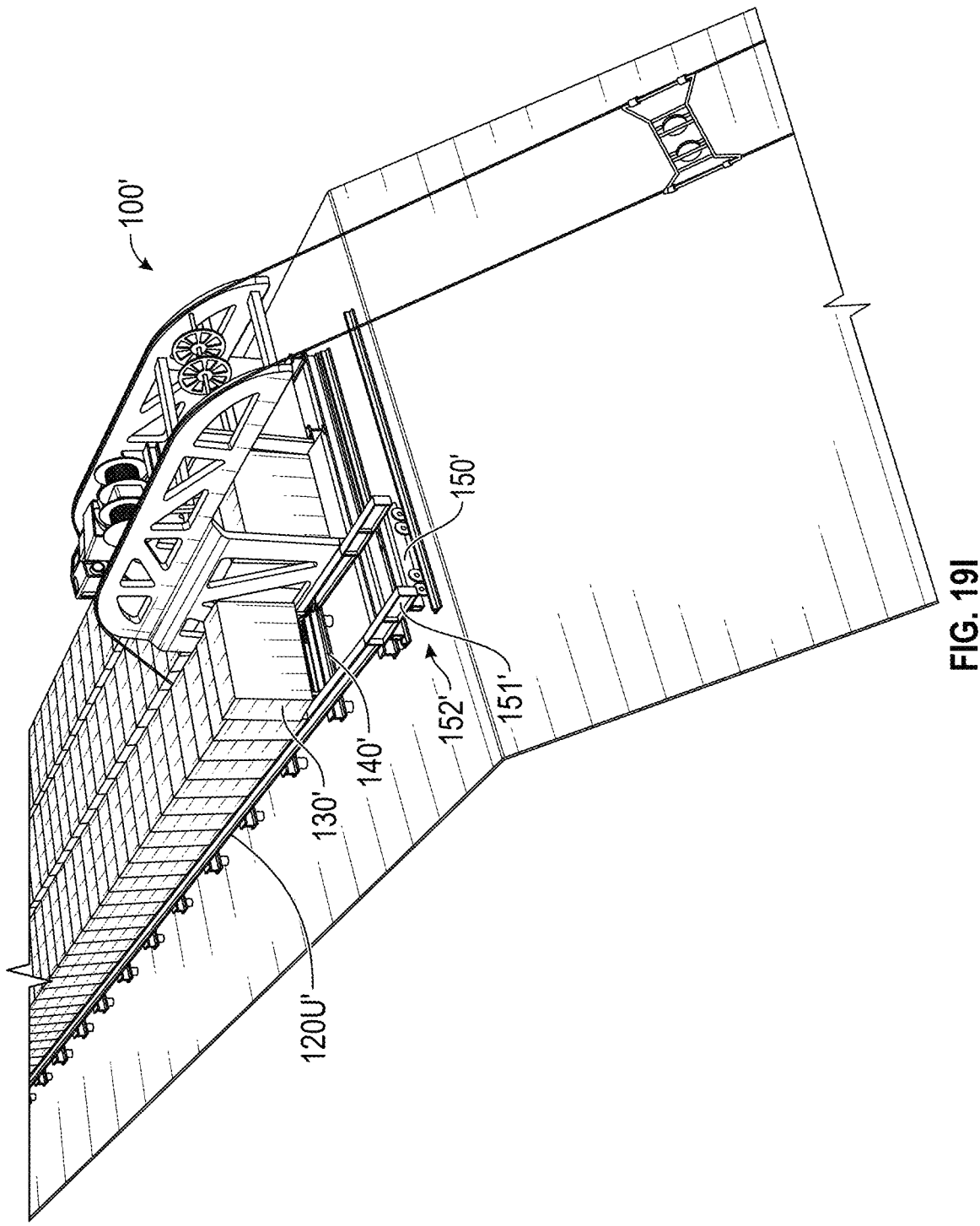
Figure 19J:
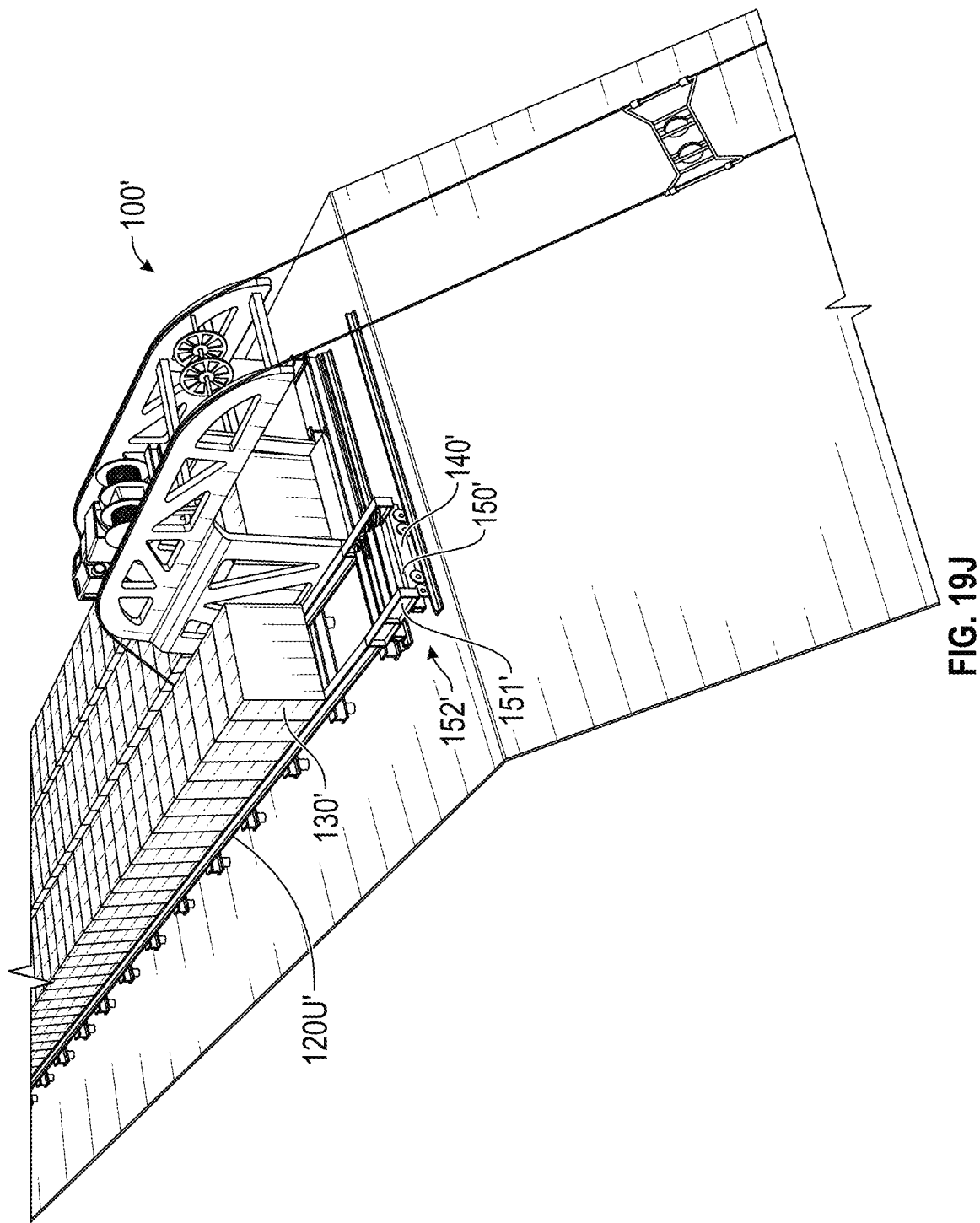
Figure 19K:
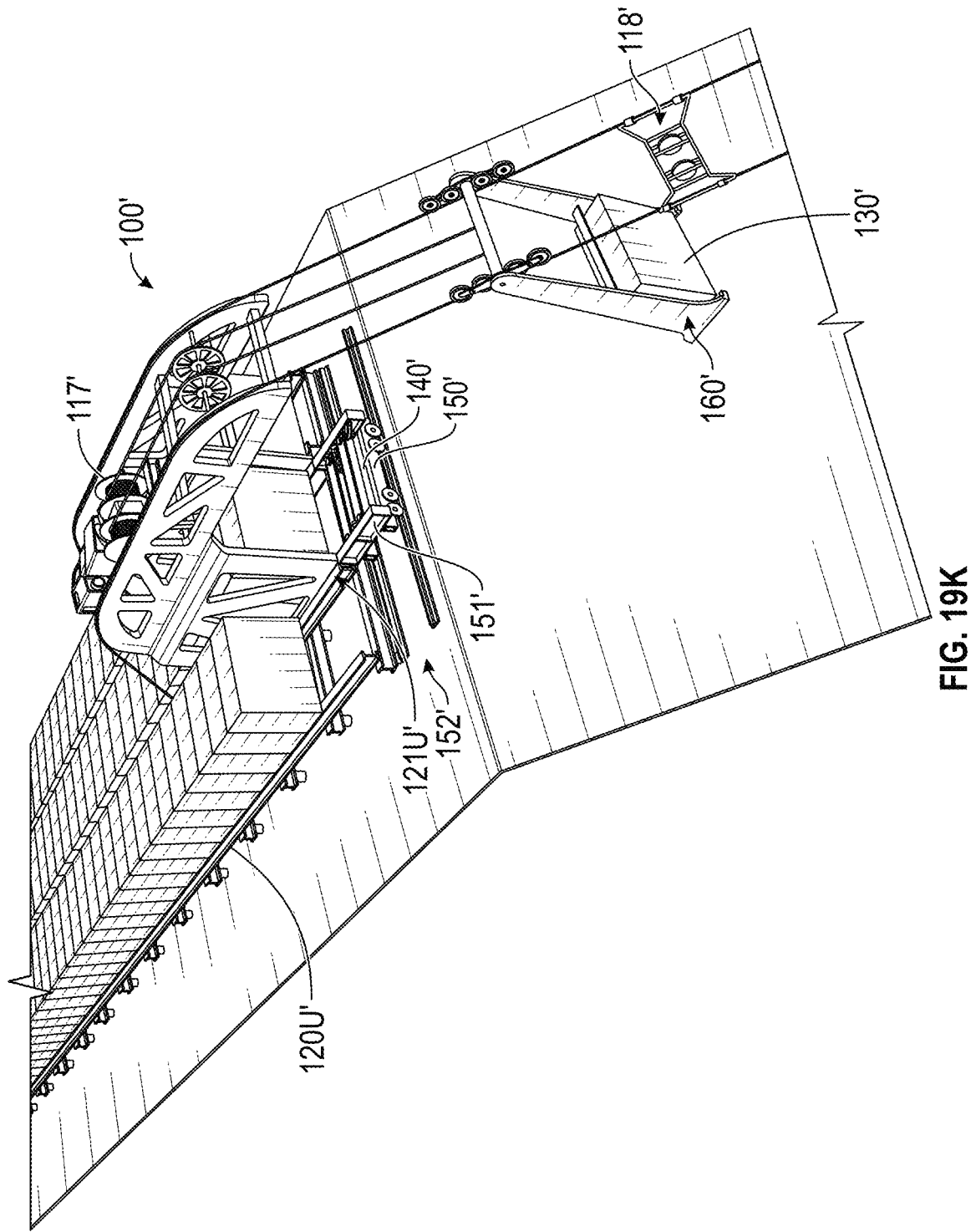
Figure 19L:
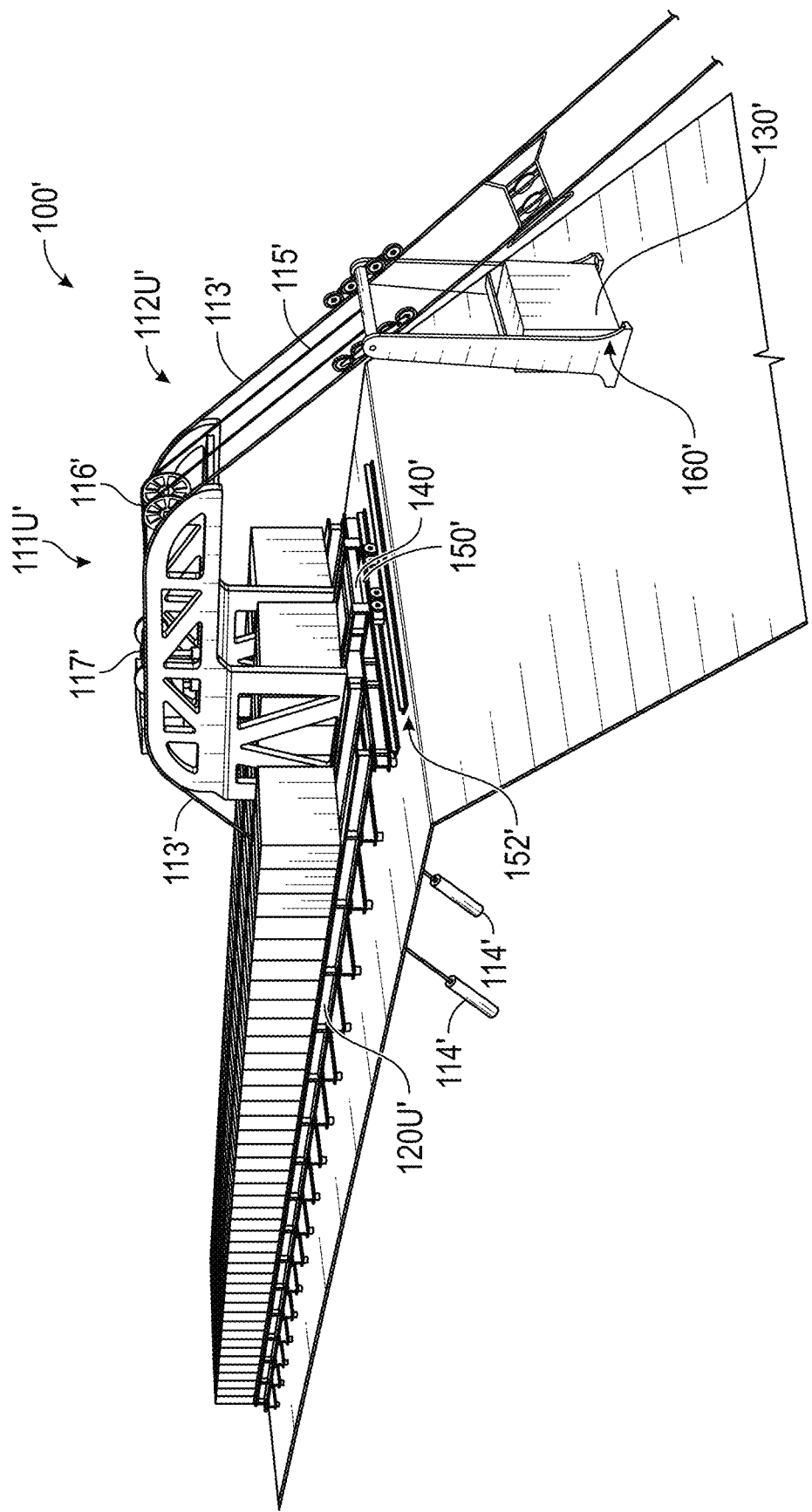
FIG. 19L shows a schematic perspective view of the upper portion of the energy storage and delivery system in FIGS. 19A-19K.
Figure 19M:
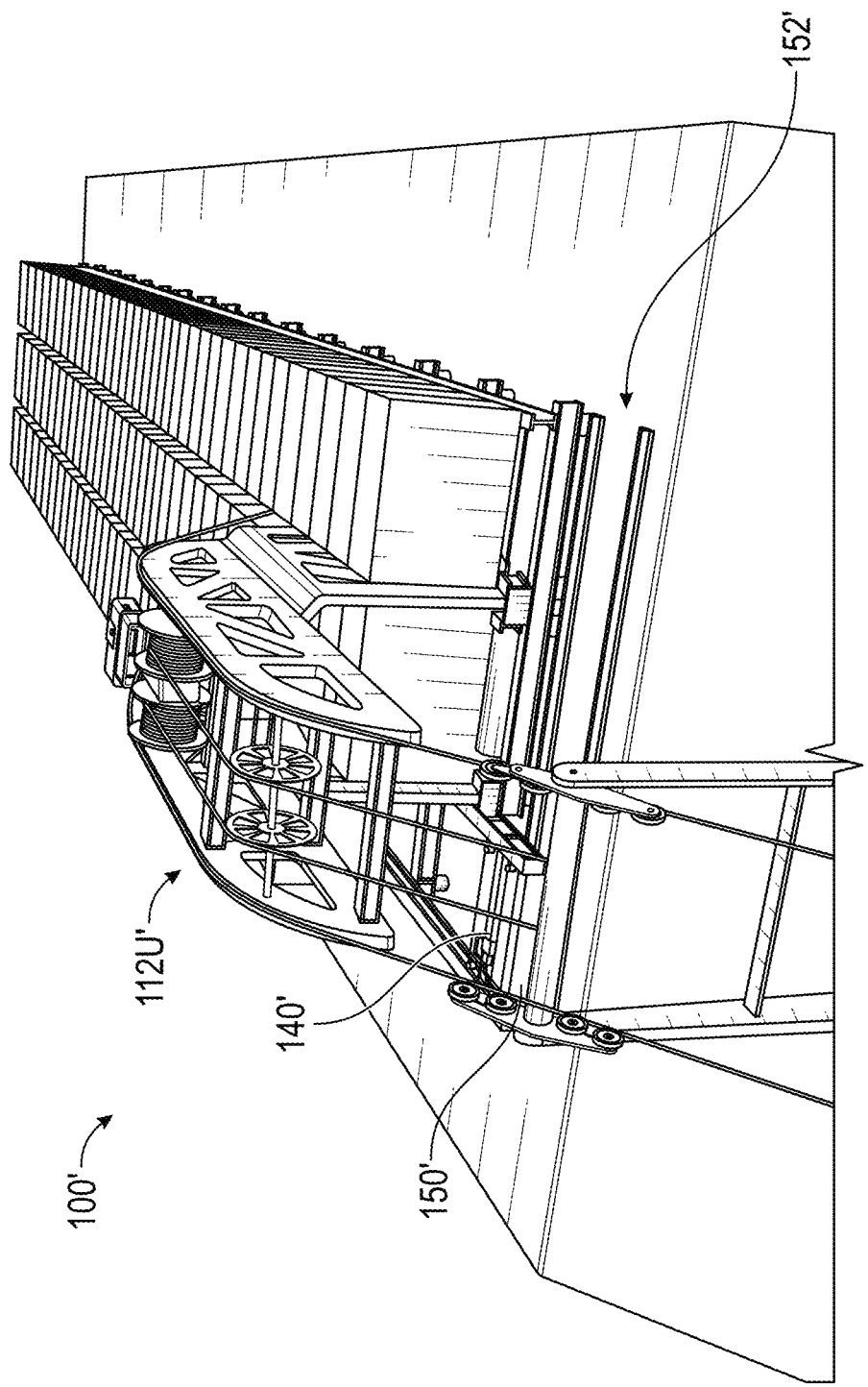
FIG. 19M shows a front view of the upper portion of the energy storage and delivery system in FIGS. 19A-19K.
Figure 19N:
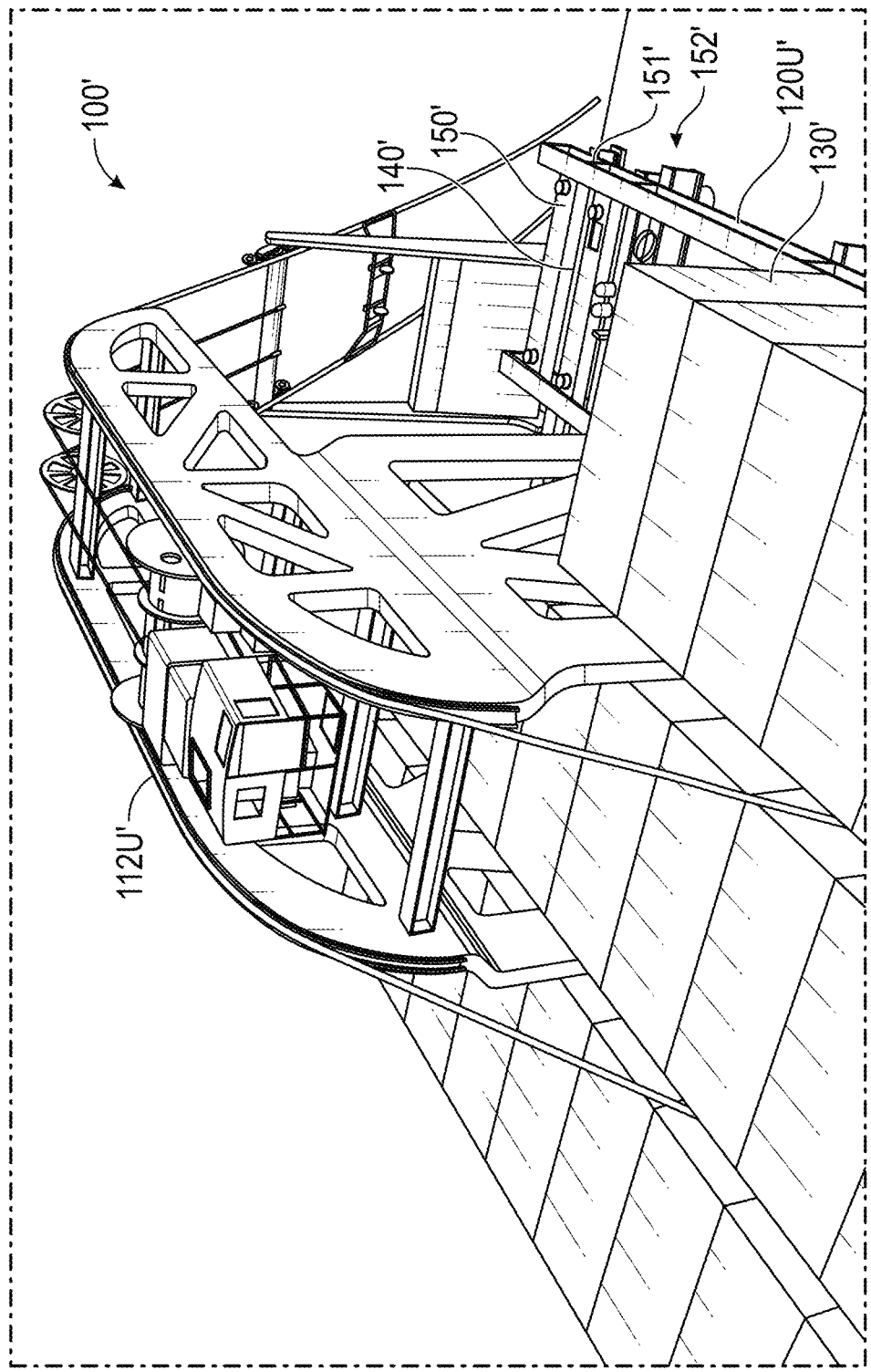
FIG. 19N shows a partial rear view of the upper portion of the energy storage and delivery system in FIGS. 19A-19K.

FIGS. 19A-19N show features of an example energy storage and delivery system 100' (hereafter "the system 100'"). The system 100' is similar to the system 100 in FIGS. 1-18. Thus, reference numerals used to designate the various components of the system 100' are identical to those used for identifying the corresponding components of the system 100 in FIGS. 1-18, except that a "'" has been added to the end of the numerical identifier. Therefore, the structure and description for the various features and components of the system 100 and how they're operated and controlled in FIGS. 1-18 are understood to also apply to the corresponding features of the system 100' in FIGS. 19A-19N, except as described below.

The system 100' differs from the system 100 in that instead of using the rotator platform 150 to move a block 130' between adjacent rows RU, the system 100' has a trolley 150' (e.g., an auxiliary trolley 150') that travels (via wheels of the auxiliary trolley 150') along a pair of rails 152' between rails or beams 120U' of adjacent rows RU, the rails 152' extending transverse (e.g., perpendicular) to the rails or beams 120U' of the rows RU of the system 100' (e.g., the rails 152' being adjacent ends of the rows RU). The trolley 150' has a pair of rails 151' that align with the rails or beams 120U' of a row RU when the trolley 150' is positioned at the end (e.g., aligned with) the end of the row RU. The rails 151' have channels that align with the channels 121U' of the rails or beams 120U' of the row RU when the trolley 150' is positioned at an end of (e.g., aligned with) the row RU. The channels between the rails 151' of the trolley 150' can receive the trolley 140' therein, as further described below, so that the trolley 150' can carry the trolley 140', for example in a nested manner (e.g., when the trolley 150' moves a block 130' between adjacent rows RU).

Figure 1:
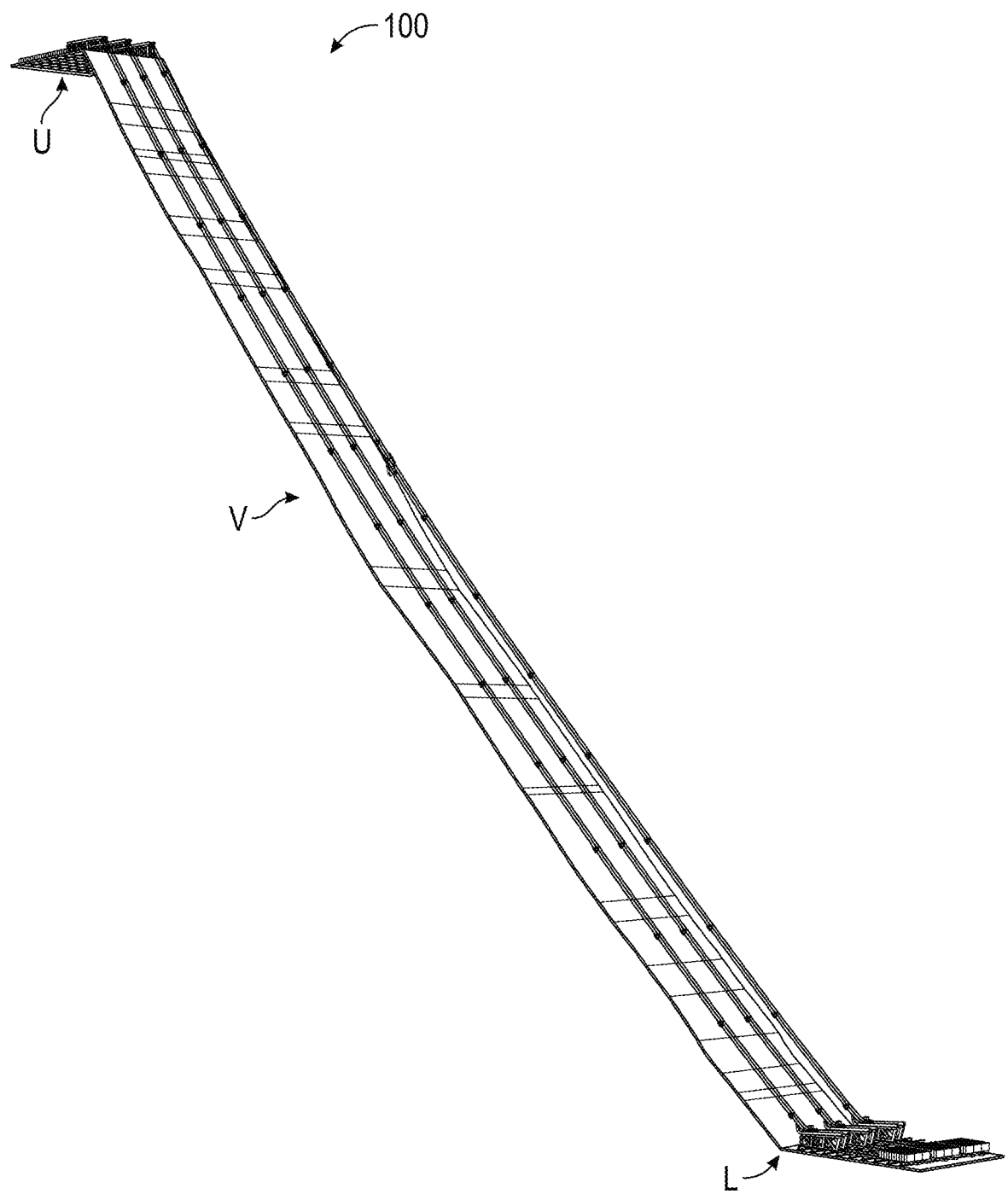
FIG. 1 is a schematic perspective view of an energy storage and delivery system.

FIGS. 19A-19K show a sequence of operation for the upper end U of the system 100'. Though not shown, the lower end of the system 100' is similar to the lower end L of the system 100 as shown in FIGS. 1 and 5, except that the trolley 150' instead of the rotator platform 150 is used. FIG. 19A shows the cage 160' carrying a block 130' toward the upper support frame 111U', and the trolley 150' aligned with the passageway 113U' under the support frame 111U'. The cage 160' carries the block 130' in the same manner described above in connection with FIGS. 1-18. FIG. 19B shows the cage 160' carrying the block 130' once it arrives over the pair or rails 112U' of the upper support frame 111U' and so that the block 130' is over the trolley 140', which is disposed in the trolley 150'. FIG. 19C shows the support pistons 146' of the trolley 140' extended to lift the block 130' from the cage 160' (e.g., in the same manner previously discussed). FIG. 19D shows the cage 160' having moved away from the upper support frame 111U', with the block 130' remaining supported (by the support pistons 146') on the trolley 140', which is in (e.g., supported by) the trolley 150'. FIG. 19E shows the trolley 150' moving toward an adjacent row RU while carrying the trolley 140', which in turn is carrying the block 130' (e.g., via the support pistons 146'). FIG. 19F shows the trolley 150' having arrived at a position at the end of the adjacent row RU so that rails 120U' of the row RU are aligned with the rails 151' of the trolley 150' (e.g., so that channels of the rails 121' in which the trolley 140' sits or rests are aligned with the channels 121U' of the rails 120U'. FIG. 19G shows the trolley 140' having moved out of the trolley 150' (e.g., moved out of the channels of the rails 151') and moving along the rails 120U' (e.g., via the channels 121U') while carrying the block 130' above the rails 120U'. FIG. 19H shows the trolley 140' having reached the final destination on the row RU while carrying the block 130' above the rails 120U'. FIG. 19I shows the trolley 140' operated to lower the block 130' onto the rails 120U'. For example, the trolley 140' is operated to actuate the support pistons 146' to retract in order to lower the block 130' onto the rails 120U'. FIG. 19J shows the trolley 140' having moved along the rails 120U' (e.g., via the channels 121U' of the rails 120U') to the trolley 150' (e.g., via the channels in the rails 151') so that the trolley 140' is again nested in the trolley 150'. FIG. 19K shows the trolley 150' having again moved to the adjacent row RU so that it is aligned with the passageway 113U' of the upper support frame 111U' and ready to receive another block 130' carried by the cage 160' (e.g., from the lower end L of the system 100').

FIG. 19L shows anchors 114' that anchor the pair of cables 113' that extend along the cableway and over the pair of rails 112U' of the upper support frame 111U'. Traction cables 115' extend over pulleys 116' to a traction motor wheel 117' that frictionally engages (e.g., "grabs" onto) the traction cable(s) 115'. The anchors 114' can be buried in the ground that supports the upper end U of the system 100'. FIG. 19M shows a front view of the upper end U of the system 100' and FIG. 19N shows a partial rear view of the upper end U of the system 100'.

FIGS. 20A-20K show features of an example energy storage and delivery system 100" (hereafter "the system 100''"). The system 100" is similar to the system 100 in FIGS. 1-18. Thus, reference numerals used to designate the various components of the system 100" are identical to those used for identifying the corresponding components of the system 100 in FIGS. 1-18, except that a "''" has been added to the end of the numerical identifier. Therefore, the structure and description for the various features and components of the system 100 and how they're operated and controlled in FIGS. 1-18 are understood to also apply to the corresponding features of the system 100" in FIGS. 20A-20K, except as described below.

The system 100" differs from the system 100 in that instead of using the rotator platform 150 to move a block 130 between adjacent rows RU, the system 100" has a cage 150" (e.g., an auxiliary cage 150") that travels in a direction transverse (e.g., perpendicular) to the rails or beams 120U" of the rows RU of the system 100" (e.g., allowing the cage 150" to travel between adjacent rows RU). Though FIGS. 20A-20K show the upper end U of the system 100", one of skill in the art will recognize that the same structure described herein can be implemented in the lower end L of the system 100" (e.g., similar to lower end L in FIG. 5), with the cage 150" also implemented in the lower end L to move blocks 130" between adjacent rows RU.

The cage 150" can be made of steel and be lightweight. The cage 150" includes a pair of spaced apart arms 152" that extend from a support bar 151" to a pair of flanges 154" (space apart flanges 154") at free ends (at the bottom) of the pair of arms 152". The pair of arms 152" are spaced apart from each other by a width greater than (e.g., approximately equal to but greater than) the depth D of the block 130". The pair of flanges 154" are spaced apart from each other (e.g., separated by opening or gap 155", as shown in FIG. 20B) and extend transverse (e.g., perpendicular) to the arms 152". The support bar 151" is spaced from the pair of flanges 154" by a distance greater than the height H of a block 130", allowing the block 130" to be received in the space between the pair of arms 152" and between the support bar 151" and the pair of flanges 154".

The cage 150" travels along a beam 111U2" that extends between posts 111U1" (e.g., four spaced apart posts 111U1", for example spaced apart 4 m×4 m) of the support frame 111U" of the cableway 110". The beam 111U2" can be an I-beam that defines channels on opposite sides of the beam. In the illustrated example, the beam 111U2" extends along a length (e.g., approximately equal to the width of two rows RU) that allows the cage 150" traveling on the beam 111U2" to reach three adjacent rows RU (e.g., the beam 111U2" extending across a center row RU and across a portion, such as to a midpoint, of two adjacent rows RU on either side of the enter row RU). However, in other examples, the beam 111U2" can have a length that allows the cage 150" traveling on the beam 111U2" to reach more than three adjacent rows RU (e.g., reach 5 adjacent rows RU, reach 7 adjacent rows RU, etc.). The beam 111U2" extends between the posts 111U1" in a direction perpendicular to the opening or passageway 113U" defined between the posts 111U1" via which block(s) 130" of the row RU can pass (e.g., under the support frame 111U"). In one example, the cage 150" travels along the beam 111U2" via a carriage 153" attached to the support bar 151". The carriage 153" has one or more wheels (e.g., multiple wheels) that travel along the beam 111U2" (e.g., travel within the channels defined by the I-beam structure of the beam 111U2"). The beam 111U2" can have stops at ends thereof that limit the travel of the carriage 153" (and therefore the cage 150") along the beam 111U2".

Figure 20A:
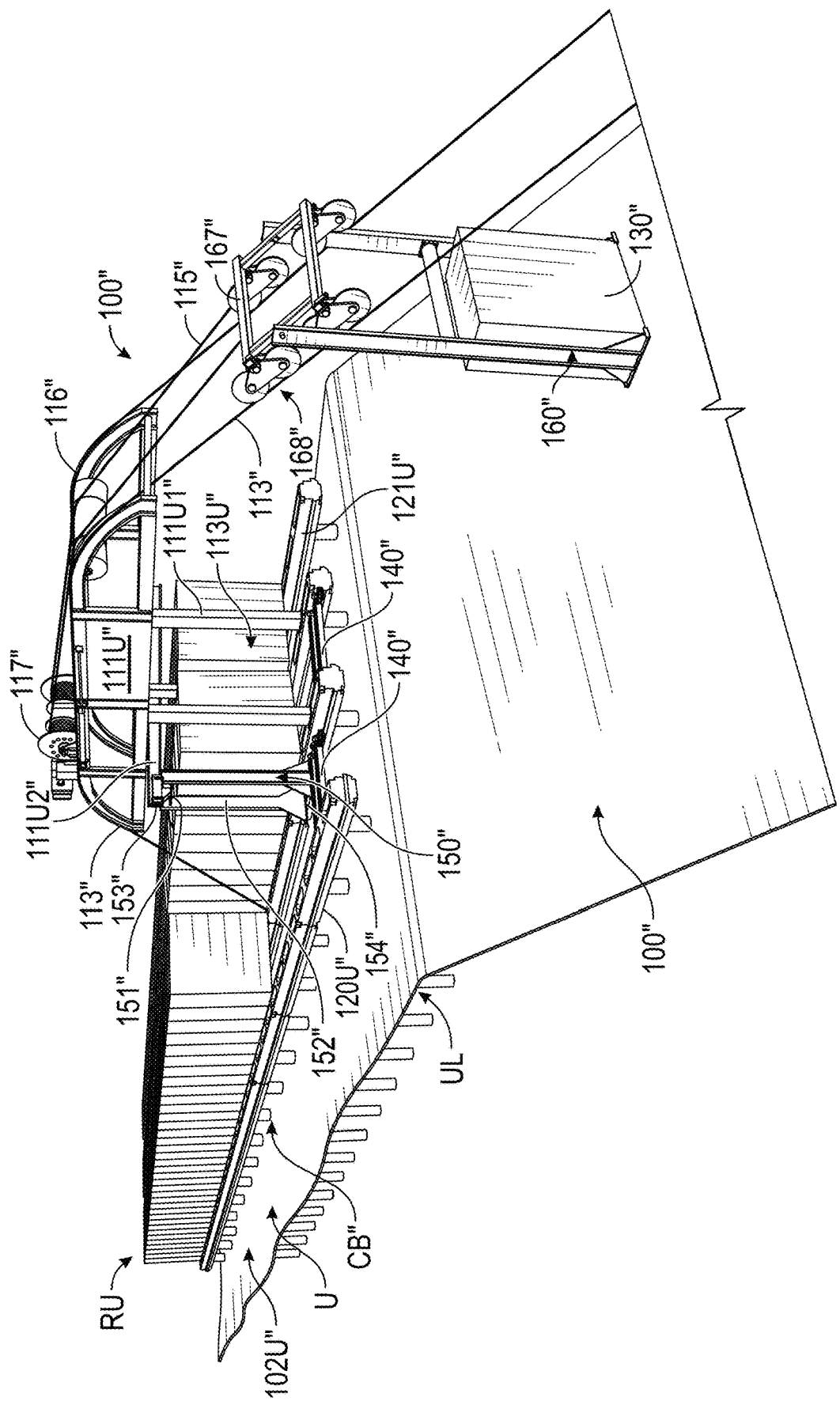
FIGS. 20A-20K show a schematic perspective view of an upper portion of an energy storage and delivery system during operation, showing a sequence for moving a block along a cable way of the system.
Figure 20B:
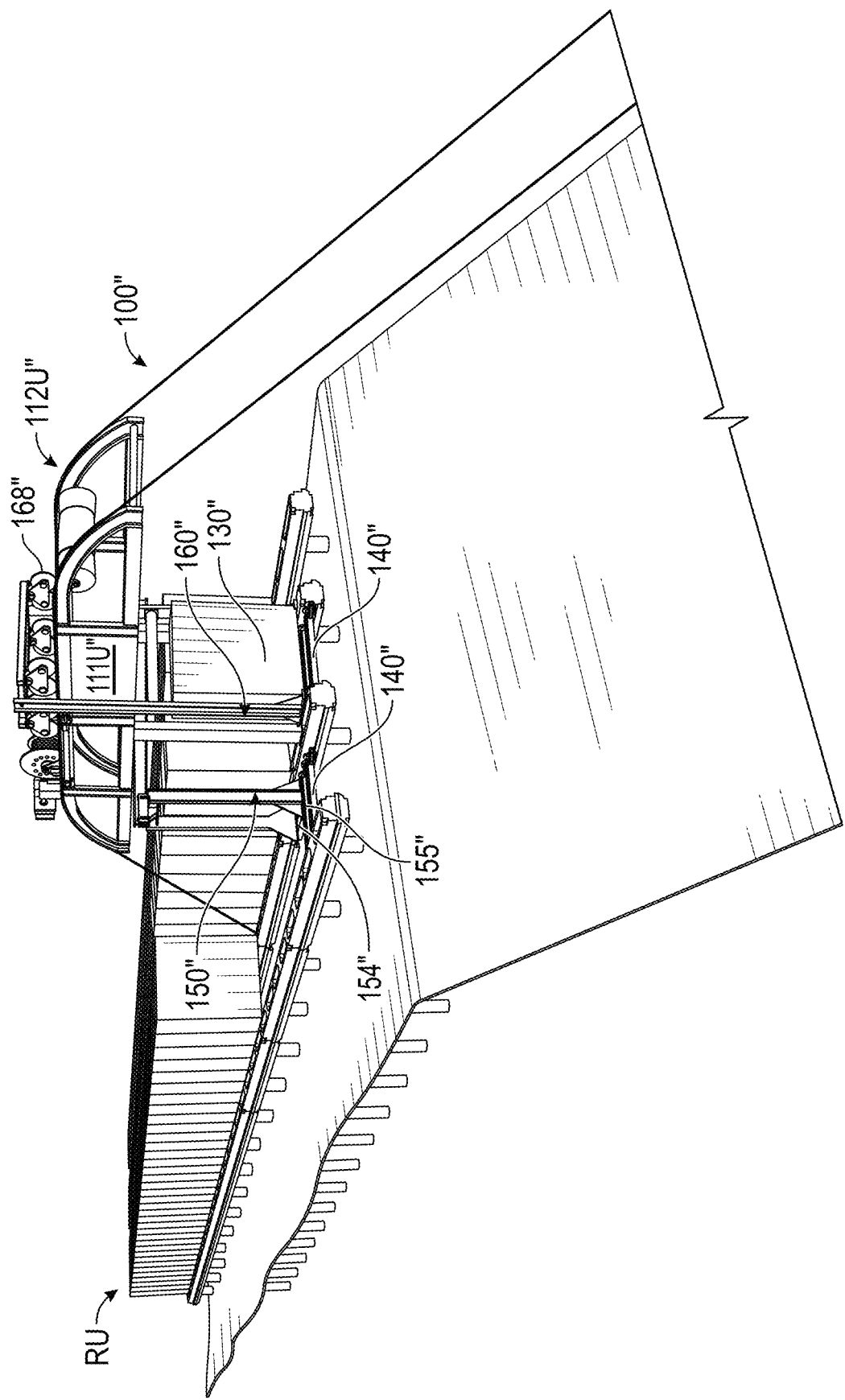
Figure 20C:
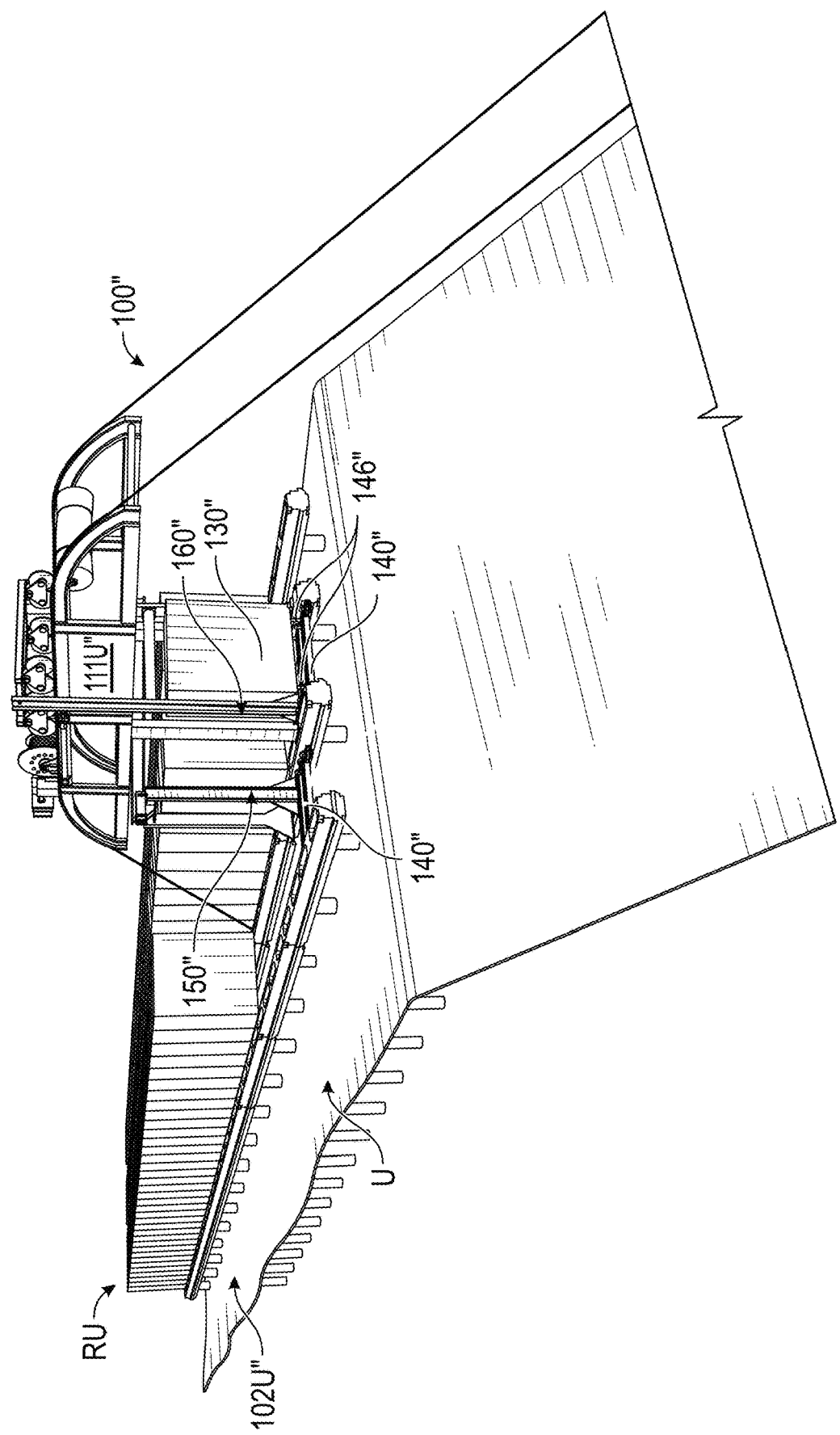
Figure 20D:
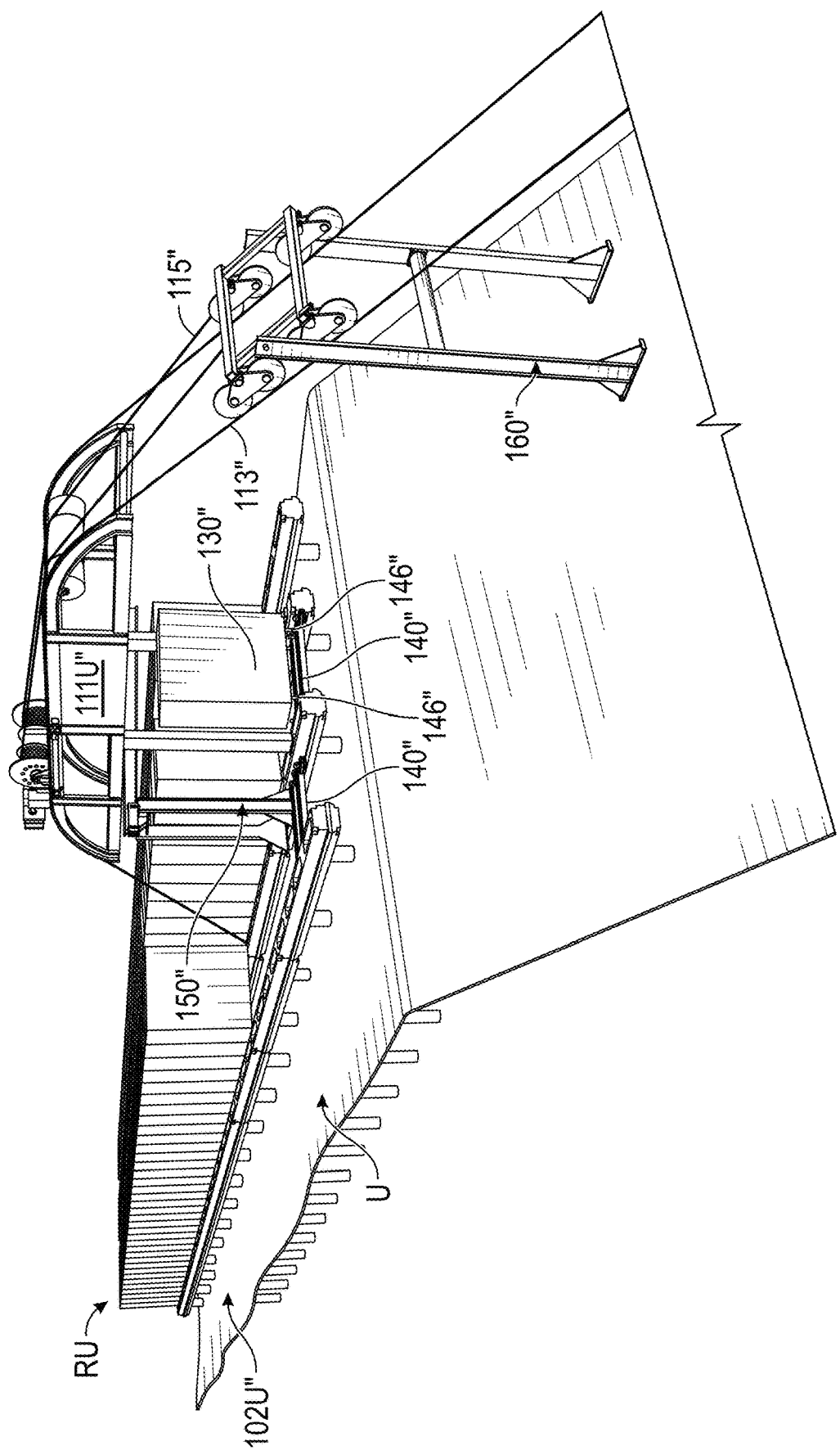
Figure 20E:
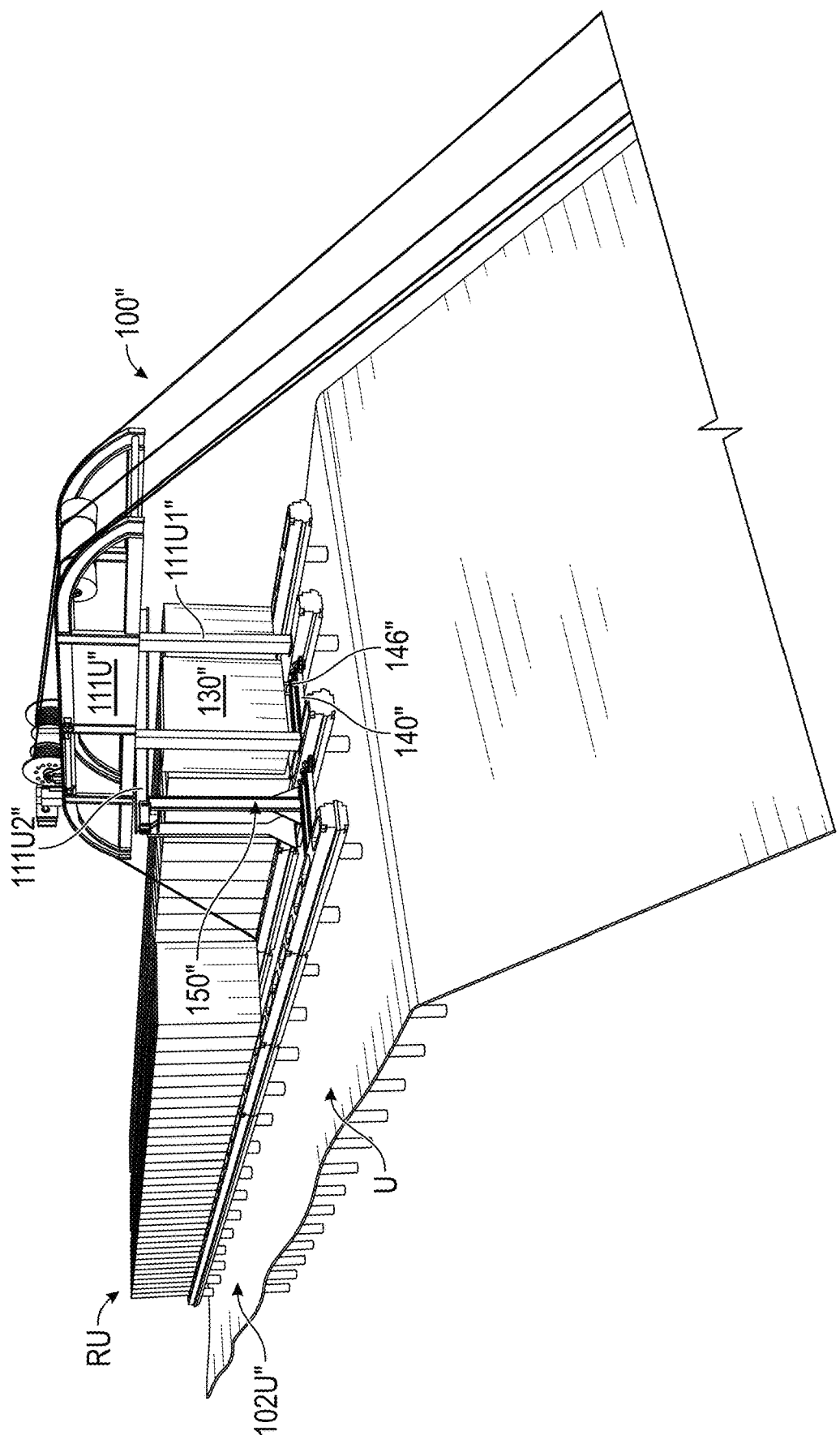
Figure 20F:
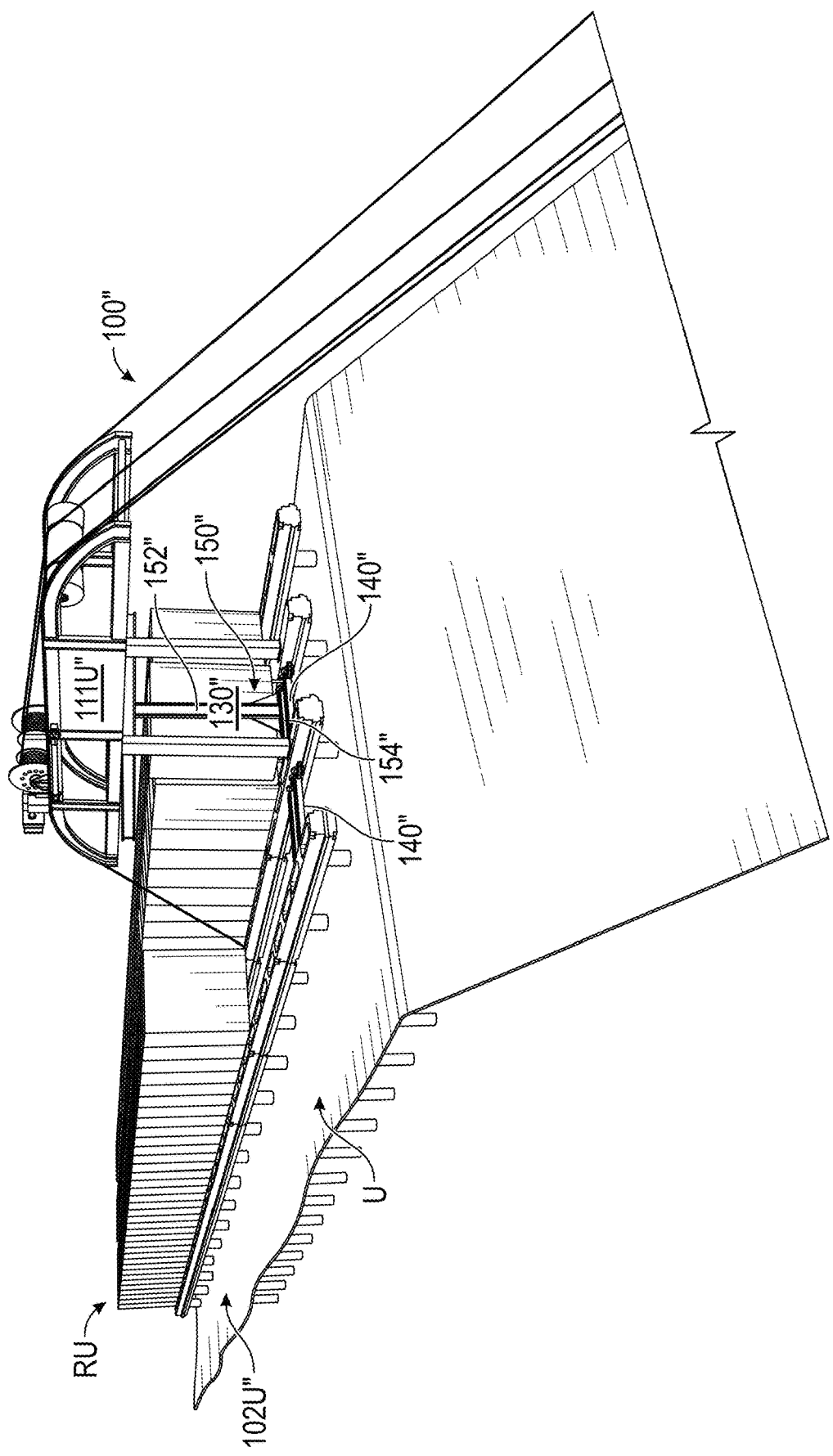
Figure 20G:
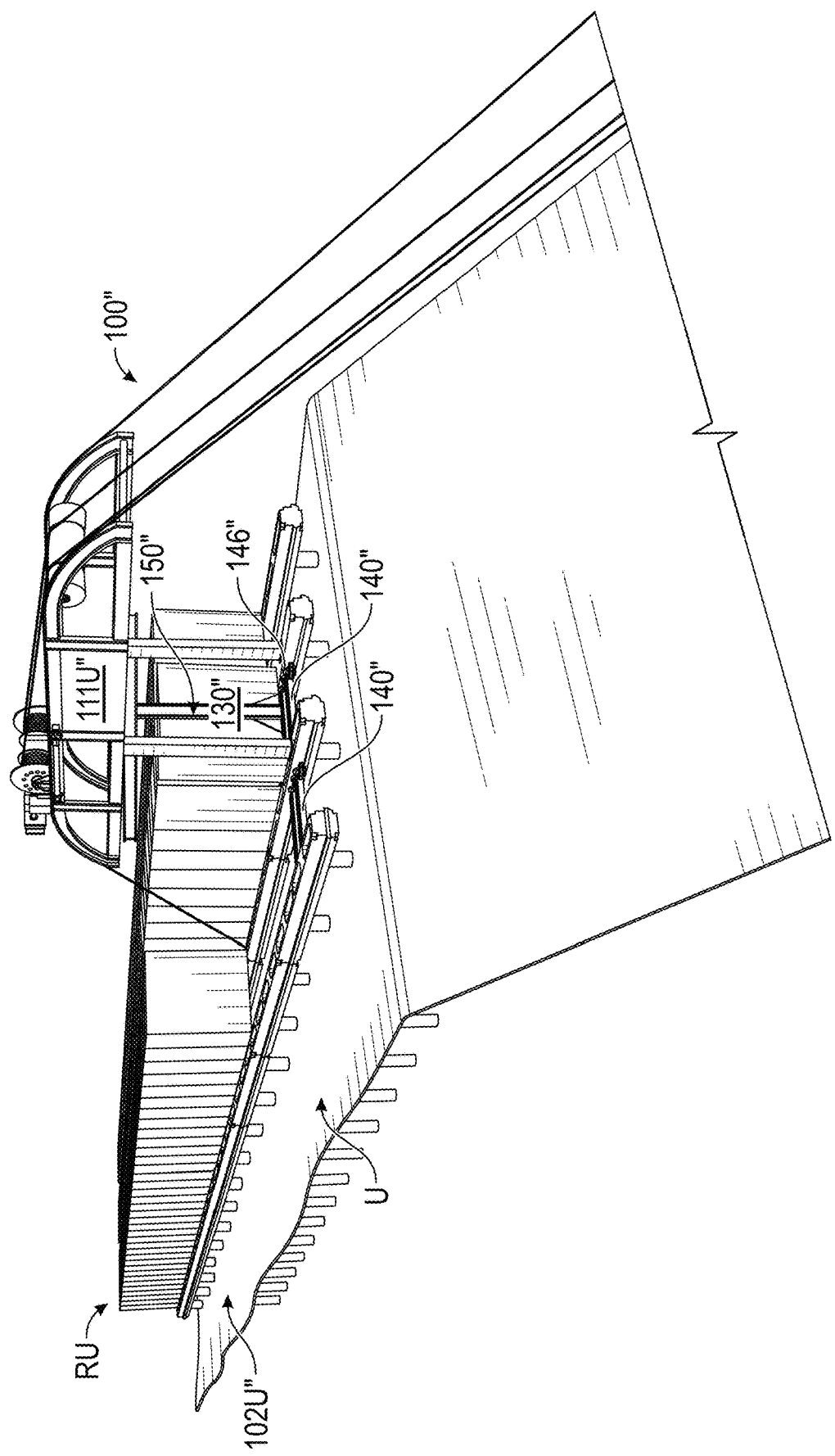
Figure 20H:
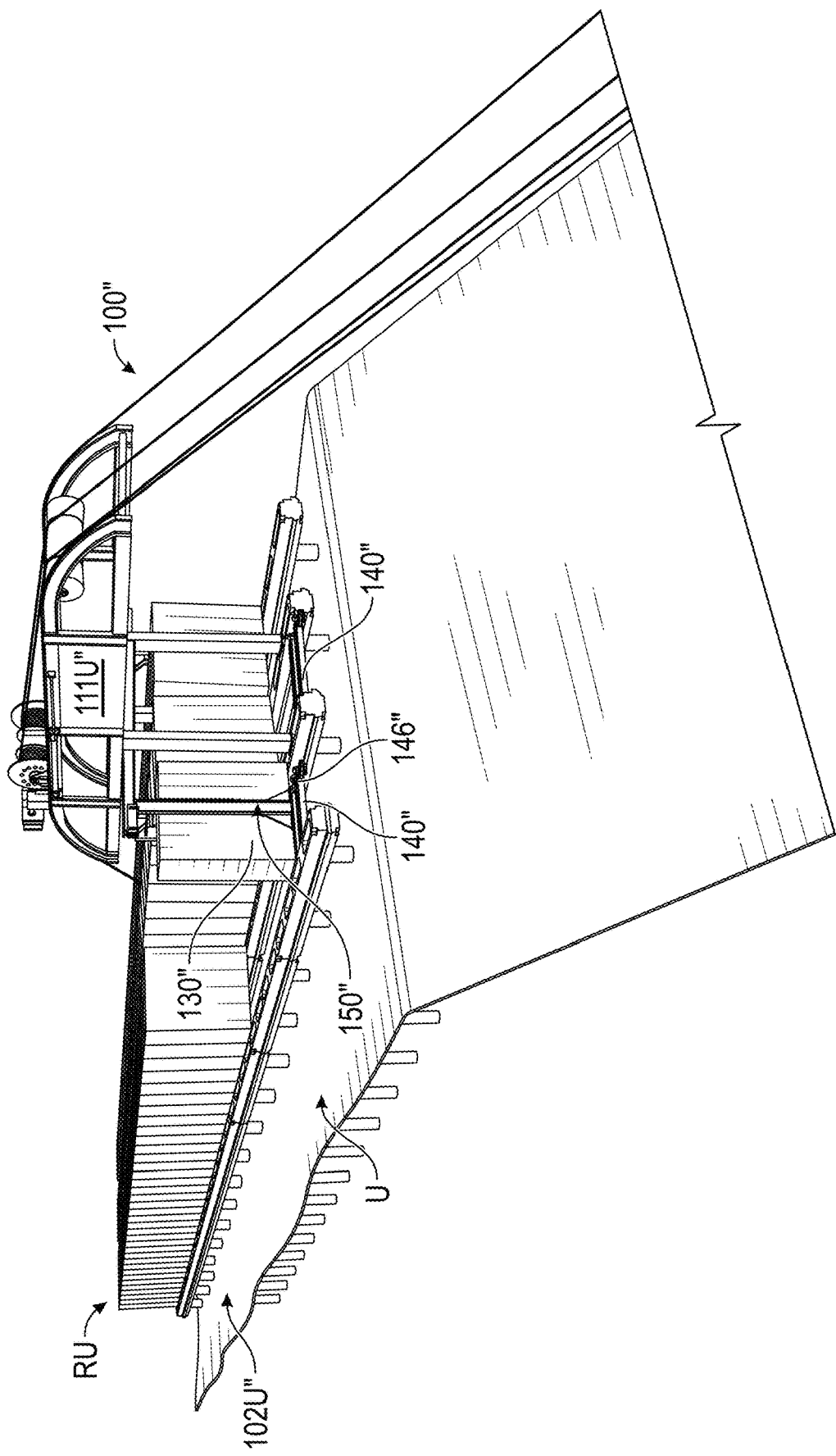
Figure 20I:
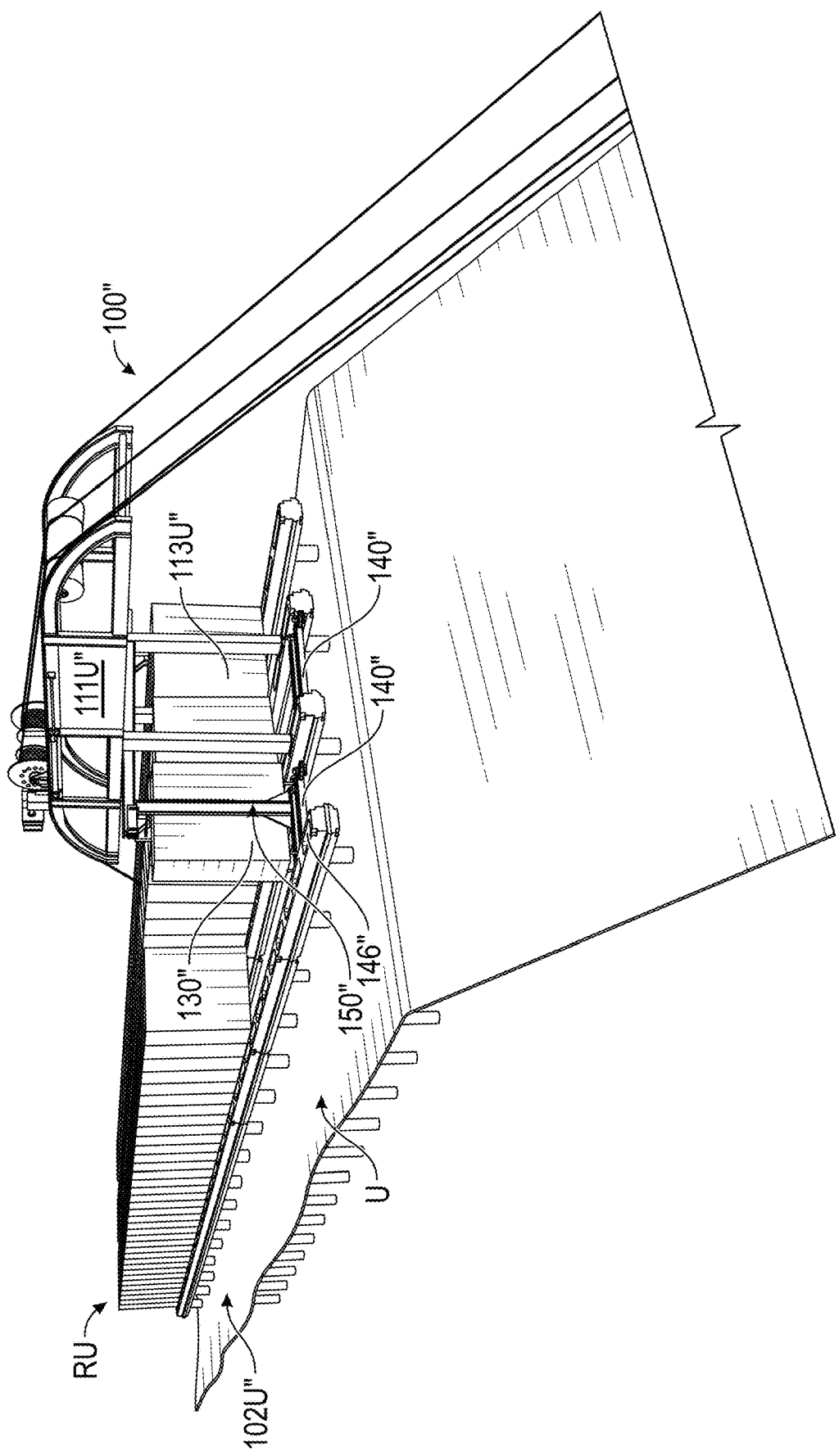
Figure 20J:
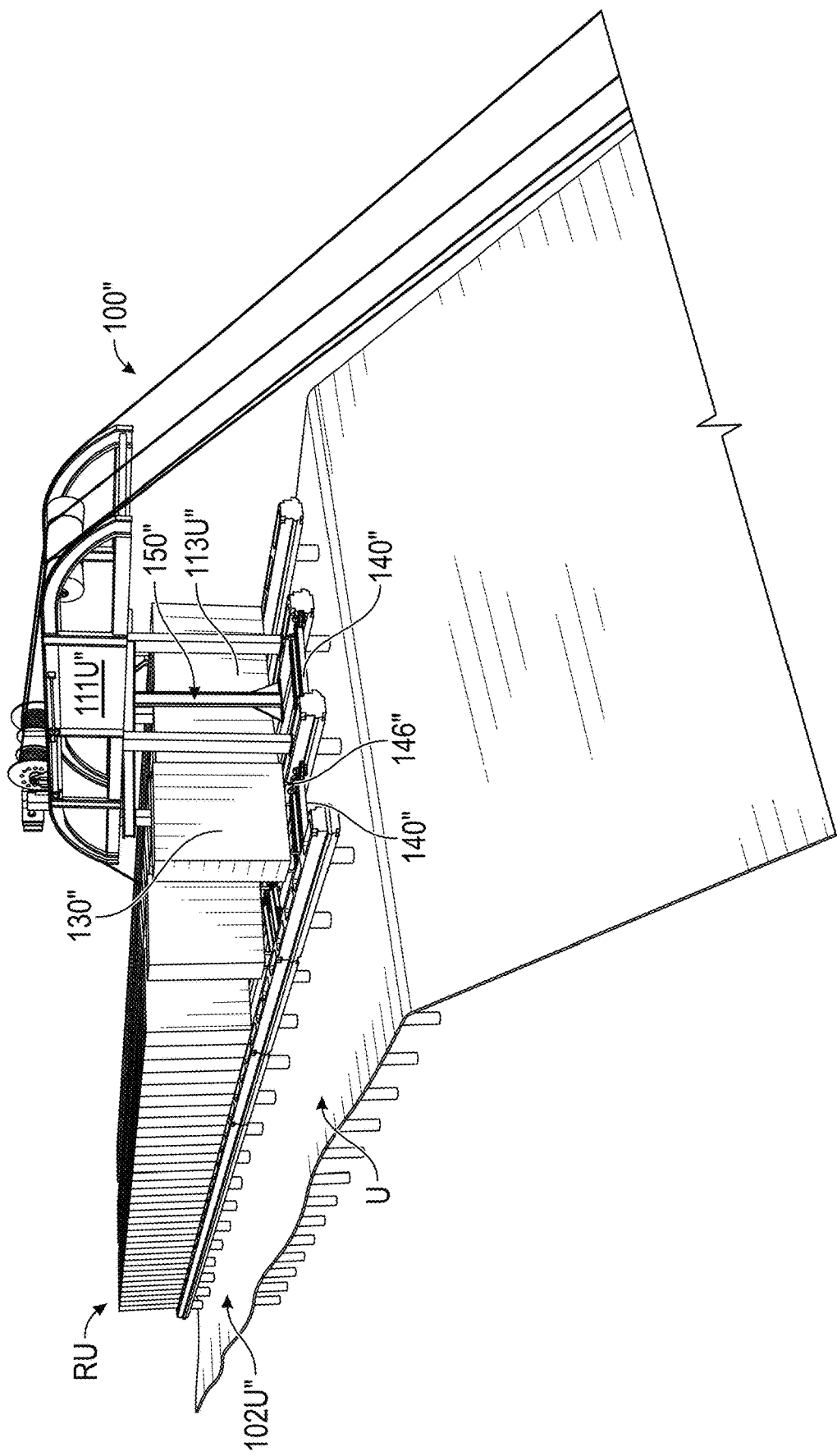
Figure 20K:
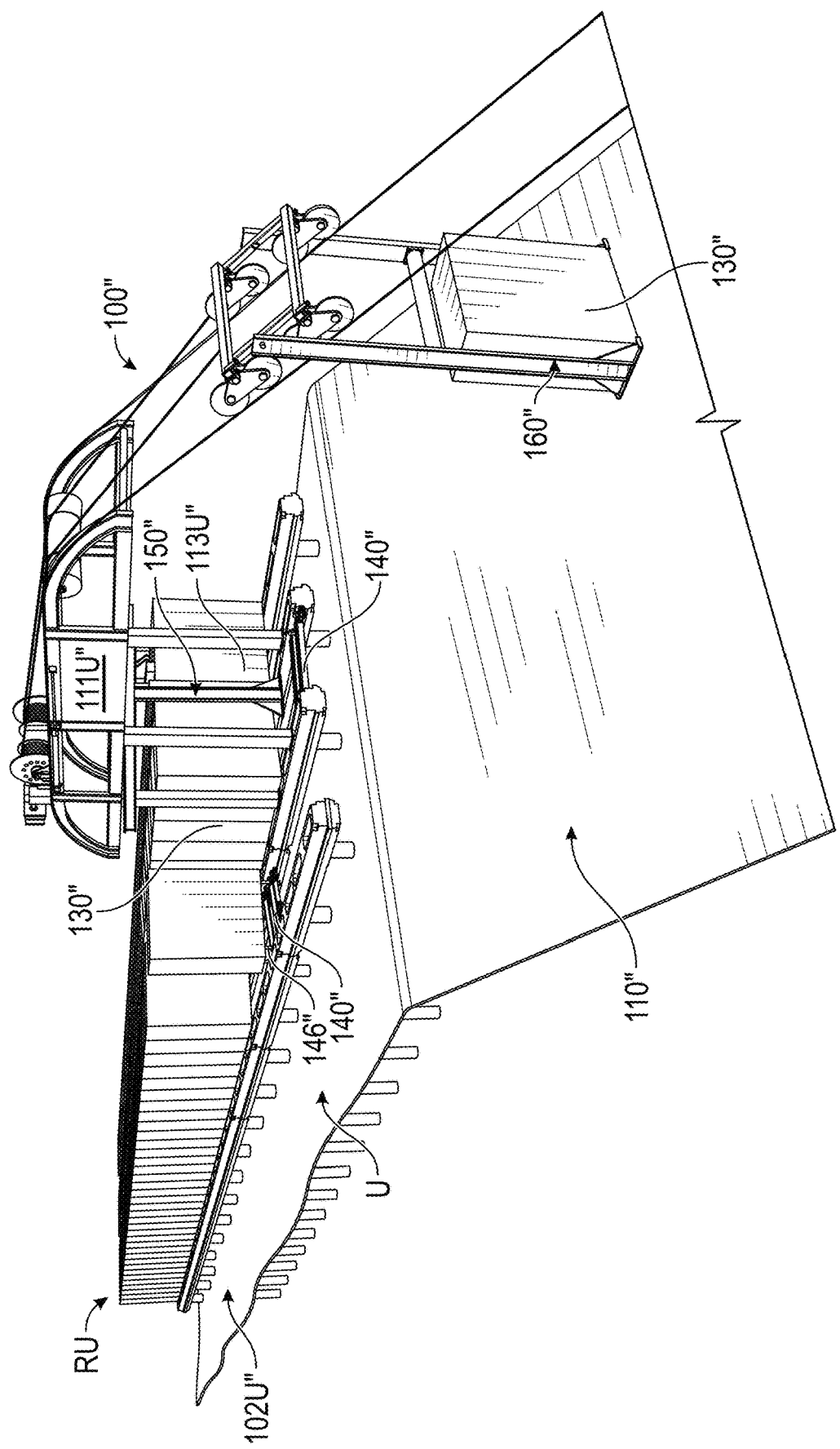

FIGS. 20A-20K show a sequence of operation for the upper end U of the system 100". Though not shown, the lower end of the system 100" is similar to the lower end L of the system 100 as shown in FIGS. 1 and 5, except that the cage 150" instead of the rotator platform 150 is used. FIG. 20A shows the cage 160" carrying a block 130" toward the upper support frame 111U", the cage 150" disposed out of the passageway 113U" under the support frame 111U" (e.g., disposed in an adjacent row RU), and the trolley 140" disposed at or proximate the end of the row RU (e.g., the upper landing zone UL) aligned with the passageway 113U". The cage 160' carries the block 130" in the same manner described above in connection with FIGS. 1-18. FIG. 20B shows the cage 160" carrying the block 130" once it arrives over the pair or rails 112U" of the upper support frame 111U" and so that the block 130" is over the trolley 140" (e.g., the trolley 140" positioned in the upper landing zone UL). FIG. 20C shows the support pistons 146" of the trolley 140" extended to lift the block 130" from the cage 160" (e.g., lift the block 130" away or above the flanges 164" of the cage 160", in the same manner previously discussed, so that the trolley 140", via the pistons 146", supports the full weight of the block 130). FIG. 20D shows the cage 160" having moved away from the upper support frame 111U", with the block 130" remaining supported (by the support pistons 146") on the trolley 140". FIG. 20E shows the trolley 140" while carrying the block 130" (e.g., with the pistons 146" in the extended position) having moved away from the end of the row RU (e.g., moved away from the upper landing zone UL) so that it is positioned between the posts 111U1" (e.g., and aligned with the beam 111U2"). FIG. 20F shows the cage 150" having moved from the adjacent row RU into the row RU under the support frame 111U" so that the arms 152" of the cage 150" extend on opposite sides of the block 130" (along the depth D of the block 130") and so that the flanges 154" of the cage 150" extend under the block 130". FIG. 20G shows the pistons 146" having moved to the retracted position to lower the block 130" onto the flanges 154" of the cage 150" (e.g., so that the cage 150" supports the full weight of the block 130"). FIG. 20H shows the cage 150" having moved to an adjacent row RU, while carrying the block 130", and over a trolley 140" in said adjacent row RU with the trolley 140" having its pistons 146" in the retracted position. FIG. 20I shows the pistons of the trolley 140" in the adjacent row RU moved to the extended position to lift the block 130" off the cage 150" (e.g., lift the block 130" away or above the flanges 154" of the cage 150" so that the trolley 140", via the pistons 146", supports the full weight of the block 130"). FIG. 20J shows the cage 150" having moved away from the adjacent row RU to the row RU aligned with the passageway 113U" under the support frame 111U". FIG. 20K shows the trolley 140" carrying the block 130" in the adjacent row RU having moved rearward toward a location where the block 130" is to be lowered onto the rails 120U" for storage. At the same time, the cage 160" is traveling along the cableway 110" toward the passageway 113U" under the support frame 111U" while carrying another block 130". The cage 150" can then move from the position in the passageway 113U" in FIG. 20K to the position in the adjacent row (see FIG. 20A) and the process described above from FIGS. 20A-20K can be repeated.

Advantageously, the cage 150" is supported by the support frame 111U" (e.g., by the rigid, steel frame of the support frame 111U") while carrying the block 130" between adjacent rows RU. Additionally, the rails 120U" and support frame 111U" are supported above ground (e.g., on piles CB") that advantageously does not require the leveling of the ground surface at the upper end U of the system 100".

Additional Embodiments

In embodiments of the present disclosure, an energy storage and delivery system, method for storing or generating electricity, system with rotator platform, system with auxiliary trolley, system with cage, system with auxiliary cage, and/or system with plurality of rows defined by rails that support a trolley may be in accordance with any of the following clauses:

Clause 1. An energy storage and delivery system, comprising: one or more cableways extending between a lower end and an upper end, the upper end being at a higher elevation than the lower end, each cableway comprising: an upper block storage at the upper end comprising a row defined by a pair of rails configured to support a plurality of blocks thereon, an upper support frame aligned with a distal end of the row of the upper block storage, a first trolley movably coupled to said pair of rails of the row of the upper block storage, the first trolley configured to travel below the plurality of blocks disposed on the pair of rails of the row, the first trolley operable to lift one block of the plurality of blocks above the pair of rails of the row and to move said block horizontally along the row to or from an upper landing zone at the distal end of the row of the upper block storage, a lower block storage at the lower end comprising a row defined by a pair of rails configured to support a plurality of blocks thereon, a lower support frame aligned with a distal end of the row of the lower block storage, a second trolley movably coupled to said pair of rails of the row of the lower block storage, the second trolley configured to travel below the plurality of blocks disposed on the pair of rails of the row of the lower block storage, the second trolley operable to lift one block of the plurality of blocks above the pair of rails of the row of the lower block storage, and to move said block horizontally along the row to or from a lower landing zone at the distal end of the row of the lower block storage, one or more cables extending between and coupled to the upper support frame and the lower support frame, a cage configured to travel along the one or more cables between and over at least a portion of the upper support frame and the lower support frame, the cage fixedly coupled to one or more traction cables that loop around a first traction motor wheel operatively coupled to the upper support frame and around a second traction motor wheel operatively coupled to the lower support frame, and a motor-generator operatively coupled to one or both of the first traction motor wheel and the second traction motor wheel, the motor-generator operable to power one or both of the first traction motor wheel and the second traction motor wheel to move the cage from the lower end to the upper end, the motor-generator configured to generate electricity from a rotation of one or both of the first traction motor wheel and the second traction motor wheel when the cage moves from the upper end to the lower end at least partially under a force of gravity, wherein the cage is operable to move the plurality of blocks one-by-one from the lower end to the upper end to store an amount of electrical energy corresponding to a potential energy amount of said blocks, and wherein the cage is operable to move the plurality of blocks from the upper end to the lower end at least partially under the force of gravity to generate an amount of electricity, the cage moving each of the plurality of blocks between the upper end and the lower end along a same vertical distance.

Clause 2. The system of Clause 1, wherein the row of the upper block storage comprises a plurality of rows that include one or more rows adjacent the row aligned with the upper support frame, and wherein the first trolley comprises a plurality of first trolleys, each of the plurality of first trolleys movably coupled to one of the plurality of rows of the upper block storage.

Clause 3. The system of Clause 2, wherein the first trolley comprises multiple wheel assemblies, a frame that extends between the multiple wheel assemblies, and a plurality of support pistons movably coupled to the frame and selectively operable to lift the block above the row and operable to lower the block, the multiple wheel assemblies configured to extend within a channel or be supported on a track of the pair of rails of each of the plurality of rows of the upper block storage.

Clause 4. The system of Clause 3, further comprising a first rotator platform pivotally coupled to a distal end of at least one of the pair or rails of each of the plurality of rows of the upper block storage, the first rotator platform configured to pivot between adjacent rows of the upper block storage to move a block between the adjacent rows, the first rotator platform defining one or more cutouts or gaps configured to allow the first trolley to be positioned under the first rotator platform while the first trolley supports the block spaced above the row.

Clause 5. The system of any of Clauses 3-4, further comprising a third trolley configured to removably receive the first trolley therein, the third trolley configured to travel along a pair of rails transverse to the rails of the rows of the upper block storage, the third trolley configured to move between adjacent rows while carrying the first trolley.

Clause 6. The system of any of Clauses 3-5, further comprising a fourth trolley configured to removably receive the second trolley therein, the fourth trolley configured to travel along a pair of rails transverse to the rails of the rows of the lower block storage, the fourth trolley configured to move between adjacent rows while carrying the second trolley.

Clause 7. The system of any of Clauses 3-6, further comprising a second cage movably coupled to a beam of the upper support frame, the second cage being movable between adjacent rows and configured to carry a block between adjacent rows.

Clause 8. The system of any of Clauses 1-7, wherein the row of the lower block storage comprises a plurality of rows that include one or more rows adjacent the row aligned with the lower support frame, and wherein the second trolley comprises a plurality of second trolleys, each of the plurality of second trolleys movably coupled to one of the plurality of rows of the lower block storage.

Clause 9. The system of Clause 8, wherein the second trolley comprises multiple wheel assemblies, a frame that extends between the multiple wheel assemblies, and a plurality of support pistons movably coupled to the frame and selectively operable to lift the block above the row and operable to lower the block, the multiple wheel assemblies configured to extend within a channel or be supported on a track of the pair of rails of each of the plurality of rows of the lower block storage.

Clause 10. The system of Clause 9, further comprising a second rotator platform pivotally coupled to a distal end of at least one of the pair or rails of each of the plurality of rows of the lower block storage, the second rotator platform configured to pivot between adjacent rows of the lower block storage to move a block between the adjacent rows, the second rotator platform defining one or more cutouts or gaps configured to allow the second trolley to be positioned under the second rotator platform while the second trolley supports the block spaced above the row.

Clause 11. The system of any of Clauses 9-10, further comprising a third cage movably coupled to a beam of the lower support frame, the third cage being movable between adjacent rows of the lower block storage and configured to carry a block between said adjacent rows.

Clause 12. The system of any of Clauses 7-11, wherein the cage or the second cage comprises a pair of spaced apart arms and a pair of spaced apart flanges attached to ends of the pair of arms, the pair of flanges extending transversely relative to the pair of arms and a gap defined between the pair of flanges, the cage configured to extend around the block while the block is supported by the first trolley or second trolley spaced above the row.

Clause 13. The system of any of Clauses 7-11, wherein the cage or the second cage self-centers the block when the block is lowered by the first trolley or second trolley so that the pair of flanges engage a bottom of the block.

Clause 14. The system of any preceding Clause, wherein the one or more cables are a pair of cables that extend between and couple to a pair of rails of the upper support frame and to a pair of rails of the lower support frame.

Clause 15. A method for storing and generating electricity, comprising: operating a first trolley along a row of an upper block storage at an upper end to move a block along the row to and from an upper landing zone at a distal end of the row of the upper block storage; operating a second trolley along a row of a lower block storage at a lower end to move a block along the row to and from a lower landing zone at a distal end of the row of the upper block storage; and operating a cage along a cableway between the upper end and the lower end to move a plurality of blocks one at a time between the lower end and the upper end, wherein operating the cage includes: moving with the cage a block from the lower end to the upper end to store and amount of electrical energy corresponding to a potential energy amount of said blocks; and moving with the cage a block from the upper end to the lower end at least partially under a force of gravity to generate an amount of electricity via an electric motor-generator operatively coupled to the cage, wherein the cage moves the plurality of blocks between the lower end and the upper end along a same vertical distance.

Clause 16. The method of Clause 15, wherein operating the first trolley along the row of the upper block storage includes operating a plurality of first trolleys along a plurality of rows of the upper block storage, each of the plurality of first trolleys movably coupled to one of the plurality of rows of the upper block storage.

Clause 17. The method of Clause 16, further comprising moving a block between adjacent rows of the plurality of rows of the upper block storage with a first rotator platform pivotally coupled to a least one rail of each row of the plurality of rows.

Clause 18. The method of any of Clauses 16-17, further comprising moving a block between adjacent rows of the plurality of rows of the upper block storage with a third trolley that removably receives the first trolley therein, the third trolley configured to travel along a pair of rails transverse to the rails of the rows of the upper block storage, the third trolley configured to move between adjacent rows while carrying the first trolley.

Clause 19. The method of any of Clauses 16-18, further comprising moving a block between adjacent rows of the plurality of rows of the upper block storage with a second cage movably coupled to a support frame.

Clause 20. The method of any of Clauses 16-19, wherein operating the second trolley along the row of the lower block storage includes operating a plurality of second trolleys along a plurality of rows of the lower block storage, each of the plurality of second trolleys movably coupled to one of the plurality of rows of the lower block storage.

Clause 21. The method of Clause 20, further comprising moving a block between adjacent rows of the plurality of rows of the lower block storage with a second rotator platform pivotally coupled to a least one rail of each row of the plurality of rows.

Clause 22. The method of any of Clauses 20-21, further comprising moving a block between adjacent rows of the plurality of rows of the lower block storage with a fourth trolley that removably receives the second trolley therein, the fourth trolley configured to travel along a pair of rails transverse to the rails of the rows of the lower block storage, the fourth trolley configured to move between adjacent rows while carrying the second trolley.

Clause 23. The method of any of Clauses 20-22, further comprising moving a block between adjacent rows of the plurality of rows of the lower block storage with a third cage movably coupled to a support frame of the lower block storage.

Clause 24. An energy storage and delivery system, comprising: a cableway extending between a lower end and an upper end, the upper end being at a higher elevation than the lower end, the cableway comprising: a block storage comprising a plurality of rows, each row defined by a pair of rails configured to support a plurality of blocks thereon, a support frame aligned with one of the plurality of rows of the block storage, a plurality of trolleys, each of the plurality of trolleys movably coupled to one of the plurality of rows of the block storage, each trolley configured to travel below the plurality of blocks disposed on the pair of rails of its associated row, the trolley operable to lift one block of the plurality of blocks above the pair of rails and to move said block to or from a landing zone at a distal end of the associated row of the block storage, a rotator platform pivotally coupled to a distal end of at least one of the pair or rails of each of the plurality of rows, the rotator platform configured to pivot between adjacent rows of the block storage to move a block between the adjacent rows, the rotator platform defining one or more cutouts or gaps configured to allow the trolley to be positioned under the rotator platform while the trolley supports the block spaced above the associated row, a cage configured to travel along one or more cables between the lower end and the upper end and to travel over at least a portion of the support frame, and a motor-generator operatively coupled to the cage, the motor-generator operable to move the cage from the lower end to the upper end, the motor-generator configured to generate electricity when the cage moves from the upper end to the lower end at least partially under a force of gravity, wherein the cage is operable to move the plurality of blocks one-by-one from the lower end to the upper end to store and amount of electrical energy corresponding to a potential energy amount of said blocks, and wherein the cage is operable to move the plurality of blocks from the upper end to the lower end at least partially under the force of gravity to generate an amount of electricity.

Clause 25. The system of Clause 24, wherein each trolley comprises multiple wheel assemblies, a frame that extends between the multiple wheel assemblies, and a plurality of support pistons movably coupled to the frame and selectively operable to lift the block above the row and operable to lower the block, the multiple wheel assemblies configured to extend within a channel or be supported on a track of the pair of rails of its associated row of the block storage.

Clause 26. The system of any of Clauses 24-25, wherein the cage comprises a pair of spaced apart arms and a pair of spaced apart flanges attached to ends of the pair of arms, the pair of flanges extending transversely relative to the pair of arms and a gap defined between the pair of flanges, the cage configured to extend around the block while the block is supported by the trolley spaced above the row aligned with the support frame.

Clause 27. The system of Clause 26, wherein the cage self-centers the block when the block is lowered by the trolley so that the pair of flanges engage a bottom of the block.

Clause 28. The system of any of Clauses 24-27, wherein the rotator platform extends along a distance smaller than a distance between the rails of the adjacent rows the rotator platform pivots between.

Clause 29. The system of any of Clauses 25-28, wherein the one or more cutouts or gaps of the rotator platform are configured to receive the plurality of support pistons of the trolley therein to allow the trolley to be positioned under the rotator platform while the trolley supports the block spaced above the rotator platform while the rotator platform is positioned between the block and the frame of the trolley.

Clause 30. An energy storage and delivery system, comprising: a block storage comprising a plurality of rows, each row defined by a pair of rails configured to support a plurality of blocks thereon, a trolley movably coupled to each of the plurality of rows of the block storage, each trolley configured to travel below the plurality of blocks disposed on the pair of rails of its associated row, the trolley operable to lift one block of the plurality of blocks above the pair of rails and to move said block to or from an end of the associated row of the block storage, and a rotator platform pivotally coupled to the end of at least one of the pair or rails of each of the plurality of rows, the rotator platform configured to pivot between adjacent rows of the block storage to move a block between the adjacent rows, the rotator platform defining one or more cutouts or gaps configured to allow the trolley to be positioned under the rotator platform while the trolley supports the block spaced above the associated row.

Clause 31. The system of Clause 30, wherein each trolley comprises multiple wheel assemblies, a frame that extends between the multiple wheel assemblies, and a plurality of support pistons movably coupled to the frame and selectively operable to lift the block above the row and operable to lower the block, the multiple wheel assemblies configured to extend within a channel or be supported on a track of the pair of rails of its associated row of the block storage.

Clause 32. The system of any of Clauses 30-31, wherein the rotator platform extends along a distance smaller than a distance between the rails of the adjacent rows the rotator platform pivots between.

Clause 33. The system of any of Clauses 31-32, wherein the one or more cutouts or gaps of the rotator platform are configured to receive the plurality of support pistons of the trolley therein to allow the trolley to be positioned under the rotator platform while the trolley supports the block spaced above the rotator platform while the rotator platform is positioned between the block and the frame of the trolley.

Clause 34. A system, comprising a rotator platform pivotally coupled to a distal end of at least one of a pair or rails of one of a plurality of rows, the rotator platform configured to pivot between adjacent rows to move a block between the adjacent rows.

Clause 35. The system of Clause 34, wherein the rotator platform defines one or more cutouts or gaps configured to receive support pistons of a trolley that travels along its associated row therein to allow the trolley to be positioned under the rotator platform while the trolley supports a block spaced above the rotator platform while the rotator platform is positioned between the block and a frame of the trolley.

Clause 36. An energy storage and delivery system, comprising: a cableway extending between a lower end and an upper end, the upper end being at a higher elevation than the lower end, the cableway comprising: a block storage comprising a plurality of rows, each row defined by a pair of rails configured to support a plurality of blocks thereon, a support frame aligned with one of the plurality of rows of the block storage, a plurality of trolleys, each of the plurality of trolleys movably coupled to one of the plurality of rows of the block storage, each trolley configured to travel below the plurality of blocks disposed on the pair of rails of its associated row, the trolley operable to lift one block of the plurality of blocks above the pair of rails and to move said block to or from a landing zone at a distal end of the associated row of the block storage, an auxiliary trolley configured to removably receive one of the plurality of trolleys therein, the auxiliary trolley configured to travel along a pair of rails transverse to and adjacent ends of the plurality of rows of the block storage, the auxiliary trolley configured to move between adjacent rows of the block storage while carrying said one of the plurality of trolleys to move blocks between adjacent rows of the block storage, a cage configured to travel along one or more cables between the lower end and the upper end and to travel over at least a portion of the support frame, and a motor-generator operatively coupled to the cage, the motor-generator operable to move the cage from the lower end to the upper end, the motor-generator configured to generate electricity when the cage moves from the upper end to the lower end at least partially under a force of gravity, wherein the cage is operable to move the plurality of blocks one-by-one from the lower end to the upper end to store and amount of electrical energy corresponding to a potential energy amount of said blocks, and wherein the cage is operable to move the plurality of blocks from the upper end to the lower end at least partially under the force of gravity to generate an amount of electricity.

Clause 37. The system of Clause 36, wherein each trolley comprises multiple wheel assemblies, a frame that extends between the multiple wheel assemblies, and a plurality of support pistons movably coupled to the frame and selectively operable to lift the block above the row and operable to lower the block, the multiple wheel assemblies configured to extend within a channel or be supported on a track of the pair of rails of its associated row of the block storage.

Clause 38. The system of any of Clauses 36-37, wherein the cage comprises a pair of spaced apart arms and a pair of spaced apart flanges attached to ends of the pair of arms, the pair of flanges extending transversely relative to the pair of arms and a gap defined between the pair of flanges, the cage configured to extend around the block while the block is supported by the trolley spaced above the row aligned with the support frame.

Clause 39. The system of any of Clauses 36-38, wherein the cage self-centers the block when the block is lowered by the trolley so that the pair of flanges engage a bottom of the block.

Clause 40. The system of any of Clauses 36-39, wherein the auxiliary trolley has rails that align with the pair of rails of the row when the auxiliary trolley is aligned with the row to allow the trolley to move from the row to the auxiliary trolley or from the auxiliary trolley to the row.

Clause 41. An energy storage and delivery system, comprising: a block storage comprising a plurality of rows, each row defined by a pair of rails configured to support a plurality of blocks thereon, a trolley movably coupled to each of the plurality of rows of the block storage, each trolley configured to travel below the plurality of blocks disposed on the pair of rails of its associated row, the trolley operable to lift one block of the plurality of blocks above the pair of rails and to move said block to or from an end of the associated row of the block storage, and an auxiliary trolley configured to removably receive the trolley therein, the auxiliary trolley configured to travel along a pair of rails transverse to and adjacent ends of the plurality of rows of the block storage, the auxiliary trolley configured to move between adjacent rows of the block storage while carrying the trolley to move blocks between adjacent rows of the block storage.

Clause 42. The system of Clause 41, wherein the trolley comprises multiple wheel assemblies, a frame that extends between the multiple wheel assemblies, and a plurality of support pistons movably coupled to the frame and selectively operable to lift the block above the row and operable to lower the block, the multiple wheel assemblies configured to extend within a channel or be supported on a track of the pair of rails of its associated row of the block storage.

Clause 43. The system of any of Clauses 41-42, wherein the auxiliary trolley has rails that align with the pair of rails of the row when the auxiliary trolley is aligned with the row to allow the trolley to move from the row to the auxiliary trolley or from the auxiliary trolley to the row.

Clause 44. A system comprising an auxiliary trolley configured to removably receive a trolley that travels along a pair of rails of a row of a plurality of rows therein, the auxiliary trolley configured to travel along a pair of rails transverse to and adjacent ends of the plurality of rows, the auxiliary trolley configured to move between adjacent rows while carrying the trolley to move blocks between adjacent rows of a block storage.

Clause 45. The system of Clause 44, wherein the auxiliary trolley has rails that align with the pair of rails of the row when the auxiliary trolley is aligned with the row to allow the trolley to move from the row to the auxiliary trolley or from the auxiliary trolley to the row.

Clause 46. An energy storage and delivery system, comprising: a cableway extending between a lower end and an upper end, the upper end being at a higher elevation than the lower end, the cableway comprising: a block storage comprising a plurality of rows, each row defined by a pair of rails configured to support a plurality of blocks thereon, a support frame aligned with one of the plurality of rows of the block storage, a plurality of trolleys, each of the plurality of trolleys movably coupled to one of the plurality of rows of the block storage, each trolley configured to travel below the plurality of blocks disposed on the pair of rails of its associated row, the trolley operable to lift one block of the plurality of blocks above the pair of rails and to move said block to or from a landing zone at a distal end of the associated row of the block storage, a cage configured to travel along one or more cables between the lower end and the upper end and to travel over at least a portion of the support frame, an auxiliary cage movably coupled to a beam of the support frame, the auxiliary cage being movable between adjacent rows of the block storage and configured to carry a block between adjacent rows of the block storage, and a motor-generator operatively coupled to the cage, the motor-generator operable to move the cage from the lower end to the upper end, the motor-generator configured to generate electricity when the cage moves from the upper end to the lower end at least partially under a force of gravity, wherein the cage is operable to move the plurality of blocks one-by-one from the lower end to the upper end to store and amount of electrical energy corresponding to a potential energy amount of said blocks, and wherein the cage is operable to move the plurality of blocks from the upper end to the lower end at least partially under the force of gravity to generate an amount of electricity.

Clause 47. The system of Clause 46, wherein each trolley comprises multiple wheel assemblies, a frame that extends between the multiple wheel assemblies, and a plurality of support pistons movably coupled to the frame and selectively operable to lift the block above the row and operable to lower the block, the multiple wheel assemblies configured to extend within a channel or be supported on a track of the pair of rails of its associated row of the block storage.

Clause 48. The system of any of Clauses 46-47, wherein the cage or auxiliary cage comprises a pair of spaced apart arms and a pair of spaced apart flanges attached to ends of the pair of arms, the pair of flanges extending transversely relative to the pair of arms and a gap defined between the pair of flanges, the cage configured to receive at least a portion of the block between the pair of arms while the block is supported by the trolley spaced above the row aligned with the support frame, the pair of spaced apart flanges configured to support the block thereon when the block is lowered by the trolley onto the flanges.

Clause 49. The system of any of Clauses 46-48, wherein the cage self-centers the block when the block is lowered by the trolley so that the pair of flanges engage a bottom of the block.

Clause 50. An energy storage and delivery system, comprising: a block storage comprising a plurality of rows, each row defined by a pair of rails configured to support a plurality of blocks thereon, a trolley movably coupled to each of the plurality of rows of the block storage, each trolley configured to travel below the plurality of blocks disposed on the pair of rails of its associated row, the trolley operable to lift one block of the plurality of blocks above the pair of rails and to move said block to or from an end of the associated row of the block storage, and an auxiliary cage movably coupled to a beam of a support frame aligned with one of the plurality of rows, the auxiliary cage being movable between adjacent rows of the block storage and configured to carry a block between adjacent rows of the block storage.

Clause 51. The system of Clause 50, wherein the trolley comprises multiple wheel assemblies, a frame that extends between the multiple wheel assemblies, and a plurality of support pistons movably coupled to the frame and selectively operable to lift the block above the row and operable to lower the block, the multiple wheel assemblies configured to extend within a channel or be supported on a track of the pair of rails of its associated row of the block storage.

Clause 52. The system of any of Clauses 50-51, wherein the cage or auxiliary cage comprises a pair of spaced apart arms and a pair of spaced apart flanges attached to ends of the pair of arms, the pair of flanges extending transversely relative to the pair of arms and a gap defined between the pair of flanges, the cage configured to receive at least a portion of the block between the pair of arms while the block is supported by the trolley spaced above the row aligned with the support frame, the pair of spaced apart flanges configured to support the block thereon when the block is lowered by the trolley onto the flanges.

Clause 53. The system of any of Clauses 50-52, wherein the cage self-centers the block when the block is lowered by the trolley so that the pair of flanges engage a bottom of the block.

Clause 54. A system, comprising an auxiliary cage movably coupled to a beam of a support frame, the auxiliary cage being movable between adjacent rows, each row defined by a pair of rails, and configured to carry a block between adjacent rows.

Clause 55. The system of Clause 54, wherein the auxiliary cage comprises a pair of spaced apart arms and a pair of spaced apart flanges attached to ends of the pair of arms, the pair of flanges extending transversely relative to the pair of arms and a gap defined between the pair of flanges, the cage configured to receive at least a portion of the block between the pair of arms, the pair of spaced apart flanges configured to support the block thereon when the block is lowered by a trolley onto the flanges.

Clause 56. A system comprising cage for carrying a block along a cableway, comprising a pair of spaced apart arms and a pair of spaced apart flanges attached to ends of the pair of arms, the pair of flanges extending transversely relative to the pair of arms and a gap defined between the pair of flanges, the cage configured to extend around the block while the block is supported by a first trolley or a second trolley spaced above a row.

Clause 57. The system of Clause 56, wherein the cage self-centers the block when the block is lowered relative to the pair of flanges so that the pair of flanges engage a bottom of the block.

Clause 58. A system comprising a plurality of adjacent rows, each row defined by a pair of rails configured to support a plurality of blocks on an upper surface of the rails, each pair of rails of a row spaced from each other to allow a trolley to travel along the row and below the blocks supported on the rails of the row.

Clause 59. The system of clause 58, wherein the trolley comprises multiple wheel assemblies, a frame that extends between the multiple wheel assemblies, and a plurality of support pistons movably coupled to the frame and selectively operable to lift the block above the row and operable to lower the block, the multiple wheel assemblies configured to extend within a channel or be supported on a track of the pair of rails of its associated row.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications can be made without departing from the spirit and scope of the present invention. Moreover, the devices described herein need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed devices.

What is claimed is:

1. An energy storage and delivery system, comprising:
one or more cableways extending between a lower end and an upper end, the upper end being at a higher elevation than the lower end, each cableway comprising:
    an upper block storage at the upper end comprising a row defined by a pair of rails configured to support a plurality of blocks thereon,
    an upper support frame aligned with a distal end of the row of the upper block storage,
    a first trolley movably coupled to said pair of rails of the row of the upper block storage, the first trolley configured to travel below the plurality of blocks disposed on the pair of rails of the row of the upper block storage, the first trolley operable to lift one block of the plurality of blocks above the pair of rails of the row of the upper block storage and to move said block horizontally along the row of the upper block storage to or from an upper landing zone at the distal end of the row of the upper block storage,
    a lower block storage at the lower end comprising a row defined by a pair of rails configured to support a plurality of blocks thereon,
    a lower support frame aligned with a distal end of the row of the lower block storage,
    a second trolley movably coupled to said pair of rails of the row of the lower block storage, the second trolley configured to travel below the plurality of blocks disposed on the pair of rails of the row of the lower block storage, the second trolley operable to lift one block of the plurality of blocks above the pair of rails of the row of the lower block storage, and to move said block horizontally along the row of the lower block storage to or from a lower landing zone at the distal end of the row of the lower block storage,
    one or more cables extending between and coupled to the upper support frame and the lower support frame,
    a cage configured to travel along the one or more cables between and over at least a portion of the upper support frame and the lower support frame, the cage fixedly coupled to one or more traction cables that loop around a first traction motor wheel operatively coupled to the upper support frame and around a second traction motor wheel operatively coupled to the lower support frame, and
    a motor-generator operatively coupled to one or both of the first traction motor wheel and the second traction motor wheel, the motor-generator operable to power one or both of the first traction motor wheel and the second traction motor wheel to move the cage from the lower end to the upper end, the motor-generator configured to generate electricity from a rotation of one or both of the first traction motor wheel and the second traction motor wheel when the cage moves from the upper end to the lower end at least partially under a force of gravity,
wherein the cage is operable to move the plurality of blocks one-by-one from the lower end to the upper end to store an amount of electrical energy corresponding to a potential energy amount of said blocks, and wherein the cage is operable to move the plurality of blocks from the upper end to the lower end at least partially under the force of gravity to generate an amount of electricity, the cage moving each of the plurality of blocks between the upper end and the lower end along a same vertical distance.

2. The system of claim 1, wherein the row of the upper block storage comprises a plurality of rows that include one or more rows adjacent the row of the upper block storage aligned with the upper support frame, and wherein the first trolley comprises a plurality of first trolleys, each of the plurality of first trolleys movably coupled to one of the plurality of rows of the upper block storage.

3. The system of claim 2, wherein the first trolley comprises multiple wheel assemblies, a frame that extends between the multiple wheel assemblies, and a plurality of support pistons movably coupled to the frame and selectively operable to lift the block above the row of the upper block storage and operable to lower the block, the multiple wheel assemblies configured to extend within a channel or be supported on a track of the pair of rails of each of the plurality of rows of the upper block storage.

4. The system of claim 3, further comprising a second cage movably coupled to a beam of the upper support frame, the second cage being movable between adjacent rows of the upper block storage and configured to carry a block between said adjacent rows.

5. The system of claim 4, wherein the cage or the second cage comprises a pair of spaced apart arms and a pair of spaced apart flanges attached to ends of the pair of arms, the pair of flanges extending transversely relative to the pair of arms and a gap defined between the pair of flanges, the cage configured to extend around the block while the block is supported by the first trolley or second trolley spaced above the row.

6. The system of claim 4, wherein the cage or the second cage self-centers the block when the block is lowered by the first trolley or second trolley so that the pair of flanges engage a bottom of the block.

7. The system of claim 1, wherein the one or more cables are a pair of cables that extend between and couple to a pair of rails of the upper support frame and to a pair of rails of the lower support frame.

8. The system of claim 1, wherein the row of the lower block storage comprises a plurality of rows that include one or more rows adjacent the row of the lower block storage aligned with the lower support frame, and wherein the second trolley comprises a plurality of second trolleys, each of the plurality of second trolleys movably coupled to one of the plurality of rows of the lower block storage.

9. The system of claim 8, wherein the second trolley comprises multiple wheel assemblies, a frame that extends between the multiple wheel assemblies, and a plurality of support pistons movably coupled to the frame and selectively operable to lift one block of the plurality of blocks above the row of the lower block storage and operable to lower the block, the multiple wheel assemblies configured to extend within a channel or be supported on a track of the pair of rails of each of the plurality of rows of the lower block storage.

10. The system of claim 9, further comprising a third cage movably coupled to a beam of the lower support frame, the third cage being movable between adjacent rows of the lower block storage and configured to carry a block between said adjacent rows.

11. An energy storage and delivery system, comprising:
a cableway extending between a lower end and an upper end, the upper end being at a higher elevation than the lower end, the cableway comprising:
a block storage comprising a plurality of rows, each row defined by a pair of rails configured to support a plurality of blocks thereon,
a support frame aligned with one of the plurality of rows of the block storage,
a plurality of trolleys, each of the plurality of trolleys movably coupled to one of the plurality of rows of the block storage, each trolley configured to travel below the plurality of blocks disposed on the pair of rails of an associated row of the block storage, a trolley of the plurality of trolleys operable to lift one block of the plurality of blocks above the pair of rails and to move said block to or from a landing zone at a distal end of the associated row of the block storage,
a cage configured to travel along one or more cables between the lower end and the upper end and to travel over at least a portion of the support frame,
an auxiliary cage movably coupled to a beam of the support frame, the auxiliary cage being movable between adjacent rows of the block storage and configured to carry a block between adjacent rows of the block storage, and
a motor-generator operatively coupled to the cage, the motor-generator operable to move the cage from the lower end to the upper end, the motor-generator configured to generate electricity when the cage moves from the upper end to the lower end at least partially under a force of gravity,
wherein the cage is operable to move the plurality of blocks one-by-one from the lower end to the upper end to store an amount of electrical energy corresponding to a potential energy amount of said blocks, and wherein the cage is operable to move the plurality of blocks from the upper end to the lower end at least partially under the force of gravity to generate an amount of electricity.

12. The system of claim 11, wherein each trolley comprises multiple wheel assemblies, a frame that extends between the multiple wheel assemblies, and a plurality of support pistons movably coupled to the frame and selectively operable to lift the block above the associated row the block storage and operable to lower the block, the multiple wheel assemblies configured to extend within a channel or be supported on a track of the pair of rails of the associated row of the block storage.

13. The system of claim 11, wherein the cage or auxiliary cage comprises a pair of spaced apart arms and a pair of spaced apart flanges attached to ends of the pair of arms, the pair of flanges extending transversely relative to the pair of arms and a gap defined between the pair of flanges, the cage configured to receive at least a portion of the block between the pair of arms while the block is supported by the trolley spaced above the row of the block storage aligned with the support frame, the pair of spaced apart flanges configured to support the block thereon when the block is lowered by the trolley onto the flanges.

14. The system of claim 11, wherein the cage self-centers the block when the block is lowered by the trolley so that the pair of flanges engage a bottom of the block.

15. An energy storage and delivery system, comprising:
a block storage comprising a plurality of rows, each row defined by a pair of rails configured to support a plurality of blocks thereon,
a trolley movably coupled to each of the plurality of rows of the block storage, the trolley configured to travel below the plurality of blocks disposed on the pair of rails of an associated row, the trolley operable to lift one block of the plurality of blocks above the pair of rails and to move said block to or from an end of the associated row of the block storage, and
an auxiliary cage movably coupled to a beam of a support frame aligned with one of the plurality of rows, the auxiliary cage being movable between adjacent rows of the block storage and configured to carry a block between adjacent rows of the block storage.

16. The system of claim 15, wherein the trolley comprises multiple wheel assemblies, a frame that extends between the multiple wheel assemblies, and a plurality of support pistons movably coupled to the frame and selectively operable to lift the block above the row of the block storage and operable to lower the block, the multiple wheel assemblies configured to extend within a channel or be supported on a track of the pair of rails of its associated row of the block storage.

17. The system of claim 15, wherein the auxiliary cage comprises a pair of spaced apart arms and a pair of spaced apart flanges attached to ends of the pair of arms, the pair of flanges extending transversely relative to the pair of arms and a gap defined between the pair of flanges, the auxiliary cage configured to receive at least a portion of the block between the pair of arms while the block is supported by the trolley spaced above the row of the block storage aligned with the support frame, the pair of spaced apart flanges configured to support the block thereon when the block is lowered by the trolley onto the flanges.

18. The system of claim 15, wherein the auxiliary cage self-centers the block when the block is lowered by the trolley so that the pair of flanges engage a bottom of the block.

\* \* \* \* \*